(12) United States Patent
DeWitt et al.

(10) Patent No.: US 10,521,821 B2
(45) Date of Patent: Dec. 31, 2019

(54) SEARCH AND SUBSCRIBE ADVERTISING SYSTEM AND METHODS

(71) Applicant: CloudTraQ LLC, Las Vegas, NV (US)

(72) Inventors: Gregory Taylor DeWitt, Henderson, NV (US); Eugen Munteanu, Las Vegas, NV (US)

(73) Assignee: CloudTraQ LLC, Las Vegas, NV (US)

( * ) Notice: Subject to any disclaimer, the term of this patent is extended or adjusted under 35 U.S.C. 154(b) by 248 days.

(21) Appl. No.: 15/161,061

(22) Filed: May 20, 2016

(65) Prior Publication Data
US 2016/0343032 A1    Nov. 24, 2016

Related U.S. Application Data

(60) Provisional application No. 62/165,138, filed on May 21, 2015, provisional application No. 62/165,140, (Continued)

(51) Int. Cl.
*G06Q 30/02* (2012.01)
*G06Q 10/02* (2012.01)
(Continued)

(52) U.S. Cl.
CPC ......... *G06Q 30/0261* (2013.01); *A63F 13/35* (2014.09); *G06Q 10/02* (2013.01);
(Continued)

(58) Field of Classification Search
None
See application file for complete search history.

(56) References Cited

U.S. PATENT DOCUMENTS

| | | |
|---|---|---|
| 6,374,176 B1 | 4/2002 | Schmier et al. |
| 8,972,180 B1 | 3/2015 | Zhao et al. |

(Continued)

FOREIGN PATENT DOCUMENTS

| | | |
|---|---|---|
| JP | 2004-341684 A | 12/2004 |
| JP | 2009-502217 A | 1/2009 |

(Continued)

OTHER PUBLICATIONS

International Search Report and Written Opinion (PCT/US2016/033624); dated Aug. 19, 2016.

(Continued)

*Primary Examiner* — Alexandru Cirnu
(74) *Attorney, Agent, or Firm* — Howard & Howard Attorneys PLLC

(57) ABSTRACT

Search and subscribe advertising systems and methods are disclosed. An advertising system includes at least one identification, location and authentication system associated with a physical venue, each including a master sensor node connected to a broadband network channel and a plurality of sensors in the physical venue. The advertising system further includes a cloud-based advertisement service hosted by and associated with an identification, location and authentication system. The cloud-based advertisement service is communicatively coupled to the master sensor node and stores advertising data associated with the physical venue. The advertising system includes an advertising application installed on a mobile device, which transmits a search request for a local service to the cloud-based advertisement service, and receives and displays advertising data, which is selected based on the mobile device location, the physical venue location, and at least one search keyword.

21 Claims, 41 Drawing Sheets

Related U.S. Application Data filed on May 21, 2015, provisional application No. 62/165,134, filed on May 21, 2015, provisional application No. 62/165,142, filed on May 21, 2015.

(51) Int. Cl.

| | | |
|---|---|---|
| *H04W 12/06* | (2009.01) | |
| *H04W 4/024* | (2018.01) | |
| *H04W 4/029* | (2018.01) | |
| *A63F 13/35* | (2014.01) | |
| *G06Q 20/32* | (2012.01) | |
| *H04L 29/08* | (2006.01) | |
| *H04W 4/021* | (2018.01) | |
| *H04W 4/02* | (2018.01) | |
| *H04W 4/12* | (2009.01) | |
| *H04W 12/08* | (2009.01) | |
| *H04M 1/725* | (2006.01) | |
| *H04W 64/00* | (2009.01) | |
| *H04W 84/18* | (2009.01) | |
| *H04W 84/20* | (2009.01) | |
| *H04W 84/12* | (2009.01) | |

(52) U.S. Cl.
CPC ..... *G06Q 20/3224* (2013.01); *G06Q 20/3278* (2013.01); *G06Q 30/0256* (2013.01); *G06Q 30/0267* (2013.01); *H04L 67/02* (2013.01); *H04M 1/72572* (2013.01); *H04W 4/02* (2013.01); *H04W 4/021* (2013.01); *H04W 4/024* (2018.02); *H04W 4/027* (2013.01); *H04W 4/029* (2018.02); *H04W 4/12* (2013.01); *H04W 12/06* (2013.01); *H04W 12/08* (2013.01); *H04W 64/00* (2013.01); *H04L 67/18* (2013.01); *H04M 1/72544* (2013.01); *H04W 84/12* (2013.01); *H04W 84/18* (2013.01); *H04W 84/20* (2013.01)

(56) References Cited

U.S. PATENT DOCUMENTS

| | | | |
|---|---|---|---|
| 9,424,586 | B1 * | 8/2016 | Sivertsen ............ G06Q 30/0241 |
| 9,646,325 | B2 | 5/2017 | DeWitt et al. |
| 9,685,005 | B2 * | 6/2017 | Kjallstrom ............ G06T 19/006 |
| 9,858,597 | B2 | 1/2018 | DeWitt et al. |
| 2005/0187020 | A1 | 8/2005 | Amaitis et al. |
| 2007/0060358 | A1 | 3/2007 | Amaitis et al. |
| 2010/0120538 | A1 | 5/2010 | DeWitt |
| 2011/0081918 | A1 | 4/2011 | Burdo et al. |
| 2011/0307547 | A1 | 12/2011 | Backer et al. |
| 2012/0042036 | A1 | 2/2012 | Lau et al. |
| 2013/0012324 | A1 | 1/2013 | Amaitis et al. |
| 2013/0045758 | A1 | 2/2013 | Khorashadi et al. |
| 2013/0091452 | A1 | 4/2013 | Sorden et al. |
| 2013/0290305 | A1 | 10/2013 | Feng et al. |
| 2013/0317921 | A1 | 11/2013 | Havas |
| 2013/0346201 | A1 * | 12/2013 | Bilange ............ G06Q 30/0256 |
| | | | 705/14.54 |
| 2014/0089111 | A1 * | 3/2014 | Fernandez ............ H04W 4/70 |
| | | | 705/15 |
| 2014/0379529 | A1 | 12/2014 | Agasti et al. |
| 2015/0006289 | A1 * | 1/2015 | Jakobson ............ G06Q 30/0256 |
| | | | 705/14.54 |
| 2015/0046276 | A1 | 2/2015 | Artman et al. |
| 2015/0084741 | A1 | 3/2015 | Bergdale et al. |
| 2015/0134374 | A1 | 5/2015 | Schulz et al. |
| 2015/0324890 | A1 | 11/2015 | Wilson et al. |
| 2016/0148303 | A1 | 5/2016 | Carr et al. |
| 2016/0189138 | A1 | 6/2016 | Hird et al. |

FOREIGN PATENT DOCUMENTS

| | | |
|---|---|---|
| JP | 2013-202270 A | 10/2013 |
| JP | 2014-182621 A | 9/2014 |
| RU | 2013126366 A | 12/2014 |
| RU | 2544986 C2 | 3/2015 |

OTHER PUBLICATIONS

Search Report and Written Opinion (SG Patent Application No. 11201709481V); dated Aug. 20, 2018.
Non-Final Office Action (U.S. Appl. No. 16/165,017); dated Feb. 26, 2019; 19 pages.
Examination Report No. 1 (AU Patent Application No. 2016264755); dated Oct. 24, 2018; 6 pages.
First Examination Report (NZ Application No. 737497); dated Dec. 10, 2018; 4 pages.
Notification of Reasons for Rejection (JP Application No. 2018-512835); dated Dec. 11, 2018; 6 pages.
First Office Action (CN Application No. 201680043143.8); dated Jan. 3, 2019; 27 pages.
Non-Final Office Action (U.S. Appl. No. 16/027,048); dated May 9, 2019; 32 pages.
Further Examination Report (NZ IP No. 737497); dated Jun. 26, 2019; 4 pages.
Preliminary Examination (SG Patent Application No. 10201905852U); dated Jun. 27, 2019; 2 pages.
Examination Report No. 2 (AU Patent Application No. 2016264755); dated Jul. 9, 2019; 4 pages.
First Examination Report (NZ IP No. 754374); dated Jul. 11, 2019; 3 pages.
Examination Report (EP Application No. 16 797 409.6-1213); dated Jul. 23, 2019; 7 pages.
Search Report (RU Application No. 2018145921/07 (076757); dated Aug. 16, 2019; 2 pages.

* cited by examiner

SEARCH AND SUBSCRIBE ADVERTISING SYSTEM AND METHODS

CROSS-REFERENCE TO RELATED APPLICATIONS

This application claims priority to U.S. Provisional Patent Application Ser. Nos. 62/165,134, 62/165,138, 62/165,140, and 62/165,142 all filed May 21, 2015, the entire contents of which are herein incorporated by reference.

TECHNICAL FIELD

The present invention generally concerns systems and methods for enhancing communication and engagement between user devices and service providers. More specifically, the invention discloses systems and methods for identifying, locating, and authenticating devices and users, zero-wait publishing, searching, and queuing, searching and subscribing to advertisements, and virtual teleportation.

BACKGROUND OF THE INVENTION

Online gaming is gaining popularity, but regulations of online gaming present numerous challenges to online gaming service providers. For example, currently, a user is not allowed to participate in online gaming unless the user is within the borders of a state that has legalized such gaming. As such, online gaming providers must use geo-location technology to determine the user's location. Geo-location technologies help online service providers with geo-fencing, that is, placing an invisible fence around the borders of a location (e.g., a state, a building or other property, etc.), outside of which services are unavailable to users. However, because different service providers use different technologies to determine users' locations, the user experience may differ amongst different service providers.

It is believed that as many as forty percent of potential users within legal gaming jurisdictions are either not able to verify location compliance or are inadvertently kicked off a site mid-game due to discrepancies with geo-locating services. With traditional cell ID and GPS, geo-locating services, there is no reliable way to guarantee that the identity of a user is less than five miles of a geo-fencing border. With such poor accuracy, service providers typically opt to disallow a user to participate, even though that user may be within a legal gaming border, rather than accept the risk that the user may not be within the legal border. Currently, the standard is to disallow players within five miles of a state border, to account for worst-case cellular location error limitations. An example of an existing gaming network is described in U.S. Ser. No. 12/618,529 entitled "Gaming Control System", filed on Nov. 13, 2009 by Gregory T. Dewitt.

Furthermore, consumers rely on their mobile devices to provide relevant content and communication with service providers now more than ever before. Consumers are beginning to expect service providers to anticipate and meet their needs based on their individual situations in real-time. This expectation must be balanced against users' general reluctance to supply service providers with sensitive personal information. Moreover, service providers in all fields desire to provide users with a better user experience, cost-effectively advertise and deliver services to users more efficiently, maximize profits, and increase the goodwill associated with their brands. However, existing mobile technologies are not being leveraged effectively to provide enhanced consumer experiences while improving service providers' access to and engagement with relevant consumers.

Additionally, the use of digital signage in advertisements by retailers and other service providers is growing rapidly on a global scale. Moreover, local radio frequency beaconing technology is being adopted to allow interaction between mobile devices and digitally published content over signage monitors. However, the technology still caters primarily to users who are physically present at or near a service provider's location or venue (e.g., traditional "foot traffic") and those with beaconing applications running at point-of-touch with the monitor. There is a need to extend the value proposition of the traditional digital signage model to include mobile users through cloud and sensor/actuator nodes.

The present invention is aimed at one or more of the problems identified above.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

SUMMARY OF THE INVENTION

Figure 1:
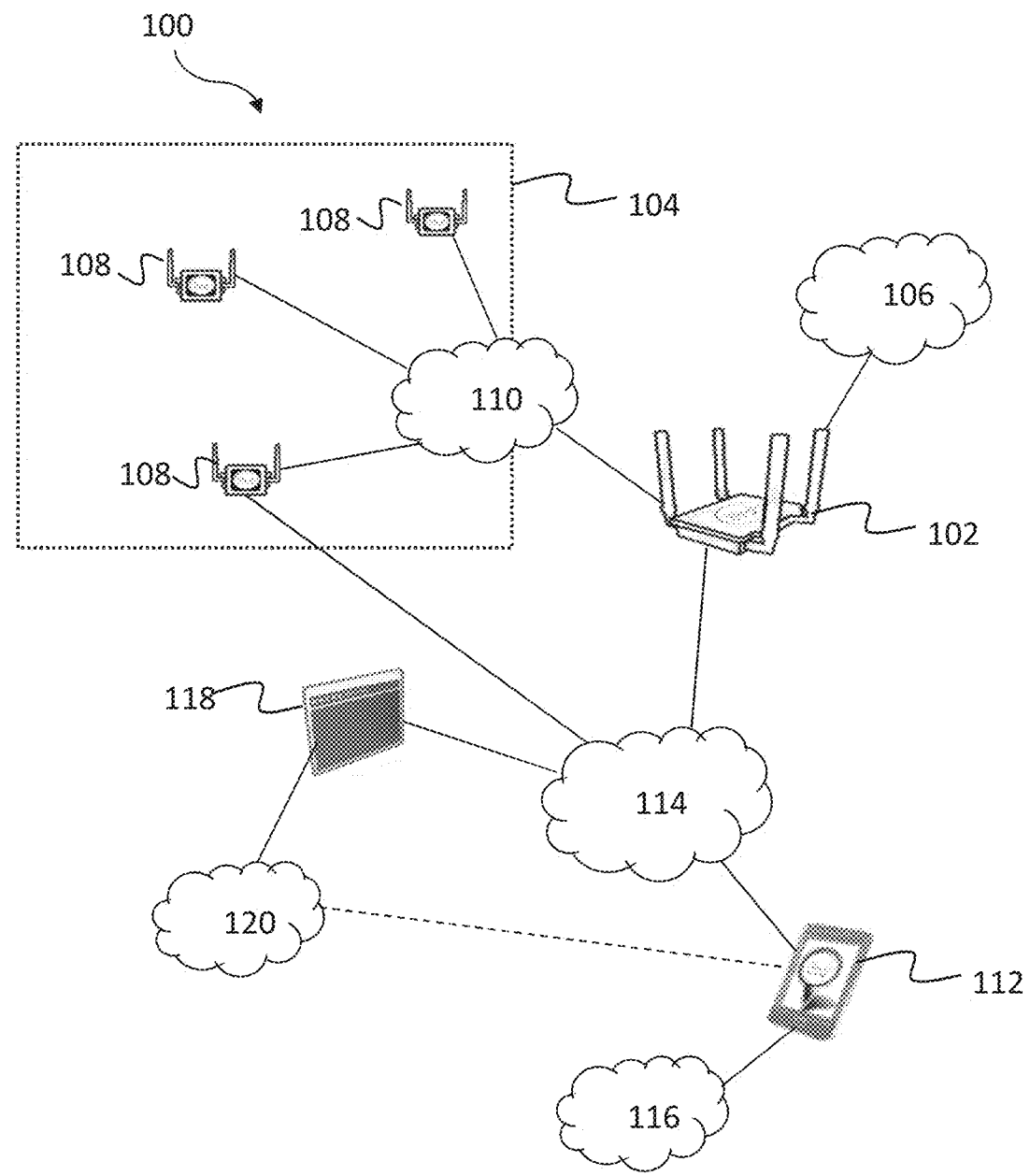
FIG. 1 illustrates the architecture of an identification, location, and authentication system, according to one embodiment of the present invention.

In one aspect of the present invention, an advertising system is disclosed. The advertising system includes at least one identification, location and authentication system associated with a physical venue. Each identification, location and authentication system includes a master sensor node connected to a broadband network channel, and a plurality of sensors in the physical venue. The plurality of sensors is in communication with the master sensor node over the broadband network channel. The advertising system further includes a cloud-based advertisement service hosted by and associated with at least one identification, location and authentication systems deployed in the physical venue. The cloud-based advertisement service is communicatively coupled to the master sensor node and stores a plurality of advertising data associated with the physical venue. The advertising system further includes an advertising application installed on a mobile device connected to a cellular network channel. The advertising application transmits a search request for a local service to the cloud-based advertisement service, and receives and displays advertising data associated with at least one physical venue, transmitted from the master sensor node to the cloud-based advertisement service. The advertising data is selected for presentation to the mobile device based at least on a location of the mobile device, a location of the physical venue, and at least one search keyword.

In another aspect of the present invention, a method is disclosed. At least one identification, location and authentication system associated with a physical venue is provided, each including a master sensor node connected to a broadband network channel and a plurality of sensors in the physical venue. The plurality of sensors is in communication with the master sensor node over the broadband network channel. A cloud-based advertisement service is hosted by and associated with at least one identification, location and authentication systems deployed in the physical venue, the cloud-based advertisement service storing a plurality of advertising data associated with the physical venue. An advertising application installed on a mobile device and connected to a cellular network channel is provided. The advertising application transmits a search request for a local service, and receives and displays advertising data associated with at least one physical venue from the cloud-based advertisement service in response to the search request, wherein the advertising data is selected for presentation to the mobile device based at least on a location of the mobile device, a location of the physical venue, and at least one search keyword.

In yet another aspect of the present invention, an advertising system is disclosed. The advertising system includes at least one identification, location and authentication system associated with a physical venue, each including a master sensor node connected to a broadband network channel, and a plurality of sensors in the physical venue. The plurality of sensors is in communication with the master sensor node over the broadband network channel. A cloud-based advertisement service is hosted by and communicatively coupled to the at least one master node or at least one of the plurality of sensors and stores a plurality of advertising data associated with the physical venue. An advertising application is installed on a mobile device and is connected to a cellular network channel. The advertising application transmits a search request for a local service to the cloud-based advertisement service, and receives and displays advertising data associated with at least one physical venue from the cloud-based advertisement service in response to the search request. The advertising data is selected for presentation to the mobile device.

DETAILED DESCRIPTION OF THE INVENTION

Embodiments of the present invention provide systems and methods for identifying, locating, and authenticating devices and users, zero-wait publishing, searching, and queuing, searching and subscribing to advertisements, and virtual teleportation. Persons of ordinary skill in the art will realize that the following description of the presently invention is illustrative only and not in any way limiting. Other embodiments of the invention will readily suggest themselves to such skilled persons.

The inventions described herein provide improved systems and methods for identifying, locating, and authenticating devices and users to one another and/or to third party service providers. The system is location-sensitive and tamper-resistant to facilitate efficient and secure identification, location, and authentication services. Additionally, zero-wait publishing, searching, and queuing systems and methods are disclosed. Users may utilize this system to search for service providers and make reservations or join a queue, leveraging the identification, location, and authentication services. Other systems and methods disclosed herein allow users to search and subscribe to service providers. The system facilitates more efficient advertising by service providers, allowing service providers to target specific consumers with relevant messages, deals, and offers. Finally, systems and methods utilizing virtual teleportation are disclosed herein, which allow users to perform enhanced and more relevant searching based on absolute location of service providers, even where the user is remote from the service provider.

According to the present invention, a system may include any combination of an identification, location, and authentication system, a zero-wait publishing system, a searching and subscribe system, and a virtual teleportation system. (See FIG. 22).

Related Technologies

Internet of Things (IoT) is becoming established as a viable technology for smart city and smart retail growth. IoT has socially desirable benefits and possesses characteristics for mass viral adoption. In a world of increasing internet connectedness, identity of things and identity of people connecting to things is becoming of primary importance to ensure that trust, security, and predictability of service rivals that of traditional land and online services. Augmented reality (AR) is a nascent but promising technology utilizing tangible user interface features that can enhance consumer experience and decision parameters not easily extracted from traditional browser-based search and mapping services.

Hyper-relevance is an emerging area of technology that seeks to integrate different technological solutions in real-time to provide users with better value and an improved user experience. The value can come in the way of cost-savings, more efficient delivery of services, or better/more relevant engagement with service providers. Essentially, this new technology seeks to give consumers what they want, when they want it, and however they want it.

Big data, the collection of voluminous amounts of structured, semi-structured and unstructured data, stored and analyzed for both known and unknown patterns, and having the potential to be mined for information, will continue to increase but provide more value when integrated with small specific datasets created from evolving IoT sensor/actuator use cases. Small data, a dataset that contains very specific attributes, generated largely by IoT sensors/actuators and used to determine current states and conditions of managed systems and services, will increase with expansive deployment of standards based IoT devices, services and management systems. Small data, collected by IoT sensor/actuator devices is real-time, can tell specifics such as location, temperature, wetness, pressure or vibration, and can trigger events based on what is happening in real-time. Those events can be merged with behavioral or trending information derived from machine learning algorithms run against big data datasets to improve or increase security or productivity of business or work processes.

Retail and mobile commerce Process Intelligence, data that has been systematically collected to analyze the individual steps within a business process, will be enhanced by the mass adoption of IoT devices, their services and real-time Small data pools. The tuning and analysis of IoT generated process intelligence will fuel new jobs, systems, and services to better serve smart cities and advance mobile commerce industry.

API management, the process of publishing, promoting and overseeing application programming interfaces (APIs) in a secure, scalable environment including API creation of end user support resources that define and document the API, are becoming of primary importance to growth and mass adoption of IoT-based services. Small context, demographic, and user profile datasets collected by IoT is stimulating need for big data integration on a scale not available by traditional app build methodologies.

HTML5 code can be written once and then run on any device (including IOS, Android, Windows Mobile, etc.). HTML5 applications ("apps") utilize native device features, such as a camera or an accelerometer, and use device APIs such as Apache* Cordova. These apps are also "packaged" for distribution by the various app stores.

The Bluetooth receiver system is the onboard system that scans the area for Bluetooth device traffic, records available data and writes to onboard SD card. The data is then made available to onboard software for parsing, manipulating, and sending to the database via Zigbee radio system.

The Zigbee transceiver system is an onboard system that reads the SD card for new scanned Bluetooth frame data, places it in the Zigbee transceiver payload, and sends over Zigbee radio waves to the server head-end for database storage and processing.

Micro-electro-mechanical systems (MEMS) motions and tamper resistant security system is the onboard system that senses device motion and/or tampering and locks all access to normal service usage between the user and the network. It also is responsible for sending alerts to the operator to contact the user/player or suspend service until re-calibration or compliance is restored.

Identification, Location, and Authentication Systems and Methods

The identification, location, and authentication systems and methods disclosed herein may be used to locate mobile devices and identifying individuals to facilitate providing efficient and secure services. By integrating these systems and methods with other known location-based technologies, such as MEMS, GPS, IP, and cellular, online and wireless connected retail services can be initiated with a very high degree of identity and physical location certainty, offering more accurate geo-fence calculations (within feet of a geo-fence border) as well as stronger security features for more trusted player, guest or patron identity and geographic compliance.

The systems and methods of the present invention may require multi-factor authentication for additional security, including any combination of the following factors: an absolute location of one or more devices (e.g., mobile device, sensor nodes), login credentials/digital certificates (e.g., username/password, which may be managed within a standard public key infrastructure (PKI) network), hardware identification (e.g., a mobile device ID, a master sensor node ID, MAC addresses, UUIDs), and user identification/biometrics (e.g., fingerprint scanning, facial recognition via a camera, motion signature, and the like). Multi-factor authentication is particularly valuable for third party service providers who require an absolute location factor to ensure geo-fenced service compliance, such as those in regulated industries like the gaming industry. In addition to geo-location, use of the present invention with existing technologies allows service providers to authenticate the identity and age of a user and provides for improved digital rights management. Additionally, tamper-proof measures are included in the present invention to prevent avoidance of or disruption to geo-location services.

The system may utilize open standard user accounts via Lightweight Directory Access Protocol (LDAP) (e.g., Microsoft Active Directory) linked with an online PKI Registration Authority (RA) function for encryption of digital certificates, which provides quick validation and user enrollment from existing social network member accounts.

In one embodiment of the present invention, the system may store and statistically determine location based on historical and live geospatial scan data, in addition to relying on internal mobile device resident sensor mechanisms (e.g., MEMS, camera, microphone, etc.) to maintain location accuracy in case of wireless service interruption. If used autonomously (i.e., not networked), the system may be capable of advertising its identity, location, and calibration status to any requesting local network connected device for the purpose of providing a location factor or setting a mobile device absolute location remotely. In this embodiment, the mobile device may provide a bridge between the autonomous sensor and the cloud.

Referring now to FIG. 1, illustrating the architecture of an identification, location, and authentication system 100, according to one embodiment of the present invention, one or more master sensor nodes 102 may be located in a physical venue 104. The physical venue 104 may be any physical venue, such as a retail store, a casino, a hotel (or a guest room inside a hotel), a restaurant, a theater, and the like. The physical venue 104 may also be a user's home or within a vehicle. In one embodiment, the one or more master sensor nodes 102 may be placed on a person or animal instead of a physical venue 104.

The one or more master nodes 102 may be IoT radio frequency actuator nodes. In an alternate embodiment, the one or more master nodes 102 may comprise a smart device running a system service profile enabling the smart device to mimick a sensor. In this embodiment, the smart device would provide a bridge function between a mobile device and a master sensor node 102. The one or more master sensor nodes 102 may be connected to a broadband network channel 106 for cloud communications, optionally with a wireless LAN or a broadband cellular connection.

Figure 2:
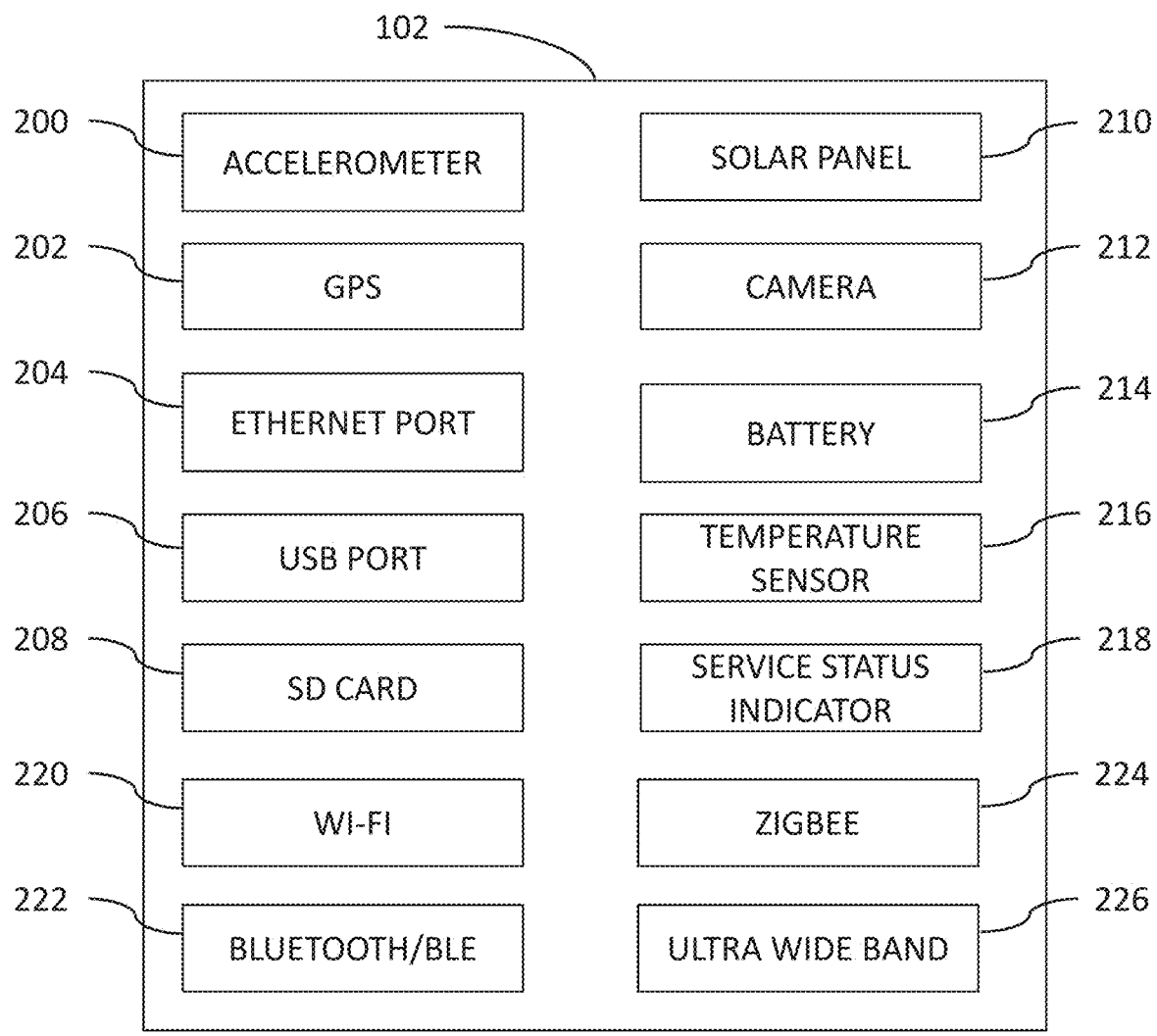
FIG. 2 illustrates the architecture of an exemplary master sensor node, according to one embodiment of the present invention.

Referring now to FIG. 2, illustrating the architecture of an exemplary master sensor node according to one embodiment of the present invention, each of the one or more master sensor nodes 102 may include an accelerometer 200 for motion sensing, a global positioning system (GPS) 202 for self-calibration, an Ethernet port 204 that may connect the node to a router for Internet access, a USB port 206, an SD card 208 for storing collected data, a solar panel 210 for self-powering during outdoor use, a camera 212 for security, motion sensing and identity, a battery 214 that may be rechargeable, a temperature sensor 216, a service status indicator 218, which may be an audio indicator or an LED indicator, a Wi-Fi radio 220 for sensing, authentication, communications and local wireless network connectivity, a Bluetooth or BLE radio 222 for sensing, authentication and communicating, a Zigbee radio 224 for sensing, authenticating, communicating and bridging the Internet, and an Ultra Wide Band (UWB) radio 226 for sensing, authenticating, communicating, positioning and sensor network calibration services.

The master sensor node 102 may be connected to a physical venue, SaaS or cloud system or service, such as a registration system, check-in system, queuing system, POS system, payment system, online gaming transaction system, PMS system, CMS system, LMS system, streaming video system or similar, through a published API. Services associated with the master sensor node 102 may be distributed remotely through a network-connected management service such as a mobile wireless, wireless LAN, dial-up modem, or broadband internet based registration service using a web service or REST API to allow property, company or world wide access to master sensor node services. The master sensor node 102 may provide a publish subscription service to advertise its services to web services or other services on the local network or in the cloud. Physical venue, SaaS or cloud system or services that subscribe to the master sensor node 102 may receive periodic published information or search and retrieve information related to the service.

Referring again to FIG. 1, one or more sensors 108 may be placed within the physical venue 104. The sensors 108 may be in communication with the one or more master sensor nodes 102 over a wireless network channel 110. The sensors 108 and the one or more master sensor nodes 102 are communicatively coupled to a mobile device 112 over a radio frequency network channel 114, such as a Bluetooth or Wi-Fi network. In one embodiment of the present invention, any one of the sensors 108 may take on the broadband channel 106 and the function of a master sensor node 102. In yet another embodiment, a sensor 108 is hard-wired to a master sensor node 102 in the same box (e.g., at a smaller venue such as a coffee shop).

The system 100 may use a common network for the one or more master sensor nodes 102 and the mobile device 112. However, use of two out-of-band network channels provides greater security and accuracy. As shown in FIG. 1, the one or more master sensor nodes 102 may use a broadband network 106 for cloud communications, optionally with a wireless LAN connection, and the mobile device 112 uses a cellular wireless network 116.

A plurality of mobile devices 112 may be pre-registered with a third party service provider 118. Each mobile device 112 may be registered by different users. One user may have multiple registered mobile devices 112. For example, a user may register the mobile device 112 when registering as a regulated gaming player of a gaming venue, or as an online transaction participant of an e-commerce provider.

The mobile device 112 may be a mobile phone, PDA, smart watch or bracelet, wireless headset, Bluetooth-enabled vehicle, heads up display, smart glasses, or any other portable electronic device.

The mobile device 112 acts as a physical authentication token. The one or more master sensor nodes 102 or the one or more sensors 108 may scan for radio frequency frames or RSSI signals (e.g., Bluetooth, Wi-Fi, Zigbee, etc.). The one or more master sensor nodes 102 or the one or more sensors 108 may identify one or more factors associated with the mobile device 112, such as a unique ID such as a MAC address or a UUID and an absolute location. The location may be calculated using positioning techniques such as trilateration or triangulation and may be identified by coordinates (e.g., latitude and longitude or Cartesian coordinates). In one embodiment, the mobile device 112 is identified when it is within a predefined distance from the one or more master sensor nodes 102. In another embodiment, a collaborative positioning technique may be used to improve mobile device 112 location accuracy. In this case, the master sensor nodes 102 or the one or more sensors 108 are integrated in a local radio frequency network with radio frequency beaconing nodes. By performing collaborative measures such as sensing radio frequency beaconing signals and calculating position from the mobile device 112 in an unknown state, and sensing the same beacons and performing the same calculations from the master sensor node 102, from a known state, an error delta can be create to apply to the mobile device 112 unknown position calculation that may improve the position accuracy. In another embodiment, the one or more master sensor nodes 102 or the one or more sensors 108 my scan simple radio frequency tags such as BLE beacons and published through the master sensor node 102 API to allow property, SaaS and cloud system and service access to assets, staff, guests and players while within the physical venue 104.

Once the mobile device 112 has been identified, a login session may be initiated. The login session may be automatic in that the user of the mobile device 112 is not required to acknowledge a service access agreement. Alternatively, the login session may be acknowledgement-based, requiring the user of the mobile device 112 to acknowledge a service access agreement (e.g., selecting an "OK" button on a notification window, or the like). In yet another embodiment, the login session may be multi-factor, requiring the user of the mobile device 112 to provide further authenticating information prior to login.

After a login session has been initiated, the mobile device 112 may request the one or more master sensor nodes 102 or the one or more sensors 108 to authenticate the identity and the location of the mobile device 112 to a third party service provider 118, such as, for example, a hotel property management system, a restaurant reservation system, an e-commerce service, a streaming media service, or a web-based regulated gaming service. The third party service provider 118 may be connected to the radio frequency network channel 114.

The one or more master sensor nodes 102 or the one or more sensors 108 may authenticate the mobile device 112 to the third party service provider 118. In this case, the one or more master sensor nodes 102 or the one or more sensors 108 are operating like an identity access management (IAM) function providing multi-factor authenticated access to the service 118 by using the mobile device 112 as a multi-factor authentication device or token. The third party service provider 118 may receive authentication of the mobile device 112 and provide the mobile device 112 access to a network connection 120 associated with the third party service provider 118 (e.g., Ethernet, Wi-Fi, cellular, etc.).

The one or more master sensor nodes 102 or the one or more sensors 108 may be geodetically positioned through a calibration process by one or a combination of one or more of the following methods: (1) calibrated device position cloning from other sensors, (2) GPS satellite positioning, (3) indoor positioning algorithms, (4) physical address geocoding, (5) physical property surveying techniques, (7) using Google Earth or maps, (6) using high accuracy positioning technologies such as Ultra Wide Band (UWB) or (6) other manual methods.

Figure 3:
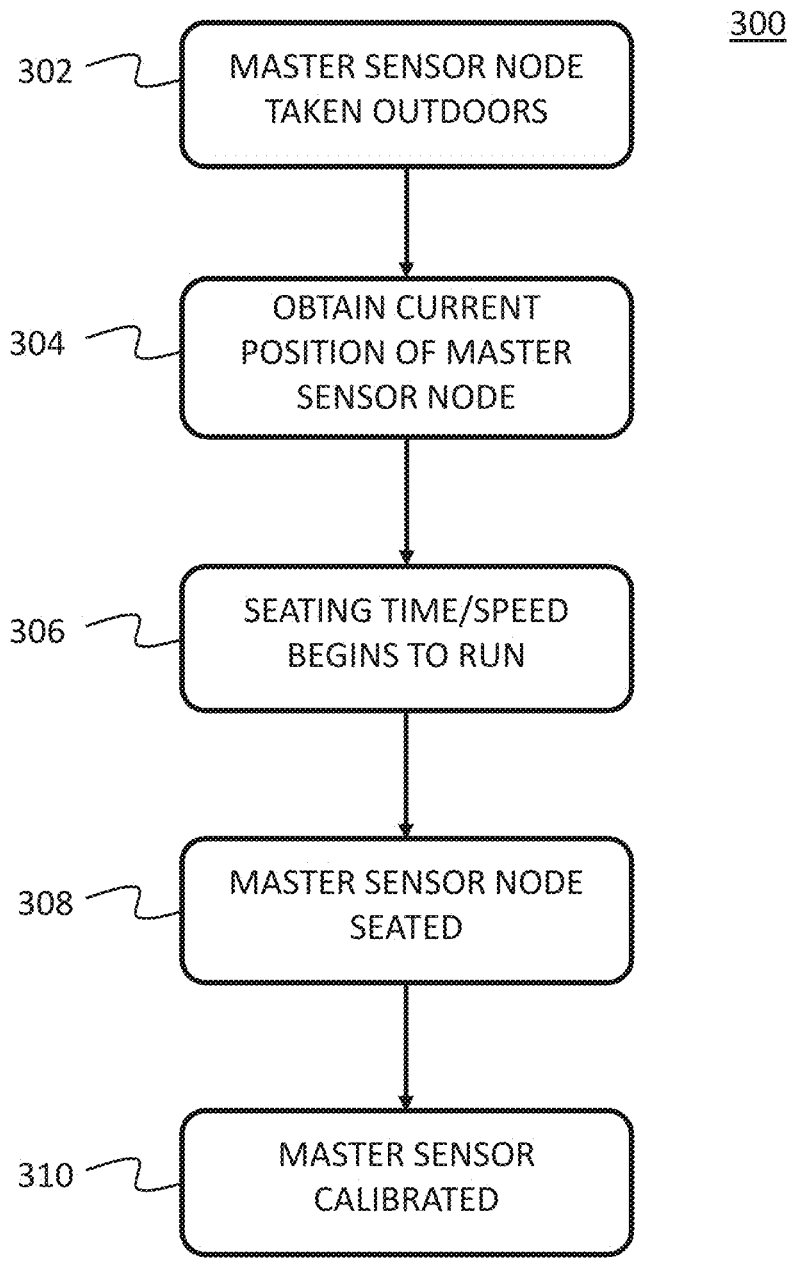
FIG. 3 illustrates a flowchart of a calibration method that may be used with the system of FIG. 1.

Referring now to FIG. 3, a flowchart of a calibration method 300 that may be used with the system of FIG. 1 and the master sensor node of FIG. 2 is shown. At a first step 302, a master sensor node may be taken outdoors within line of sight of GPS satellites (i.e., in an area free of obstructions, such as trees). At a second step 304, a user performs an action such as pushing a calibration button, or connecting through a mobile phone, to obtain a current position of the master sensor node via GPS. Alternatively, the user may manually input the coordinates of the master sensor node (e.g., latitude and longitude coordinates) or a physical address where the master sensor node is located. At a third step 306, once the current position is received, the service profile will allow a predetermined amount of time (e.g., two minutes) to seat the master sensor node in a stationary position in a network (e.g., indoors connected to a router), and/or, where motion may apply, wirelessly coupled to another master sensor node where one or more of the master sensor nodes are continuously connected through GPS and at least one of the master sensor modes is bolted to the venue (e.g., in a vehicle, in a ship, in an airplane, in a space craft). At a fourth step 308, the user will seat the master sensor node. At a fifth step 310, the master sensor node will calibrate and be ready for operation. The master sensor node will continue to operate with a calibrated status as long as it is not moved from the stationary position (for indoor use) or able to obtain a GPS fix at a point of authentication (for moving vehicles, ships or crafts).

Figure 4:
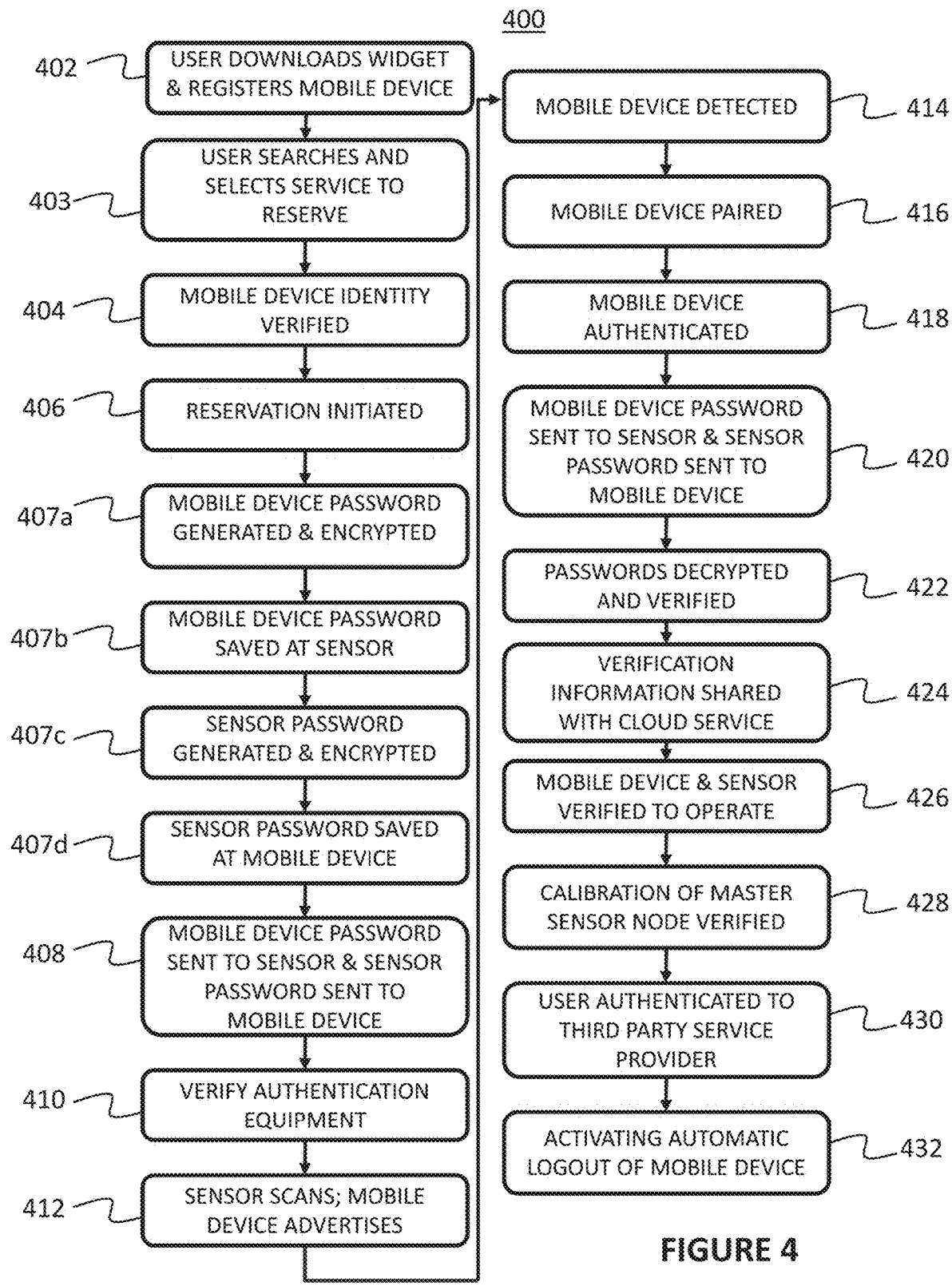
FIG. 4 illustrates a flowchart of a method for identification, location, and authentication of a mobile device that may be used with the system of FIG. 1.

Referring now to FIG. 4, a flowchart of a method 400 for identification, location, and authentication of a mobile device that may be used with the system of FIG. 1 is shown. At step 402, a user of a mobile device downloads a client widget and registers a mobile device key through a system cloud registration service. At step 403, the user searches and selects a service to reserve. At step 404, the system cloud service acts as a third party certificate authority to provide a verification of identity during a sensor node queuing session, reservation, or other transaction process using the mobile device key. At step 406, the user may initiate a queuing session or reservation with a master sensor node through a queuing or reservation system. At step 407a, the mobile device may have a known reusable key, pin, password or passphrase or may optionally create a unique, one-time password, or identity key, either of which may be encrypted. The one-time password, or identity key may be generated using known methods, such as a random number generator, or may be generated using a plurality of methods, such as a combination of known identifiers, such as a mobile device key, UUID or MAC address, and unknown identifiers that may be dynamically generated, such as absolute locations or timestamps, which may be delivered to the master sensor node. At step 407b, the master sensor node, or at least one of a plurality of sensors, may store the mobile device password and optionally use it for other purposes such as to represent a reservation number or queuing number or similar and that may be shared with other systems. At step 407c, the master sensor node may have a known reusable key, pin, password or passphrase or may optionally create a unique, one-time password, or identity key, either of which may be encrypted. The one-time password, or identity key may be generated using known methods, such as a random number generator, or may be generated or may be generated using a plurality of methods, such as a combination of known identifiers, such as a mobile device key, UUID or MAC address, and unknown identifiers that may be dynamically generated, such as absolute locations or timestamps which may be delivered to the master sensor node or at least one of a plurality of sensors. At step 407d, the mobile device may store the sensor password or identity key and optionally may use it for other purposes such as to represent a reservation number or queuing number or a ticket or a coupon or similar and that may be shared with other systems. At step 408, the reservation or queuing system may communicate with a sensor in communication with the master sensor node targeted by the mobile device to request a unique password or identity key from the sensor, or optionally generate one for the sensor, which may be used to represent a queuing number or reservation number or ticket or similar, to share with the mobile device, while simultaneously sharing the mobile device password or identity key, which may be used to represent a unique reservation number or queuing number or similar with the sensor.

It is envisioned that "nested" reservations may be made, such that a user could potentially plan out an entire day or evening with several back-to-back reservations at different venues. For instance, the first reservation may be for a dinner table, a second reservation for a vehicle to transport users from dinner to a movie theater, a third reservation at the movie theater, and so on. Those venues might communicate with one another to help the venues determine when a user will arrive. For instance, if the user is running late at dinner, the restaurant may notify the vehicle to delay the pick-up time (e.g., push the reservation 20 minutes). If a user finds a better deal at a different venue or changes his mind about a reservation, the system may automatically cancel an existing reservation in order to allow the user to make an alternate reservation.

Once the user is on or within range of a property associated with the master sensor node, at step 410, the reservation system verifies that the master sensor node is equipped with the resources, software or service profile(s) necessary to authenticate the mobile device, and verifies that the mobile device is equipped with the necessary resources, software or service profile(s) to authenticate the master sensor node. At step 412, the master sensor node or one or more plurality of sensors begins to scan for radiofrequency frames, while the mobile device advertises (or vice versa). At step 414, the sensor node detects the mobile device. At step 416, wireless pairing of the mobile device and sensor occurs automatically. At step 418, wireless authentication of the mobile device occurs automatically. At step 420, the mobile device shares the unique, one-time password, or identity key, originally generated by and received from the master sensor node or the one or more sensors. The master sensor node or at least one plurality of sensors, optionally decrypts the password or identity key and verifies it is the master sensor node or the one or more sensors unique password or identity key that was sent to the mobile device, while simultaneously the mobile device shares the password or identity key it received from the master sensor node or the one or more sensors, with the sensor, which in turn optionally decrypts and verifies the password or identity key belongs to the sensor. The exchange of passwords between the mobile device and the master node sensor or one or more sensors may be accomplished using a local wireless interface, such as Bluetooth or Wi-Fi. Only the originating device has the private key to decrypt the encrypted one-time passwords.

At step 422, the master sensor node or the one or more sensors and the mobile device each decrypt and verify the password sent to each other. At step 424, the master sensor node and the mobile device each share the verification information through their respective networks (i.e., the master sensor node shares through a broadband network and the mobile device through a cellular network) to the system cloud service. At step 426, the system cloud service informs both the master sensor node and the mobile device that they are verified to operate.

At step 428, the reservation system receives identity and location calibration verification from the master sensor node or the one or more sensors indicating that the master sensor node has not been moved or tampered with. At step 430, the system cloud service authenticates the user and the absolute location of the mobile device to a third party service provider.

At step 432, an automatic logout may be activated. The automatic logout may occur due to a variety of activities, including, for example, when the user/mobile device moves outside the sensor's range, when the radio frequency radio on either the mobile device or the master sensor node is turned off, or when a predetermined logout time has been reached.

The following non-limiting industrial applications are envisioned, although it will be apparent to those skilled in the art that many other applications are possible across a wide variety of industries:

Online Gaming:

It is envisioned that the systems and methods of the present invention may be useful for online regulated gaming. For instance, users may engage in online gaming from their homes or from hotel guest rooms. A master sensor node may be linked to a home or guest network. After proper calibration of the master sensor node, an accurate geo-fence may be established within local wireless reach of the master sensor node's radio frequency land connection when a user's mobile device is connected to the system during service authentication and location validation.

Online CNP Transactions: Where proof of identity has been provided to a registration authority, the system of the present invention may be used to authenticate card-not-present (CNP) payment transactions. Because more accurate factors (e.g., biometric data) may be used for authentication in the system of the present invention, the authentication may be more accurate than traditional physical retail payment using a credit card and photo ID card, which may ultimately reduce interchange fee charges. Online malware and identity theft risk can be reduced by insuring a mobile device is within the transactional venue.

Transportation Verification: The system of the present invention may be used to authenticate a user's mobile device to a transportation service provider, such as a taxi, rideshare, or public transit driver, and vice versa. Two-way authentication and location verification may provide greater security to both the driver and the rider.

Physical Venue Check-in: The present invention may be used at physical retail venue entrances and key zones of interest to allow a service provider of a physical venue (e.g., a restaurant, hotel, or retail store) to check a user into a guest room, a table, or provide coupons, or loyalty points, or benefits to the user upon arrival at the venue. Further, the geo-location technology may allow a service provider to offer or deliver services to a user within the physical venue (e.g., delivering a drink, or streaming or downloading a game, movie or music upon request by the user).

Remote Reservation: The present invention may be used to allow a user of a mobile device to make a remote reservation with a service provider by utilizing the two-way exchange of device keys over a shared network.

Zero-Wait Publishing, Searching, and Queuing Systems and Methods

The zero-wait publishing, searching, and queuing systems and methods disclosed herein may integrate sensor and actuator node technology (for instance, the identification, location, and authentication systems and methods) with physical venue systems to allow mobile devices to search relevant offers, make remote reservations, and set up remote wireless queuing sessions with physical venues (e.g., reserving a guest room or table). The systems and methods enable a user of a mobile device to search, connect, and engage with a physical venue (e.g., a hotel, restaurant, casino or retail) or a vehicle (e.g., a taxi, bus, private limo service, or rideshare service). The systems and methods may also allow a user to search for a service category (e.g., coffee, gas, spa or bowling), or an activity (e.g., football, live band, party or parade) similar to a web browser search but with location central to the search. The systems and methods may additionally offer subscription services to push offers and deals to mobile devices. Furthermore, the systems and methods may provide reservation, queuing, check-in, check-out, engagement, and transactions services to users, without incurring wait time or added costs associated with traditional queue-based venue services, such as standing in lines.

The system differs from a web browser search by including the absolute location (e.g., latitude and longitude coordinates, established by standard positioning methods such as GPS, IPS or INS), of a service, activity, property, or vehicle, as a primary search attribute. Therefore, users can view physical venues dynamically and information about associated services, such as current wait times, crowdedness, seating availability and service duration can be established at a glance. Moreover, by broadcasting a mobile device user's current position to a physical venue, a virtual queuing service may be established that guarantees the user's reservation, provides estimated time of arrival (ETA) feedback to the venue, which may reduce the customer churn rate, and eliminates waiting once the user arrives at the physical venue.

The systems and methods utilize a distributed cloud architecture built on industry standards, such as service-oriented architecture (SOA), microservices architecture, software-defined architecture (SDA) and mobile backend as a service (MBaaS) design principals for cloud interoperability, scalability and reliability. The systems and methods also leverage an API management framework and gateway to ensure all devices and services may integrate through standard API communications. This allows dynamic, real-time access to data, code, and services without the need for redesign or modification of business logic. The mobile device user downloads a native mobile widget that is used to initiate searches and communicate schedules, events, and notifications between the user and the service provider through loose integration of cloud services and management software.

Figure 5:
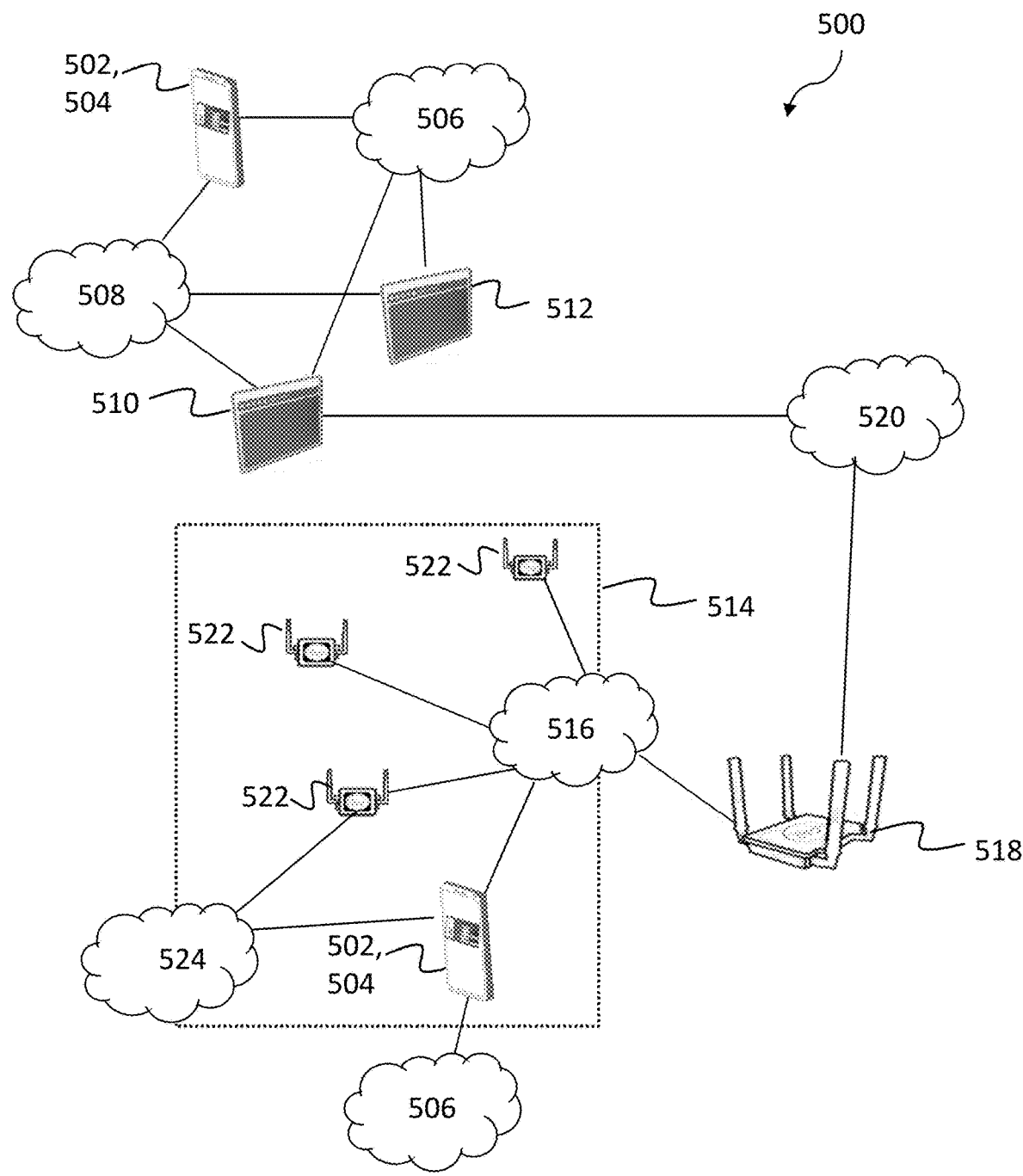
FIG. 5 illustrates the architecture of a zero-wait publishing, searching, and queuing system, according to one embodiment of the present invention.

Referring now to FIG. 5, the architecture of a zero-wait publishing, searching, and queuing system 500 is shown. A local retail service engagement application 502 is installed on a mobile device 504. The mobile device 504 is connected to a cellular network channel 506. The local retail service engagement application 502 may transmit a search request for a service over a radio frequency network channel 508 (while searching a deal offer, making a reservation and queuing on property over LAN, e.g., at a casino resort) or a cellular network channel 506 (while searching a deal offer, making a reservation, and queuing remotely over cellular, e.g., at a casino resort) to at least one service provider system 510. The local retail service engagement application 502 may receive data associated with a service provider from the at least one service provider system 510 in response to the search request. The local retail service engagement application 502 may transmit a request for a reservation with the service provider and receive a confirmation of the reservation from the service provider system 510.

The local retail service engagement application 502 may transmit a queue request to a queuing system 512 over the radio frequency network channel 508 or over the cellular network channel 506, and receive a confirmation of the queue request from the queuing system 512.

The local retail service engagement application 502 may determine a physical location of the mobile device 504, calculate a distance between the mobile device 504 and a physical venue 514 associated with the service provider, and transmit an estimated arrival time at one or more predefined distance or time intervals while the mobile device 504 is in transit to the physical venue 514. The local retail service engagement application 502 may include one or more search and service discovery views, switchable by touch and/or motion by the user of the mobile device 504.

When the mobile device 504 arrives at the physical venue 514, the queuing system 512 may transmit a request to the local retail service engagement application 502 to activate a local radio frequency network channel 516 or a local radio frequency network channel 524 on the mobile device 504. The queuing system 512 may transmit a request to search for the mobile device 504 through the local radio frequency network channel 516 or through a local radio frequency network channel 524. A master sensor node 518 may be connected to a broadband network channel 520, wherein the service provider is simultaneously connected to the broadband network channel 520. A plurality of sensors 522 may be located in the physical venue 514. The plurality of sensors 522 may be in communication with the master sensor node 518 over a wireless network channel, such as local radiofrequency network channel 516, the plurality of sensors 522 and the master sensor node 518 may be communicatively coupled to the mobile device 504 over the local radiofrequency network channel 516 when the mobile device 504 is present at the physical venue 514. Alternatively, the plurality of sensors 522 may be communicatively coupled to the mobile 504 over the local radio frequency network channel 524 when the mobile device 504 is present at the physical venue 514. The plurality of sensors may be in communication with the master sensor node 518 over a wireless network channel, such as local radiofrequency network channel 516. In this case, the plurality of sensors 522 may provide a communications gateway or bridge between the mobile device 504 and the master sensor node 518.

The master sensor node 518 or at least one of the plurality of sensors 522 identifies the mobile device 504 and a relative location of the mobile device 504 within a predetermined range of at least one of the plurality of sensors 522 or the master sensor node 518 and authenticates the identity and relative location of the mobile device 504 to the at least one service provider system 510. The at least one service provider system 510 receives authentication and the relative location of the mobile device 504 and retrieves the reservation.

Figure 6:
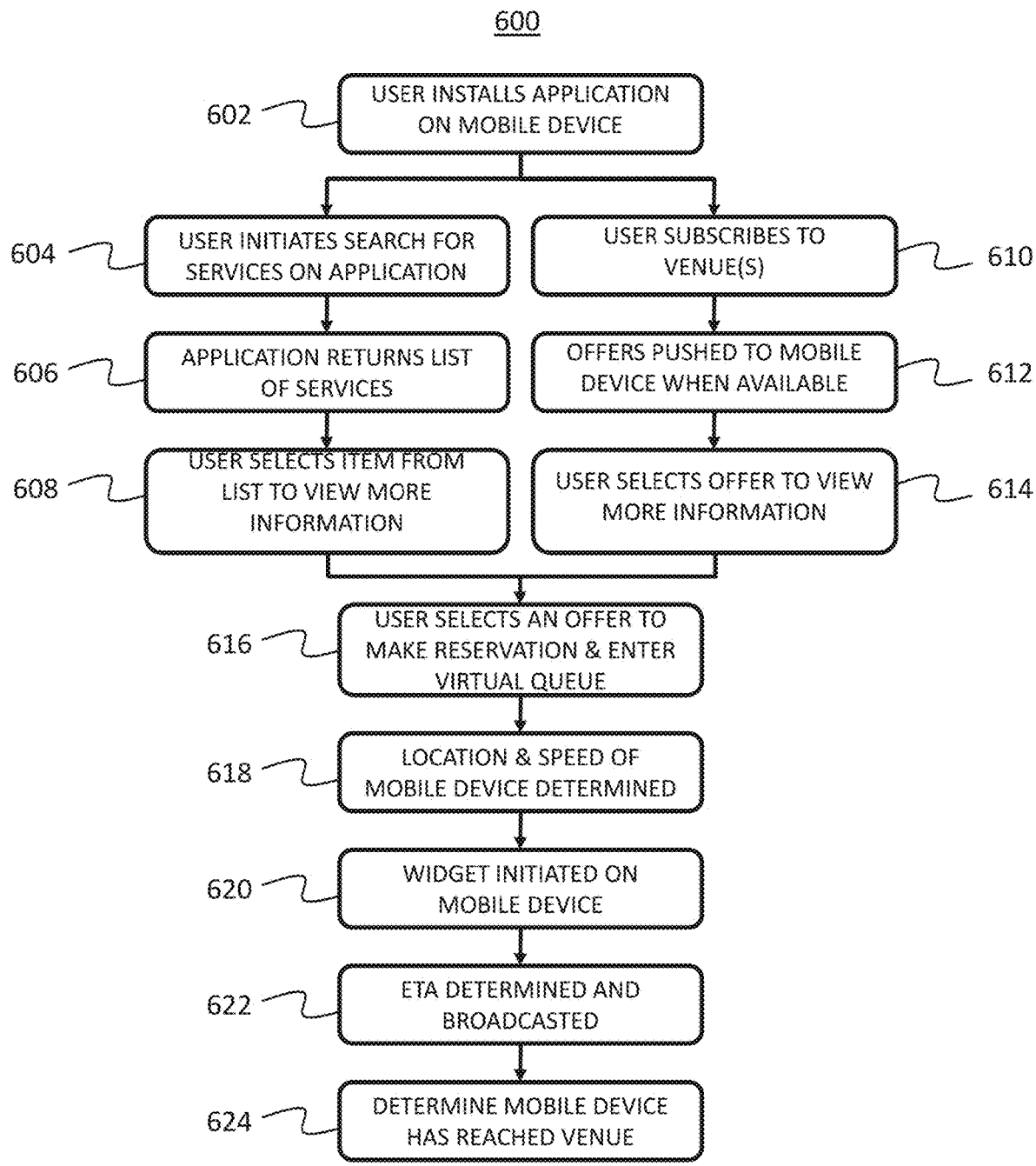
FIG. 6 illustrates a flowchart of a remote reservation and queuing method, according to one embodiment of the present invention.
Figure 7:
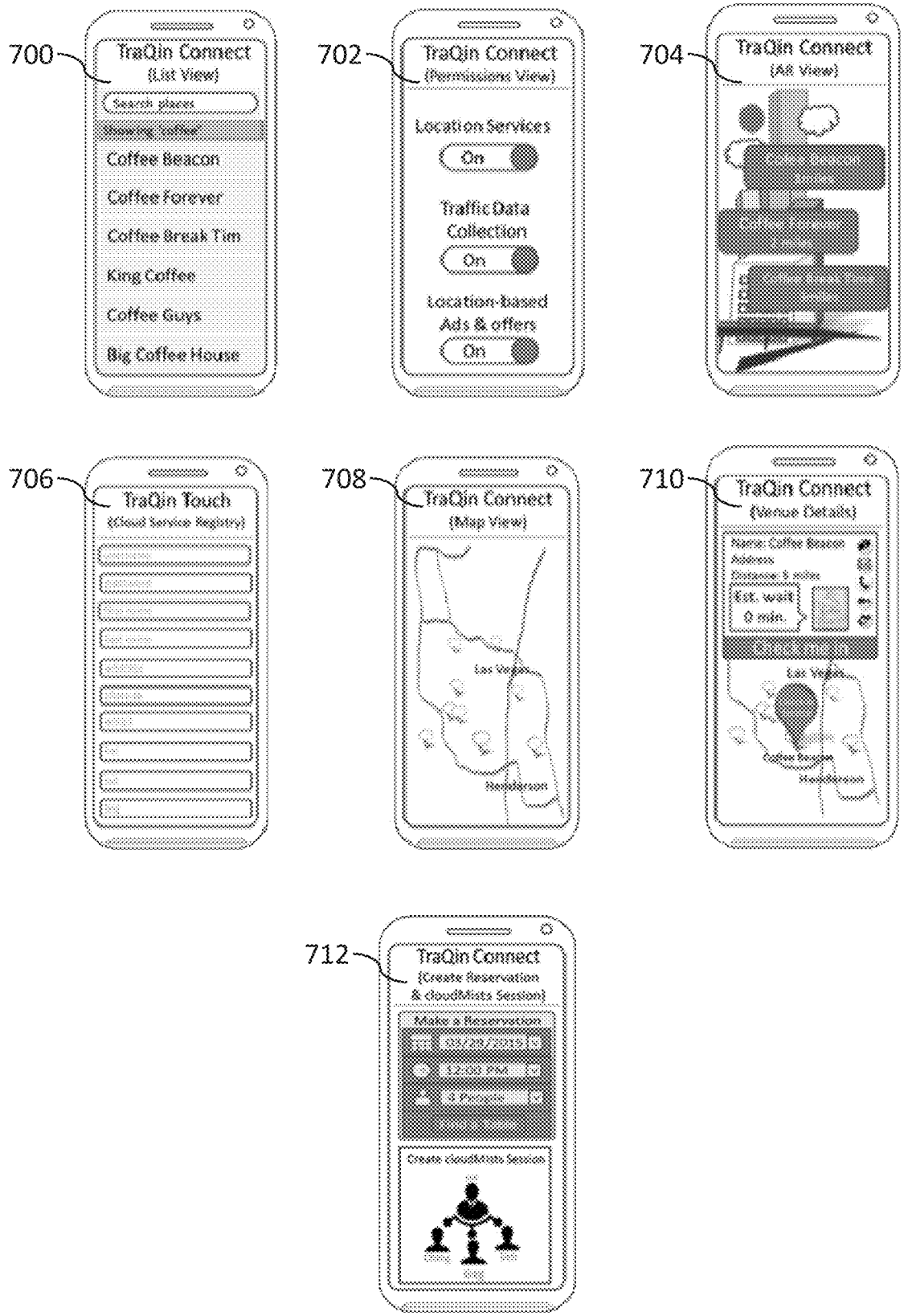
FIG. 7 shows exemplary user interfaces illustrating the steps of FIG. 6.

Referring now to FIG. 6-7, a flowchart of a remote reservation and queuing method 600 is shown, and FIG. 7 shows exemplary user interfaces illustrating the steps of FIG. 6.

At step 602, a user of a mobile device may install a local retail service engagement application on the mobile device. At step 604, the user may use the local retail service engagement application to initiate a search for a service or venue by category and/or location (interface 700). For instance, the user may optionally set a preferred city of interest, or distance from the user's current location, as a search parameter. A venue category may include, for instance, hotels, casinos, restaurants, bars, grocery stores, gas stations, and the like. A service category may include, for instance, shopping, gaming, bowling, and the like. Additional search parameters, filters, permissions, and user preferences may be set and modified by the user via the local retail service engagement application (interface 702).

At step 606, the local retail service engagement application may return a list of services and/or venues to the mobile device for viewing by the user based on the user's search. In one embodiment of the present invention, the user may view the list through an augmented reality (AR) camera view to gain a perspective of locations and directions to/from a venue or service provider, and to better determine costs, timing and relevance of the items on the list (interface 704). Alternatively, the list may be presented in a list view (interface 700) or a map view (interface 708).

At step 608, the user may select an item from the list to see further information about the item, such as deals, offers, or coupons available or services offered at a particular venue (interface 710).

In an alternate embodiment of the present invention, instead of a search request, at step 610, the user may subscribe to selected venue(s) by providing the user's contact information. At step 612, periodically (such as at predetermined intervals) or as deals, offers, or services become available at the selected venue(s), they may be pushed automatically to the subscribed user(s) via the local retail service engagement application. At step 614, the user may select an offer to see further information about the offer on the mobile device.

Whether the user performed a search ("pulled" offers) or subscribed ("pushed" offers), the user may select an offer to make a reservation with a venue or service provider and enter a virtual queue at step 616 (interface 712).

At step 618, the absolute location, speed of travel and estimated time of arrival (ETA) of the mobile device are determined via available geolocation technologies such as GPS, cellular ID, mobile motion sensors, inertial navigation, and APIs.

Figure 8:
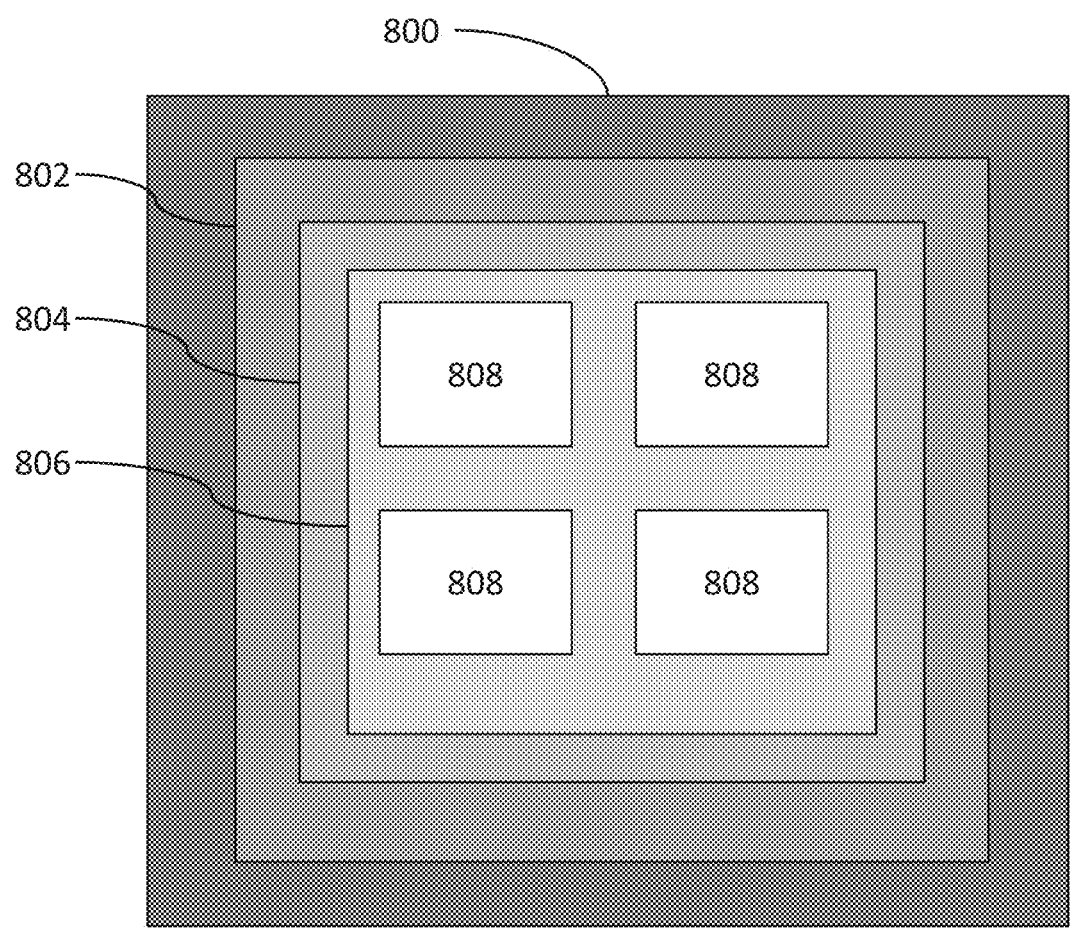
FIG. 8 illustrates the architecture of an exemplary mobile device, according to one embodiment of the present invention.

At step 620, while the user in en route to the venue or service provider location, a notification widget may be initiated on the mobile device. The notification widget serves two primary purposes. First, the notification widget navigates and directs the mobile device to the venue or service provider location (see step 622). Second, the notification widget initiates check-in and local service activation once the mobile device reaches the venue or service provider location (see step 624). The notification widget may also facilitate communication and notifications between the venue/service provider and the mobile device. While in the Queue, the notification widget may also facilitate communications between competing service providers and the mobile device, through the use of filters and broadcast notifications, to create a hyper-relevant mobile consumer value proposition between the mobile device user and the competing service providers which may result in the mobile device user receiving more competitive offers. Competing providers may choose to enter service and price bids allowing the service providers to enter an auction, thus creating an atmosphere for better service, efficiencies and prices Referring now to FIG. 8, the architecture of an exemplary mobile device 800 is shown. Residing on mobile device 800 is an operating system 802. Operating system 802 may be independent of mobile device 800, but may access mobile device 800 sensor and communications resources (e.g., through an API). Operating system 802 includes several layers, including: (1) a cloud services management layer, which handles reservations, queuing, identity and communications; (2) an external data API aggregation management layer, which provides property, service, context and demographic information to a decision engine; (3) a mobile device inertial navigation system (INS) aggregation management layer, which provides dynamic real-time inertial sensor data to the decision engine for filtering; (4) the decision engine, which provides search functions, filters, and notifications logic, and which can autonomously make decisions, such as navigation, way-finding, and recommendations; and (5) a master sensor node connection and communications layer, which provides proximity tracking, presence awareness, mobile device and user authentication, local communications, content delivery, and check-in services.

The cloud services management layer may include a cloud services management application, which provides city/global network and cloud-level management services for mobile devices and master node sensor service reservations and queuing engagements. The cloud services management application may manage a number of databases, including: a node network spatial database, a user and node account database, a remote/local node and device authentication database, an IoT sensor/actuator node publish/subscribe content database, an IoT sensor/actuator node service profiles database, and a deals/services mobile application and HTML5 forms/pages database.

The master sensor node connection and communications layer may include a node management, asset and logistics services application, which may be a venue/local node(s) and venue location related services delivery and management platform. The node management application may handle all direct communications between IoT sensor/actuator nodes and mobile device applications locally, as well as indirect communications with mobile devices operating remotely through the cloud management application.

The node management application may be activated by one of the following conditions: (1) a mobile device remotely requests access to a node and/or its services through the cloud management application; (2) an IoT sensor/actuator node requests authentication of a mobile device locally or gains access to a service profile to provide service to a mobile device locally (e.g., by Bluetooth, Wi-Fi, etc.); (3) the cloud management application requests key exchange for pairing, bonding, or local service profile assignment between a node and a mobile device remotely; or (4) an operator, service management application, or third party application requests access to manage, calibrate, or control the node(s), network, databases or services either directly through a monitoring or management user interface or indirectly through a service API.

Referring again to FIG. 8, operating system 802 hosts a hybrid mobile application 804. Hybrid mobile application 804 includes the notification widget 806, which provides service status, metering, notifications, and communications.

Figure 9:
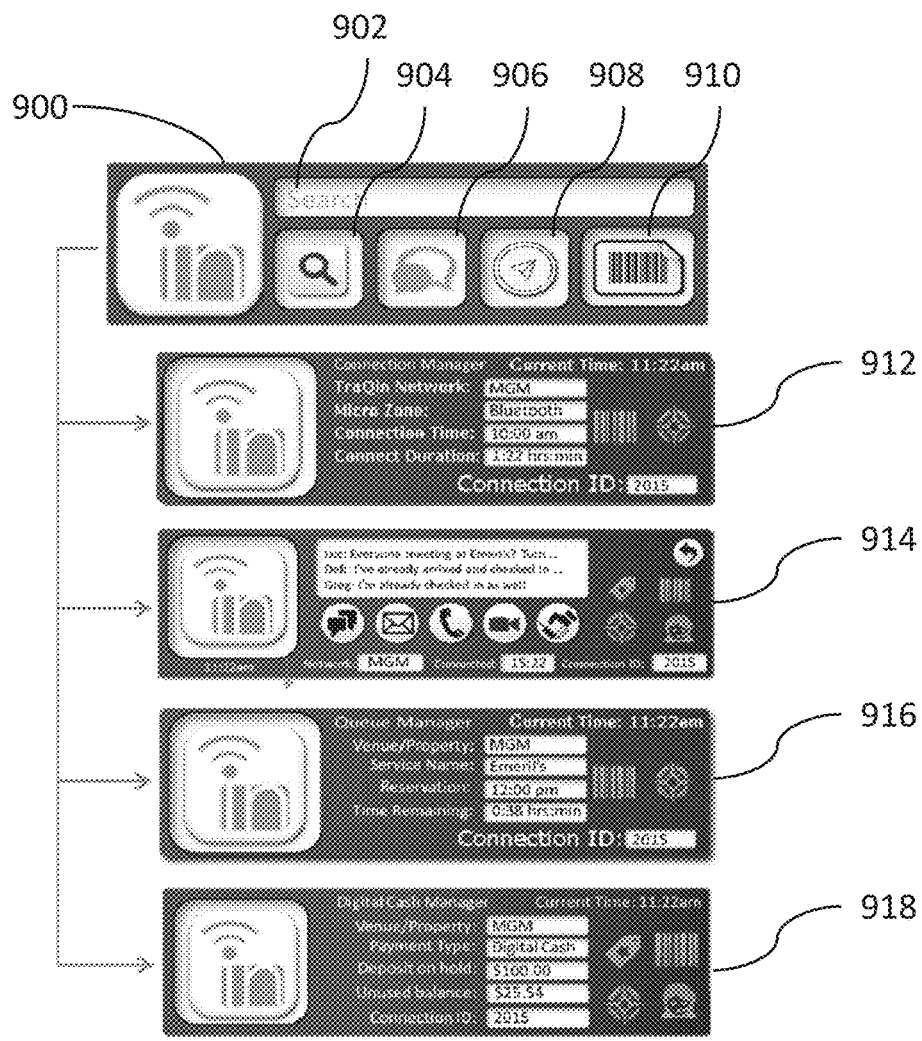
FIG. 9 illustrates an exemplary notification widget, according to one embodiment of the present invention.

Referring now to FIG. 9, an exemplary notification widget 806 is shown. Notification widget 806 includes an inactive mode 900, which may provide several quick-launch buttons which may include: venue search button 902, reservations and queuing button 904, secure chat button 906, venue navigation button 908, and deal/payment button 910.

A venue connection mode 912 shows services that may be provided via widget 806 when the mobile device is present at the venue or service provider location, including presentation of deals/offers, check-in, queuing, and status updates.

A collaboration mode 914 shows mobile-to-mobile services that may be provided via widget 806, including "follow me" notifications, instant messaging, and group chats.

A queuing mode 916 shows queuing services that may be provided via widget 806, including virtual queuing, ETA broadcasting, and status updates.

A transaction mode 918 shows digital payment services that may be provided via widget 806, including loading money, viewing balances, making payments, cashing out, and payment or transaction history.

Referring again to FIG. 8, stacks of HTML5 pages 808 may be launched by the notification widget 806 to aggregate data and control dynamic services relating to that data. The data may come from multiple sources, including service APIs (e.g., Google Geolocation API, Foursquare or other reservation server, and the like), HTML5 user interfaces (e.g., menus, navigation, ordering forms, etc.), IoT sensor/actuator (e.g., proximity or environmental control sensors), a mobile device on-board sensor (e.g., GPS, INS, or MEMS) and consumer engagement applications.

The result is that the internal details of a service are isolated from the user experience, allowing modification or replacement of the application code without affecting the end user. This creates a distributed computing architecture servicing two sets of APIs: external APIs for consumers and internal APIs for service providers. The internal APIs define a system's organization using management modules. The external APIs make the internal APIs more easily and safely consumable by various external services and present a simplified view of the operating system 802, optimized for network communications over long distances.

Referring again to FIG. 6, at step 622, an estimated time of arrival (ETA) of the user at the venue or service provider is determined and broadcasted to the venue or service provider via the notification widget. In one embodiment of the present invention, the ETA may be updated (periodically or in real-time) based on changes to the location and/or speed of travel of the mobile device, and the updated ETA may be broadcasted to the venue or service provider. Simultaneously, the notification widget may allow the user to view information from the mobile device regarding the reservation and virtual queue, such as venue maps, virtual queue status and updates thereto, notifications, group reservation information, ETA status, and check-in information.

At step 624, the notification widget may determine that the mobile device has reached the venue or service provider location using GPS, cellular identification, or other WAN method. The venue or service provider may set a range or threshold such that once the mobile device reaches the threshold or enters the range, the mobile device will be considered to have arrived at the venue or service provider location. The notification widget will then turn on necessary local LAN radio, such as Bluetooth or Wi-Fi, and initiate either a scan or advertisement beacon necessary to find or be found by a master sensor node or at least one of the plurality of sensors at the venue or service provider location.

Figure 10:
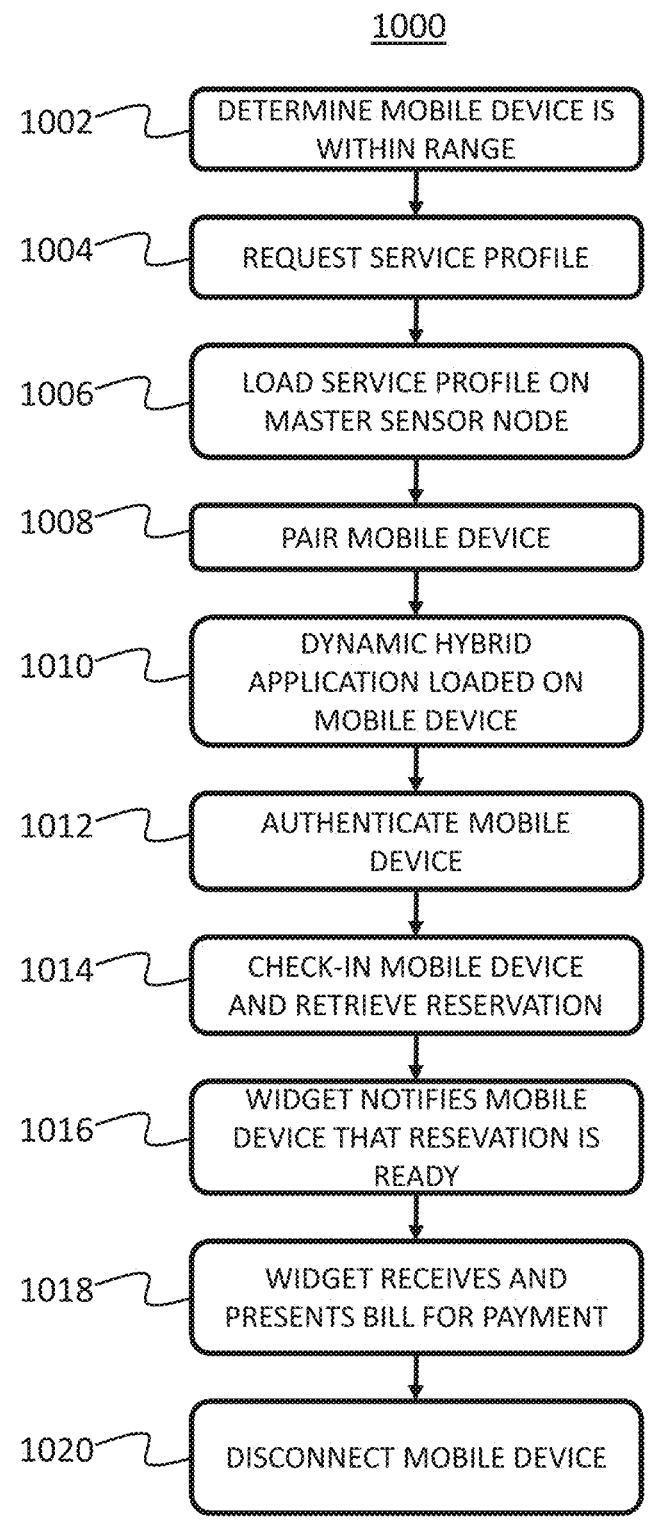
FIG. 10 illustrates a flowchart of a local venue check-in, reservation redemption, and transaction method, according to one embodiment of the present invention.
Figure 11:
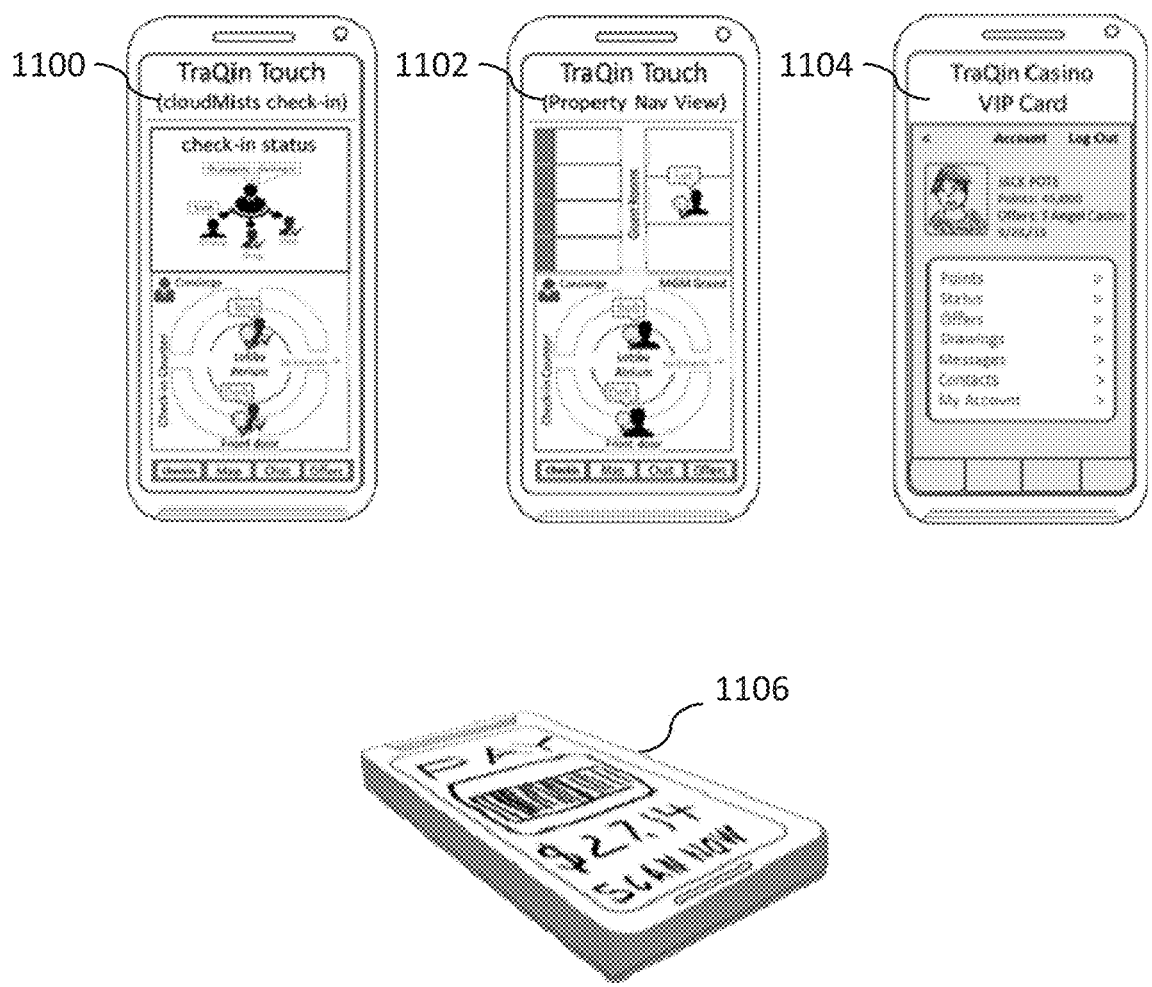
FIG. 11 shows exemplary user interfaces illustrating the steps of FIG. 10.

Referring now to FIG. 10-11, a flowchart of a local venue check-in, reservation redemption, and transaction method 1000 is shown, and FIG. 11 shows exemplary user interfaces illustrating the steps of FIG. 10.

At step 1002, a services management system may determine that a mobile device is within a WLAN or WPAN radio frequency range. At step 1004, a services management system may transmit a request to a master sensor node management server to obtain an appropriate operational service profile. At step 1006, the services management system may load the service profile on the master sensor node or at least of the plurality of sensors. At step 1008, the mobile device may be automatically paired with the master sensor node.

At step 1010, the services management system may load a dynamic hybrid application, such as HTML5 code, on the mobile device to allow the mobile device to access and manage selected service profiles while the mobile device is present at the venue or service provider location. At step 1012, the mobile device may be authenticated by an authentication profile, such as the one disclosed above.

At step 1014, the services management system may check the mobile device into the venue or service provider location and retrieve the reservation (interface 1100). At this point, all services, such as offers, in-door navigation or wayfinding, order menus, payment and server communications may be delivered by a third party or the services management system in the form of dynamic interactive web app pages, such as those provided by HTML5, and made available to the mobile device on the dynamic hybrid application, either through a secondary radio channel, such as Wi-Fi or Bluetooth, or through a cellular channel.

Once the mobile device is checked into and engaged with the venue or the service provider, the notification widget may update its status to "connected" and may track relevant information, such as a network type (e.g., Bluetooth, Wi-Fi, cellular), a connection type (e.g., private network, public network, private collaboration), a connection duration (e.g., hours and minutes), a name of venue or service provider, and a service mode (e.g., single, group, community) and the like. So long as the mobile device is physically present and the network is active and operational on the mobile device, the status will remain "connected". Services provided to connected users may include, for example, product and service discounts and offers, collaboration with staff for assistance, communications with friends, family and colleagues, placing orders, in-app purchases, on-line purchases, in-store pickups, appointments, reservations, scanning prices, and mobile assisted in-store retail purchases.

At step 1016, the notification widget sends a notification to the mobile device that a reservation is ready for the user (e.g., a table, a guest room, or the like). A navigation map may be displayed so the user can self-navigate to a location associated with the reservation within the venue (interface 1102). In one embodiment, where the reservation is a reserved table, menu, ordering, and payment pages may be displayed on the mobile device to allow for waiter-less ordering by the user. In some embodiments, after the mobile device is checked in, a mobile guest room key or gaming VIP card may be accessible via the mobile device by the user (interface 1104). The notification widget may be updated to provide a connection status, a session ID, and event notification services.

At step 1018, when a service is complete, the notification widget may receive and present a bill for payment by the user. The user may be able to make a mobile payment, such as by a bar code scan payment, a near-field communication (NFC) payment, a wireless network channel assisted payment using at least one of the plurality of sensors or a master sensor node, or the like (interface 1106). A receipt may be generated and presented on the mobile device.

At step 1020, the mobile device is automatically disconnected from the network when the mobile device moves outside of the WLAN or WPAN radio frequency range. The disconnected state, or "in-touch" state, which enables remote internet communications, allows direct communications between the venue/service provider and the mobile device based on filtered service selections. In-touch mode provides relevant deals and offers while the mobile device is physically away from and not engaged with the venue or service provider, and has no active service reservations. The filtering service is designed to allow non-invasive and relevant notifications to the mobile device that escalate naturally with personal or professional relevance. For instance, a user may be in the vicinity of a venue or service provider for an unrelated reason but may be interested to know what deals or offers are available in the area and set a filter appropriately.

In another embodiment, the mobile device may be automatically checked out based on a predefined schedule, user induced software logout or other criteria.

In yet another embodiment of the present invention, live chat and mobile commerce services are delivered throughout the zero-wait systems and methods, including group collaboration, and notification services. While on property, geo-fenced location sensitive content delivery, location sensitive media streaming and private collaborations may be authenticated and delivered locally over a local area network (e.g. Wi-Fi, Bluetooth, etc.).

Search & Subscribe Advertising System & Methods

In some embodiments of the present invention, improved advertisement systems and methods are disclosed to allow remote search and connection with content being delivered via digital signage to increase return on investment. An advertisement system includes a master sensor node, which may be connected to a venue or other service provider location. The master sensor node acts as a virtual point of presence, exposing its identity and absolute location (e.g., latitude and longitude coordinates) to users of mobile devices desiring specific services within a certain locality. The advertisement system may publish deals/offers, product content, and interactive property services, such as check-in, reservations, menus, and ordering information to mobile devices physically present at the venue or service provider location. The advertisements may be published in response to a search by a user on a mobile device ("pulled" advertisements), or they may be published to local or remote users who have subscribed to receive such advertisements via their mobile devices ("pushed" advertisements). This type of connectivity between a service provider and mobile device users allows the service provider to create its own service broadcasting "channel", much like a YouTube™ channel, but further including a feedback function by providing dialog connection with the mobile device (e.g., instant messaging, live chat, phone, e-mail, video conferencing, etc.). An important difference between traditional advertising and the system of the present invention is that in the present invention, the mobile device operates as a private signage monitor, which allows the advertisement(s) to reach a much wider audience (e.g., throughout a city or metropolitan area) than traditional digital signage may reach.

Figure 12:
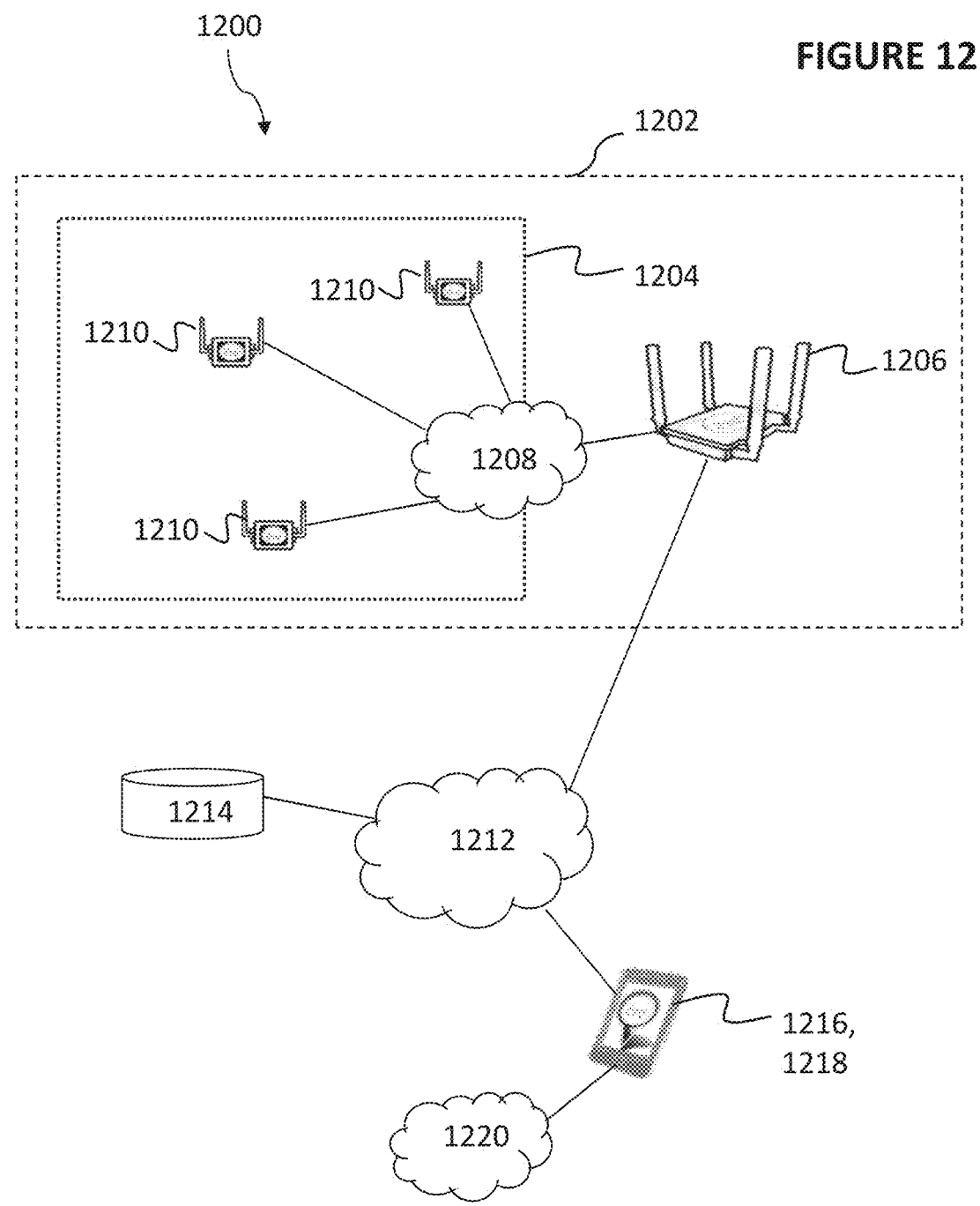
FIG. 12 illustrates an advertisement system, according to one embodiment of the present invention.

Referring now to FIG. 12, an advertisement system 1200 is disclosed. The system 1200 may include at least one identification, location and authentication system 1202 associated with a physical venue 1204. Each of the at least one identification, location and authentication systems 1202 may include a master sensor node 1206 connected to a broadband or wireless local area network channel 1208, and a plurality of sensors 1210 in the physical venue 1204. The plurality of sensors 1210 may be in communication with the master sensor node 1206 over the broadband or wireless local area network channel 1208.

The master node 1206 or each of the plurality of sensors 1210 may be a physical IoT sensor/actuator node that may be installed in an area that typically hosts traditional digital signage display. Like traditional digital signage, the master node 1206 and the plurality of sensors 1210 may target an audience of a certain demographic with focused content associated with the physical venue and its associated services, such as zero-wait queuing or table reservations. A call to action may be included in the published advertisement(s) by the master node 1206 or the plurality of sensors 1210 that encourages a specific engagement or behavior by the user.

Unlike traditional digital signage, the master node 1206 or each of the plurality of sensors 1210 may function as a virtual point of contact between the physical venue 1204 and mobile devices that may not be locally present at the physical venue 1204, to allow users of those remote mobile devices to search and/or receive the same advertisement experience as users of mobile devices present at physical venue 1204. When used with digital signage, each master sensor node, or each of the plurality of sensors, may be assigned in location and function to a digital signage player to allow remote search and connection with the content being delivered by the physical digital sign. This increases return on investment of digital signage substantially, as it provides citywide and potentially worldwide access to a local digital sign message.

In addition, advertisement system 1200 may include a cloud-based advertisement service 1212. The cloud-based advertisement service 1212 may be hosted by and associated with the at least one identification, location and authentication systems 1202 deployed in the physical venue 1204. The cloud-based advertisement service 1212 may store a plurality of advertising data 1214 associated with the physical venue 1204.

The cloud-based advertisement service 1212 allows a service provider to design, develop, and launch advertising campaigns for each master sensor node 1206 or each of the plurality of sensors 1210 hosted at a physical venue 1204. An advertising campaign is a predefined set of content storage and publishing commands that create service profiles that communicate with the mobile device 1208. The service profiles enable text, audio, or video content publishing to the mobile device 1208 and can enable selection of one or more predefined services, such as queuing, making reservations, viewing a menu of services or inventory list, or making a wireless payment.

An advertising campaign may be assigned to one, several, or all master sensor nodes 1206, or to one, several, or all of the plurality of sensors 1210 belonging to a service provider or associated with a particular physical venue 1204. Alternatively, the advertising campaign can be broken into logical functions according to the physical position and purpose of each master sensor node 1206 or plurality of sensors 1210. For instance, a first master sensor nodes 1206 or at least one plurality of sensors 1210 may be placed at the entrance of a restaurant and perform a local check-in and navigation of a mobile device 1208 to a destination, such as a reserved table. A second master sensor nodes 1206 or at least one plurality of sensors 1210 may be physically positioned at the reserved table, triggering the delivery of a service menu to the mobile device 1208 and a payment application upon check-out. A third master sensor nodes 1206 or at least one plurality of sensors 1210 may be physically positioned at a digital signage display allowing remote access to the digital advertisement services remotely by searching the service, venue or topic through the mobile engagement app and clicking on a related search item. The service profile and/or content may be delivered through the master sensor node 1206, through a local network at the physical venue 1204, or through a cloud network outside of the physical venue 1204. It is envisioned that a service profile may include additional services and content that may be relevant in case of emergency, such as Amber Alerts or severe weather warnings.

The advertising system 1200 may additionally publish third party system APIs to allow integration with one or more property-specific systems, such as a media server, a Point of Sale server (POS), Property Management System (PMS), or a Casino Management Systems (CMS).

Advertisement system 1200 may further include an advertising application 1216 installed on a mobile device 1218 connected to a cellular network channel 1220. The advertising application 1216 may transmit a search request for a local service, and receive and display advertising data 1214 associated with the physical venue 1204 from the cloud-based advertisement service 1212 in response to the search request. The advertising data 1214 may be selected for presentation to the mobile device 1218 based on a location of the mobile 1218 device, a location of the physical venue 1204, and/or search keyword(s).

The advertising data 1214 may be displayed in a map view, a list view, or an augmented reality view. The user may toggle between views on the mobile device 1218. In one embodiment, the augmented reality view may be triggered when the mobile device 1218 is tilted from a horizontal position to a vertical position, due to a resident inertial sensor (e.g., an accelerometer) passing a predefined threshold (e.g., 45 degrees, 90 degrees, 360 degrees, etc.). Conversely, when the mobile device 1218 is tiled from the vertical position back to the horizontal position (i.e., the inertial sensor passes the threshold in the opposite direction), the original display view (e.g., list or map view) is triggered and displayed.

The augmented reality view may use the location of the mobile device 1218 as a reference point to gain more information about nearby venues, such as the direction and distance of the nearby venues from the mobile device 1218. For instance, the user may be traveling on foot and may be interested to know about all venues for a particular service within walking distance of the current location.

In one embodiment of the present invention, the augmented reality view allows the user to "teleport" to locations other than the current location of the mobile device 1218 based on a search function. When the user searches for and selects a venue or service provider location, the user may be able to view other venues/service providers within proximity of the selected venue. The user may then select another venue/service provider to "teleport" to the newly selected venue/service provider location. As such, the user's perspective changes from the current location of the mobile device 1218 to a new location, with the augmented reality view displayed the user as if the user were physically present in the new location. The teleportation function is accomplished by replacing the current location of the mobile device 1218 with the absolute position of a node at the new location (e.g., latitude and longitude coordinate), which spoofs the mobile device 1218 into believing that it is in the new location. This function may be helpful to a user who need to find services for a future visit to the new location. For instance, consider a user who is planning a trip to a different city and desires to stay in a hotel with coffee shops, restaurant, business services, and a gym nearby. "Teleporting" the user's perspective to a selected hotel's location will allow the user to view nearby services to ensure that the selected hotel meets the user's preferences. By creating a future reservation, such as a hotel arrival, and initiating teleportation searches, a mobile device user may choose to create multiple (nested) queuing engagements, scheduled in chronological order, to allow zero wait engagements to cascade throughout.

Figure 13:
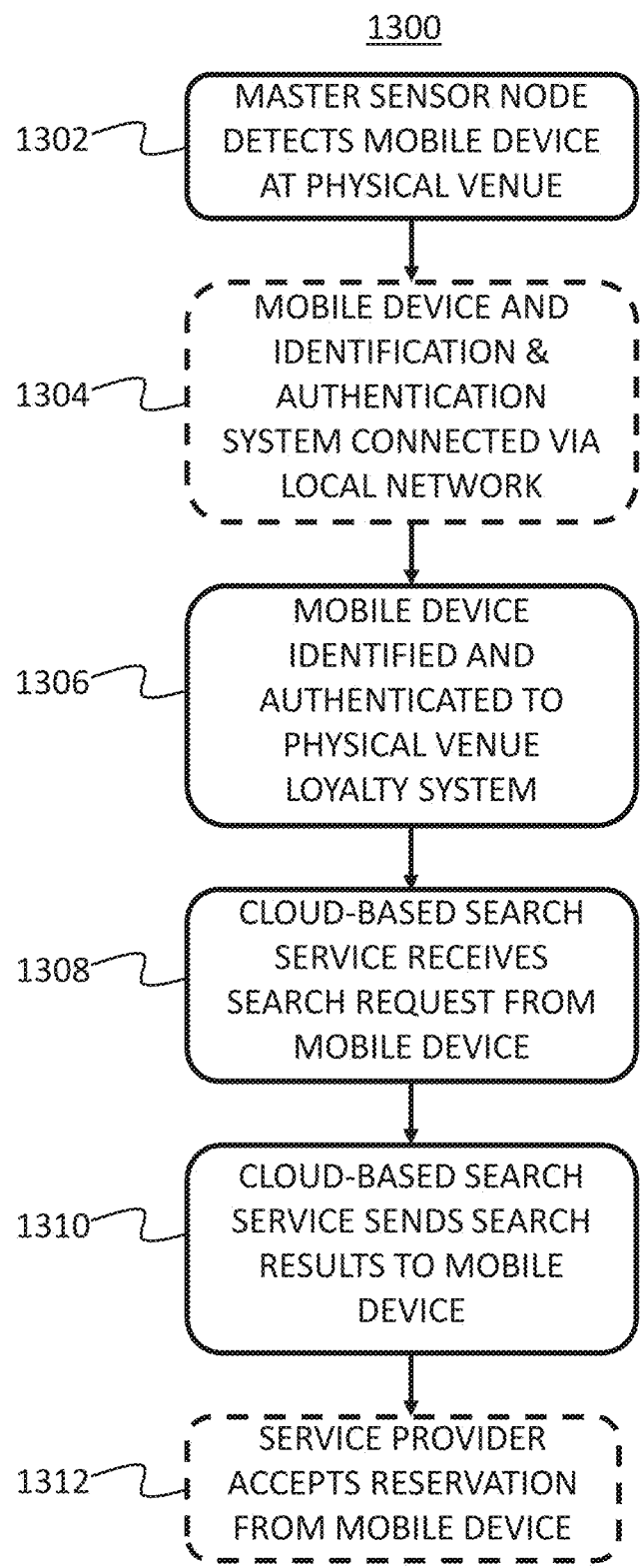
FIG. 13 illustrates a flowchart of a method for searching and sending deals and offers to mobile devices, according to one embodiment of the present invention.

Referring now to FIG. 13, a flowchart of a method 1300 for searching and sending deals and offers to mobile devices 1218 via advertisement system 1200 is shown. It is envisioned that method 1300 may be used to supplement or replace traditional advertising entirely.

At step 1302, the master sensor node 1206 may determine that the mobile device 1218 is within a predetermined range of the master sensor node 1206, e.g., is present at the physical venue 1204. At step 1304, the identification, location and authentication system 1202 may optionally connect to the mobile device 1218 via a local network connection. At step 1306, the identification, location and authentication system 1202 may identify and authenticate the mobile device 1218 to a loyalty system associated with the physical venue 1204. At this point, the mobile device 1218 may automatically be allowed to access to any deal or offer electronically available via the cloud-based advertisement service 1212 while present at the physical venue 1204.

At step 1308, the cloud-based advertisement service 1212 may receive a search request from the mobile device 1218. A user of the mobile device 1218 may search for deals, offers, and other venues/service providers, similar to a web browser search. However, the advantage of the search via the cloud-based advertisement service 1212 is that the search may be performed using a location of the mobile device 1218 as a primary search attribute, such that all search results are within a predetermined distance from the user. At step 1310, the cloud-based advertisement service returns a list of search results to the mobile device 1218. Optionally, at step 1312, a service provider may accept a reservation from the mobile device 1218 for a service selected from the search results.

Figure 14:
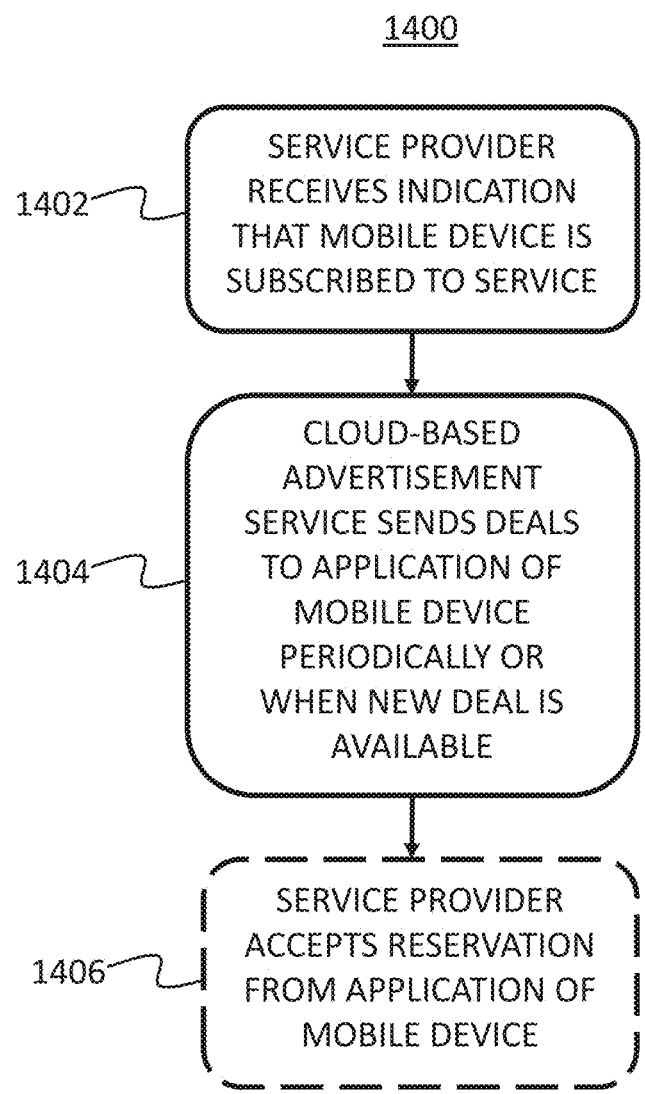
FIG. 14 illustrates a flowchart of a method for publishing deals and offers to remote, subscribed mobile devices, according to one embodiment of the present invention.

Referring now to FIG. 14, a flowchart of a method 1500 for publishing deals and offers to remote, subscribed mobile devices 1218 via advertisement system 1200 is shown. It is envisioned that method 1400 may be used to supplement or replace traditional advertising entirely.

At step 1402, the cloud-based advertisement service 1212 may receive an indication that a user of the mobile device 1218 has subscribed to advertisements associated with one or more service providers via the advertising application 1216. At step 1404, the cloud-based advertisement service 1212 may send (or "push") a deal, offer, or other advertisement to the mobile device 1218 via the advertising application 1216 periodically, or as new deals, offers, or other advertisements become available. If the advertisement is a coupon, the coupon may be stored on the advertising application 1216.

Optionally, at step 1406, a service provider may accept a reservation from the advertising application 1216 of mobile device 1218 for an advertised service.

Figure 15:
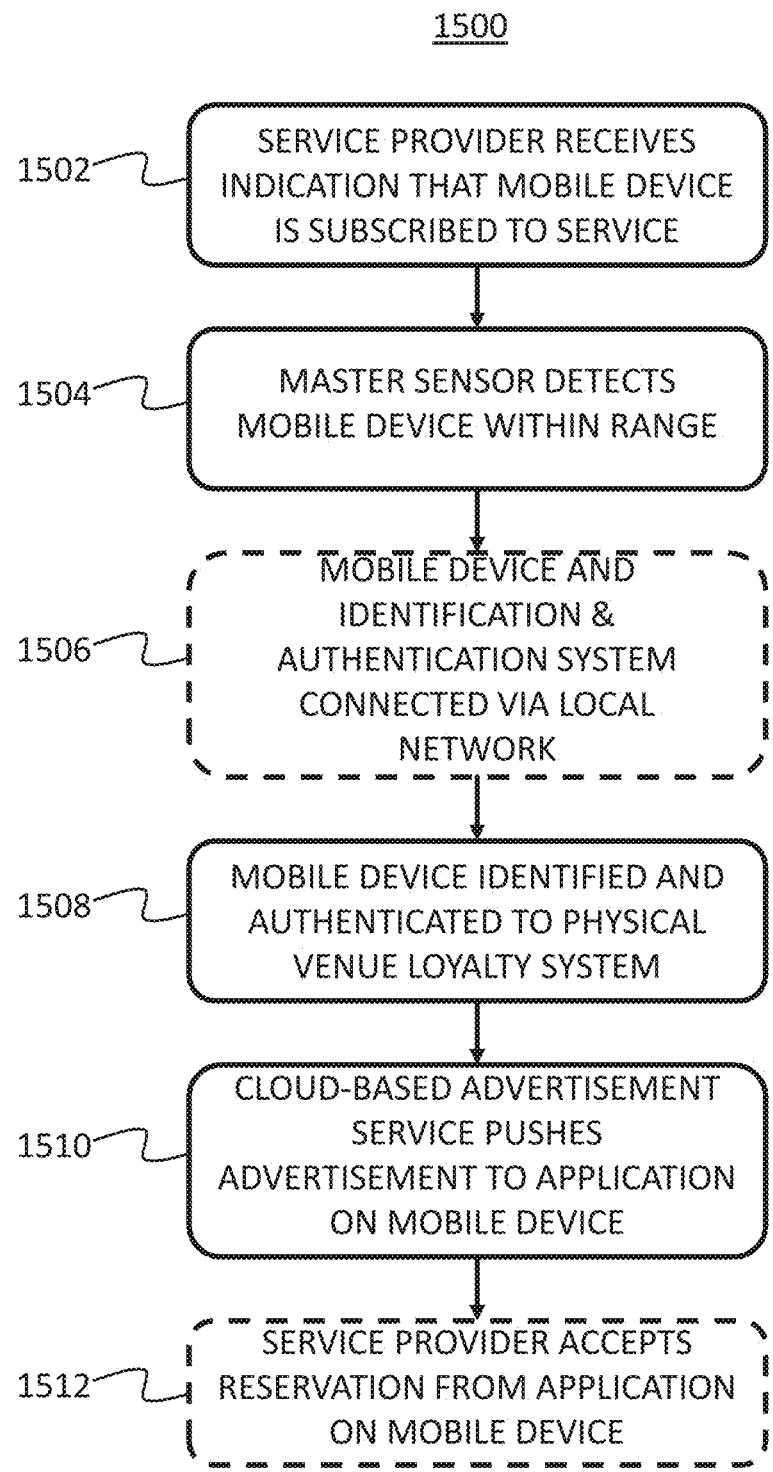
FIG. 15 illustrates a flowchart of a method for publishing deals and offers to local, subscribed mobile devices, according to one embodiment of the present invention.

Referring now to FIG. 15, a flowchart of a method 1500 for publishing deals and offers to local, subscribed mobile devices 1218 via advertisement system 1200 is shown. It is envisioned that method 1500 may be used to supplement or replace traditional advertising entirely.

At step 1502, the cloud-based advertisement service 1212 may receive an indication that a user of the mobile device 1218 has subscribed to advertisements associated with one or more service providers via the advertising application 1216. The subscription to advertisements works similar to an e-mail subscription or other web-based subscription service, except that subscription via the cloud-based advertisement service 1212 uses a location of the mobile device 1218 as a primary attribute, such that advertisements are sent out only to subscribed devices that are within a predetermined range of the master sensor node 1206. As such, the advertisements may be targeted to customers within close proximity to the services.

At step 1504, the master sensor node 1206 may determine that the mobile device 1218 is within a predetermined range of the master sensor node 1206. At step 1506, the identification, location and authentication system 1202 may optionally connect to the mobile device 1218 via a local network connection (e.g., Bluetooth or Wi-Fi). At step 1508, the identification, location and authentication system 1202 may identify and authenticate the mobile device 1218 to a loyalty system associated with the physical venue 1204. At this point, the mobile device 1218 may automatically be allowed to access, via the advertising application 1216, any deal or offer electronically available via the cloud-based advertisement service 1212 while present at the physical venue 1204. At step 1510, the cloud-based advertisement service 1212 may send (or "push") a deal, offer, or other advertisement to the advertising application 1216 on mobile device 1218. If the advertisement is a coupon, the coupon may be stored on the advertising application 1216.

Optionally, at step 1512, a service provider may accept a reservation from the advertising application 1216 of the mobile device 1218 for an advertised service.

The cloud-based advertisement service 1212 may also allow interaction between the advertising application 1216 of the mobile device 1218 and one or more service providers. For instance, the mobile device 1218 may be provided with dynamic access to dialog and collaboration services via the advertising application 1216, such as instant messaging, live chat, games, phone, e-mail, video conferencing, and the like. This allows notifications/messages to be broadcast to all users across a physical venue or sent individually to specific mobile devices 1218.

Figure 16:
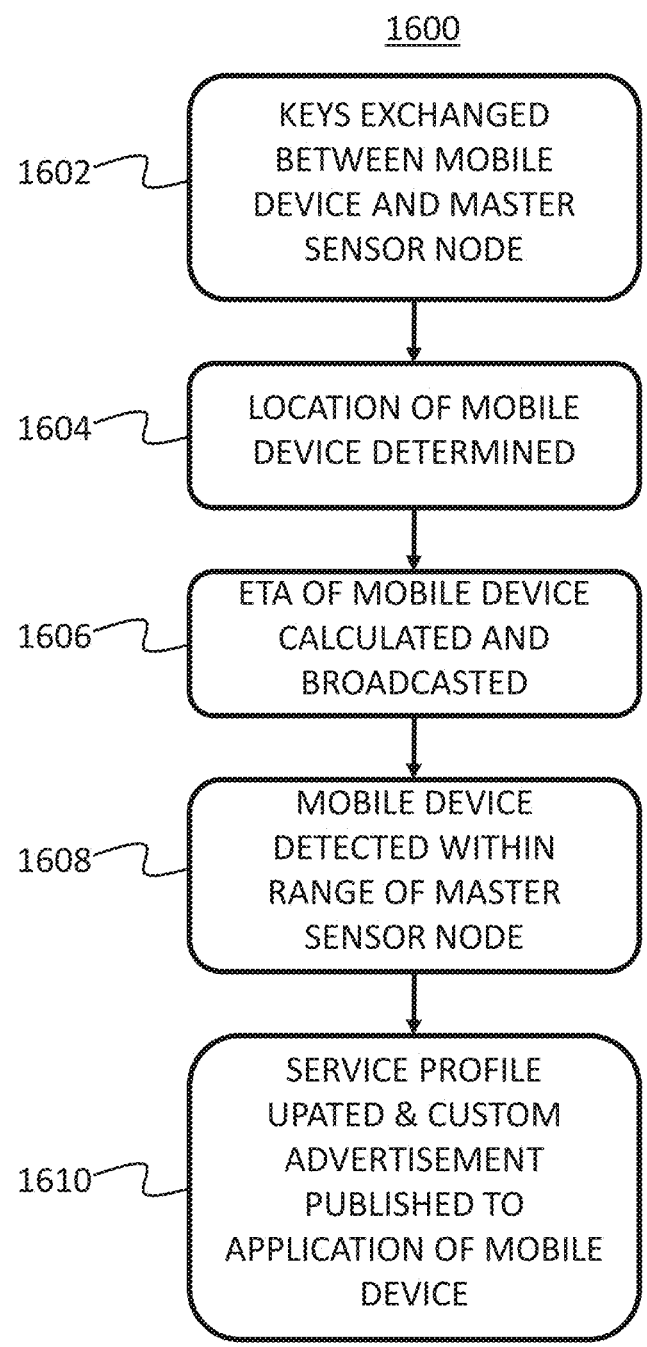
FIG. 16 illustrates a flowchart of a method for updating service profiles and publishing content, according to one embodiment of the present invention.

Referring now to FIG. 16, a flowchart of a method 1600 for updating service profiles and publishing content via advertisement system 1200 is shown. Once a reservation has been made (according to method 1300, 1400, or 1500, for example), at step 1602, secure keys are exchanged between the mobile device 1218 and the master sensor node 1206. An in-depth discussion of this process is described above at FIG. 4.

At step 1604, a location of the mobile device 1218 is determined. At step 1606, an ETA of the mobile device 1218 is calculated and broadcasted to master sensor node 1206, as described above at FIG. 6. The master sensor node 1206 or cloud-based advertising service 1212 will continually monitor the ETA of the mobile device 1218 until the mobile device 1218 is detected as being within range of the master sensor node 1206 at step 1608.

At step 1610, once the mobile device 1218 is within range of master sensor node 1206, the master sensor node 1206 or cloud-based advertising service 1212 may update its service profile to advertise a custom service to the mobile device 1218 via the advertising application 1216. For instance, the master sensor node 1206 may be memory-limited and may keep multiple service profiles active. The master sensor node 1208 may manage the active service profiles based on a queuing and ETA determination pattern. Dynamic local or remote network programming or updates may be provided based on preferences of or requests from the advertising application 1216. If the advertisement is a coupon, the coupon may be stored on the advertising application 1216.

In an alternative embodiment of the present invention, a master sensor node 1206 may be assigned a dedicated service profile to perform a specific function, such that the service profile may not be updated remotely. The master sensor node 1206 may be operating in a high-security authentication mode, as might be required for certain regulated services such as online or on-property wireless gaming.

Additionally, the cloud-based advertising service 1212 may control a variety of parameters associated with the master sensor node 1206, such as a location, a name or ID, and frame traffic passing through the master sensor node 1206. The cloud-based advertising service 1212 may collect user context and positioning statistics to analyze and optimize the services provided.

Virtual Teleportation Systems & Methods

A virtual "teleportation" function, used in connection with the search functions of the systems disclosed herein, may be helpful to a user who needs to find services for a future visit to a location that is different from the user's current location at the time of searching. For instance, consider a user who is planning a trip to a different city and desires to stay in a hotel with coffee shops, restaurant, business services, and a gym nearby. Teleporting the user's perspective to a selected hotel's location will allow the user to view nearby services to ensure that the selected hotel meets the user's preferences, without requiring the user to wait until he is in the location (e.g., the different city) to perform the search.

Figure 17:
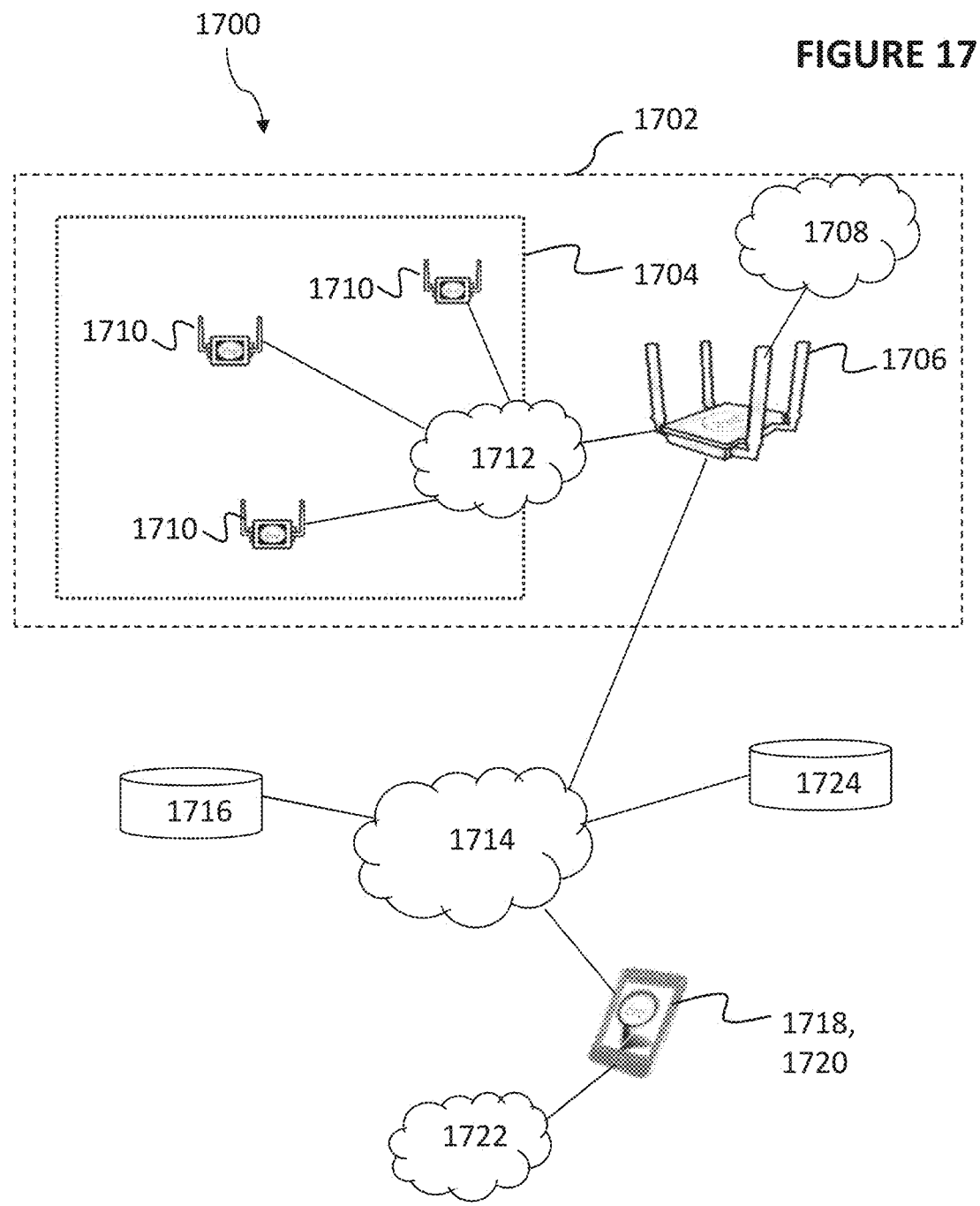
FIG. 17 illustrates a remote advertisement system, according to one embodiment of the present invention.

In some embodiments of the present invention, systems and methods for utilizing a virtual teleportation service are disclosed. Referring now to FIG. 17, a remote advertisement system 1700 is illustrated. The remote advertisement system 1700 may include at least one identification, location and authentication system 1702 associated with a physical venue 1704. The physical venue 1704 may be a physical retail venue, a hotel, a casino, a theater, a business transaction point, a point of information, a point of interest, or the like.

The identification, location and authentication system 1702 may include at least one master sensor node 1706 connected, directly or indirectly, to a broadband network channel 1708. The identification, location and authentication system 1702 may further include a plurality of sensors 1710 in the physical venue 1704, the plurality of sensors in communication with the master sensor node 1706 over a wireless network channel 1712. The master sensor node 1706 and the plurality of sensors 1710 may be physically installed in the physical venue 1704 and may be geodetically positioned, each having corresponding latitude, longitude, and height values and identifying datum.

The remote advertisement system 1700 may further include a cloud-based advertisement service 1714 hosted by the at least one identification, location and authentication system 1702 and deployed in the physical venue 1704. The cloud-based advertisement service 1714 may store a plurality of advertising data 1716 associated with the physical venue 1704. Each master sensor node 1706 and plurality of sensors 1710 may be associated with a service or a plurality of services. Data relating to these services may be organized (e.g., by categorizing venue or service providers by venue type or category of service) and stored in the cloud-based advertisement service 1714.

The remote advertisement system 1700 may further include an application 1718 installed on a mobile device 1720, which may be connected to a cellular network channel 1722.

The application 1718 may determine a first set of coordinates corresponding to a location associated with the mobile device 1720. The application 1718 may further access an API that may filter venues and services based on categories and transmit a first search request for a service associated with a master sensor node 1706 or plurality of sensors 1710 located at the physical venue 1704. The first search request may include at least one selected category (e.g., hotels). The search request may include additional filters, such as a particular location (e.g., city, county, zip code, physical address, etc.), a distance range from a particular location (e.g., within 10 miles of a city), and nearby services or points of interest, or a combination thereof. For instance, the search request may include the following parameters: hotels in Paris, France within 5 miles of the Eiffel Tower. The cloud-based advertisement service 1714 may access global venue database APIs 1724, such as cloudTraQ, Google or Foursquare property databases, to find suitable candidate physical venues or services matching the search request parameters.

The application 1718 may receive and display a list of physical venues or related services from the cloud-based advertisement service 1714 in response to the first search request. The list may be presented in a limited field of view and directional and distance data may be presented based on the mobile device's determined location. The list may be displayed in a map view, a list view, or an augmented reality view. The user may toggle between views on the mobile device 1720. In one embodiment, the augmented reality view may be triggered when the mobile device 1720 is tilted from a horizontal position to a vertical position, due to a resident inertial sensor (e.g., an accelerometer) passing a predefined threshold (e.g., 45 degrees, 90 degrees, 360 degrees, etc.). Conversely, when the mobile device 1720 is tilted from the vertical position back to the horizontal position (i.e., the inertial sensor passes the threshold in the opposite direction), the original display view (e.g., list or map view) is triggered and displayed.

From the list, at least one physical venue or related service may include a teleportation indicator. The application 1718 may further receive an indication that the teleportation indicator has been selected. Optionally, a field of view that displays only the selected venue or service may be presented.

The application 1718 may determine a second set of coordinates corresponding to a location associated with the selected physical venue or related service (e.g., the physical venue 1704), and replace the first set of coordinates with the second set of coordinates. The user is thus virtually teleported from the first location (the current location of the mobile device) to the second location (the searched location) via the field of view displayed on the mobile device 1720.

The application 1718 may further transmit a second search request for a service, including the selected category, and receive and display a second list of physical venues matching the selected category based at least on the second set of coordinates. The second list may be presented in a limited field of view and directional and distance data may be presented based on the location associated with the selected physical venue or related service.

The teleportation function may be performed and repeated as many times as needed to allow the user to find local resources in any searched location.

The particular services available for viewing and/or engagement by the user via the mobile device 1720 using the teleportation function may depend on whether the access is active or passive.

Figure 18:
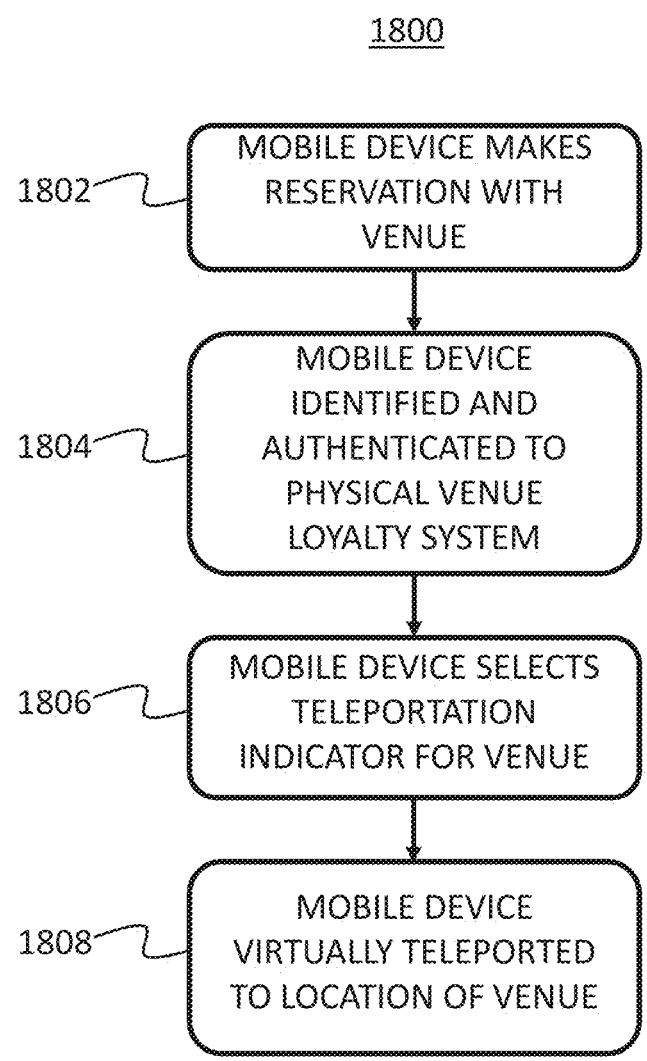
FIG. 18 illustrates a flowchart of a method for searching using an active teleportation mode, according to one embodiment of the present invention.

According to FIG. 18, a flowchart of a method 1800 for searching using an active teleportation mode is shown. If a selected physical venue or related service has a master sensor node 1706 and supports the teleportation function (e.g., includes a teleportation indicator when displayed), at step 1802, the user may engage with the venue, for instance, by making a reservation.

It should be noted that the teleportation function can be initiated during a search to create a nested queue schedule to allow zero-wait throughout a time period, such as a day or even an entire vacation/trip.

Once a reservation has been made (according to method 1300, 1400, or 1500, for example), secure keys may be exchanged between the mobile device 1720 and the master sensor node 1706, at step 1804 to identify and authenticate mobile device 1720. At step 1806, with the secure key from the venue, the teleportation indicator on the application 1718 may be selected. At step 1808, the digital geodetic position of the mobile device 1720 (e.g., latitude/longitude) is virtually teleported to that of the venue to which mobile device 1720 is connected.

Figure 19:
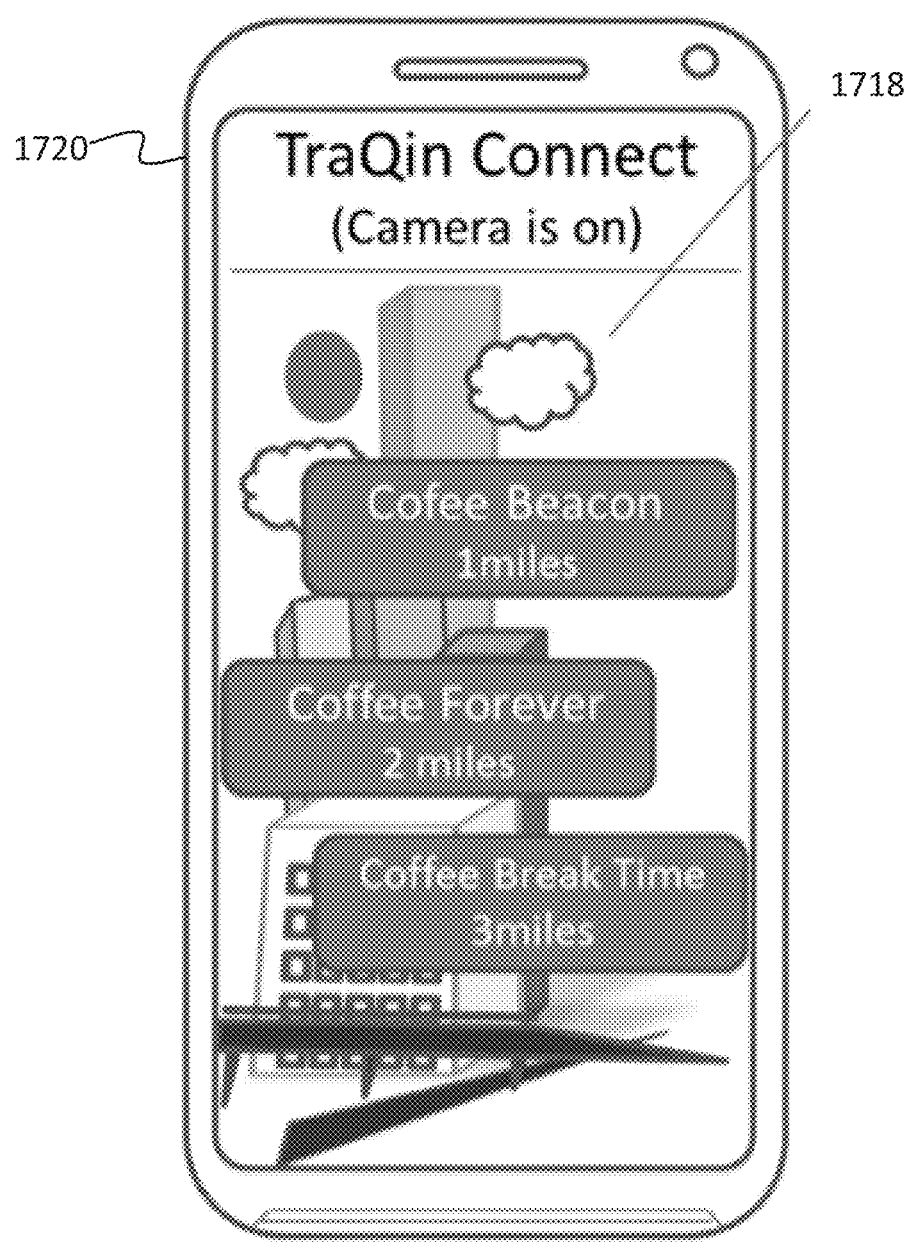
FIG. 19 illustrates an exemplary mobile device displaying advertising application operating in active teleportation mode, according to one embodiment of the present invention.

In active teleportation mode, the user may be able to use the augmented reality view to access a 360-degree virtual view of the venue and surrounding area, with the point of view of a person physically standing in the exact latitude and longitude of the venue location. The master sensor node 1706 may optionally include a camera, either live streaming or storing 360-degree panoramic images. The application 1718 (in augmented reality mode) may display the streamed or stored images of the surrounding area while the user rotates the camera. In active teleportation mode, the user may also be able to remotely log-in to venue services and to access venue-specific resources, such as menus, inventories, reservation status, information about other guests (e.g., whether friends and family members have checked into the venue, or if not checked in, their respective ETAs to the venue), and the like. The user may also be able to make payments directly to the venue via the mobile phone 1720 (e.g., via iPay). FIG. 19 illustrates an exemplary mobile device 1720 displaying application 1718 operating in active teleportation mode.

Figure 20:
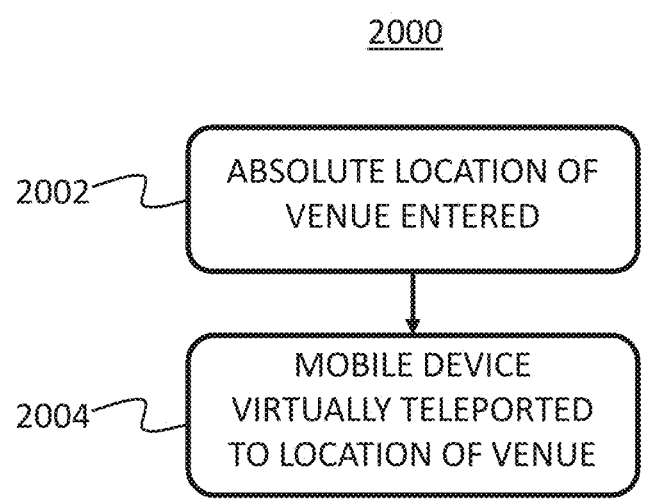
FIG. 20 illustrates a flowchart of a method for searching using a passive teleportation mode, according to one embodiment of the present invention.

According to FIG. 20, a flowchart of a method 2000 for searching using a passive teleportation mode is shown. At step 2002, an absolute location (e.g., latitude and longitude coordinates) of a venue may be entered into the application 1718. A user may manually enter the absolute location of the venue, if known, or the absolute location may be generated using a third party service, such as a map engine. If the venue has a master sensor node 1706, only its absolute location node will be used; the application 1718 does not communicate with the master sensor node 1706 in passive teleportation mode. Passive teleportation mode will also work for venues or points of interest without a master sensor node 1706, so long as the absolute location of the venue or point of interest is known.

Figure 21:
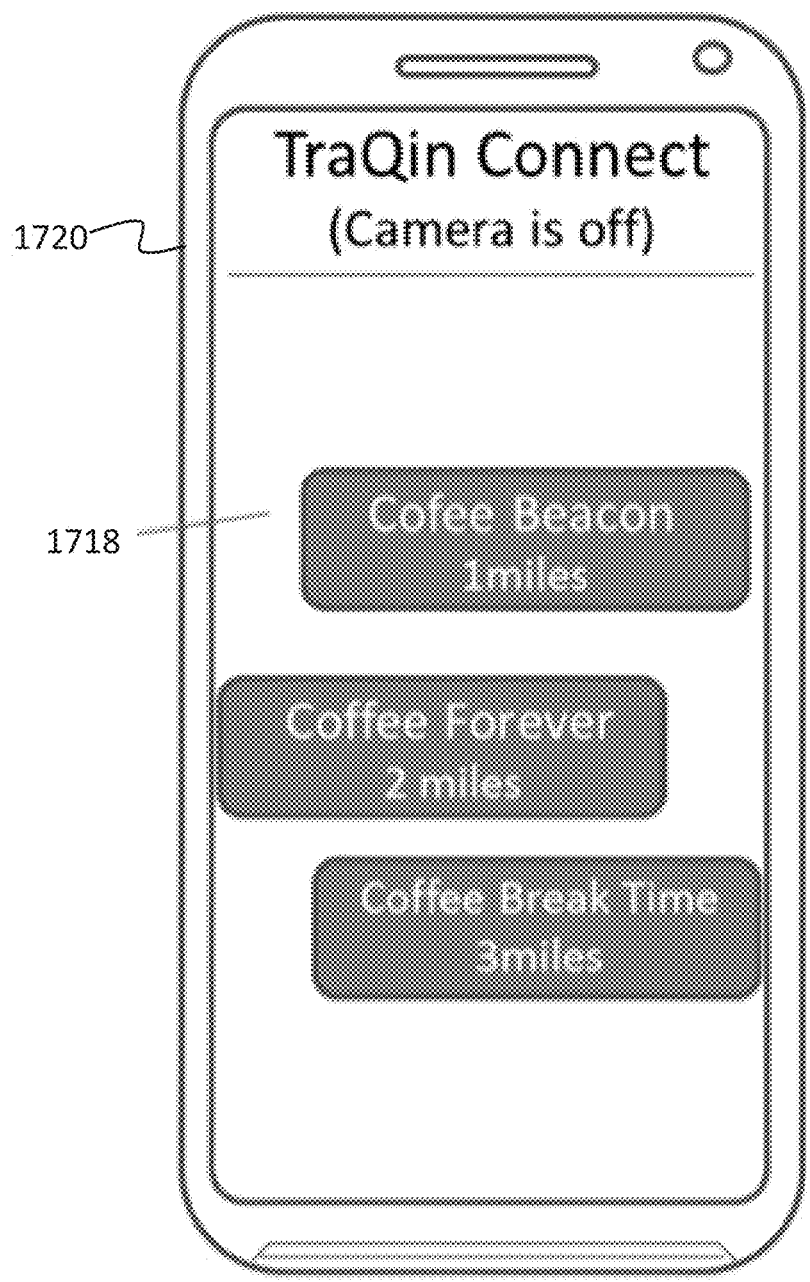
FIG. 21 illustrates an exemplary mobile device displaying advertising application operating in passive teleportation mode, according to one embodiment of the present invention.

At step 2004, the digital geodetic position of the mobile device 1720 (e.g., latitude/longitude) is virtually teleported to that of the absolute location of the venue. In passive teleportation mode, the user may be able to search and view services from the point of view of the venue location in list view, map view, or augmented reality view. However, access to remote log-in to venue services and venue-specific resources will not be available. Moreover, content specific to a master sensor node 1706, such as camera content (e.g., 360-degree panoramic images, live video stream, etc.) may also be unavailable in passive teleportation mode. FIG. 21 illustrates an exemplary mobile device 1720 displaying application 1718 operating in passive teleportation mode.

Figure 22:
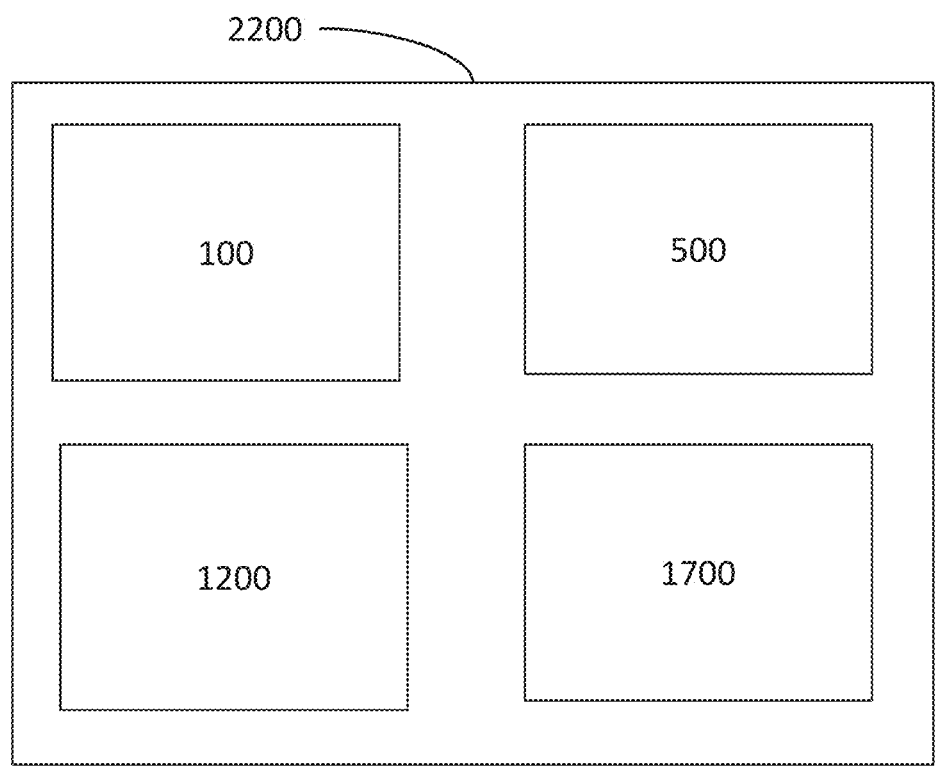
FIG. 22 illustrates a system, according to one embodiment of the present invention.

Referring now to FIG. 22, a system 2200 is illustrated according to one embodiment of the present invention. System 2200 includes identification, location, and authentication system 100, zero-wait publishing, searching, and queuing system 500, advertisement system 1200, and remote advertisement 1700.

INDUSTRIAL APPLICATIONS

FIGS. 23 through 41 show multiple exemplary embodiments of the invention, which illustrate various industrial applications of the invention, among other things.

Figure 23:
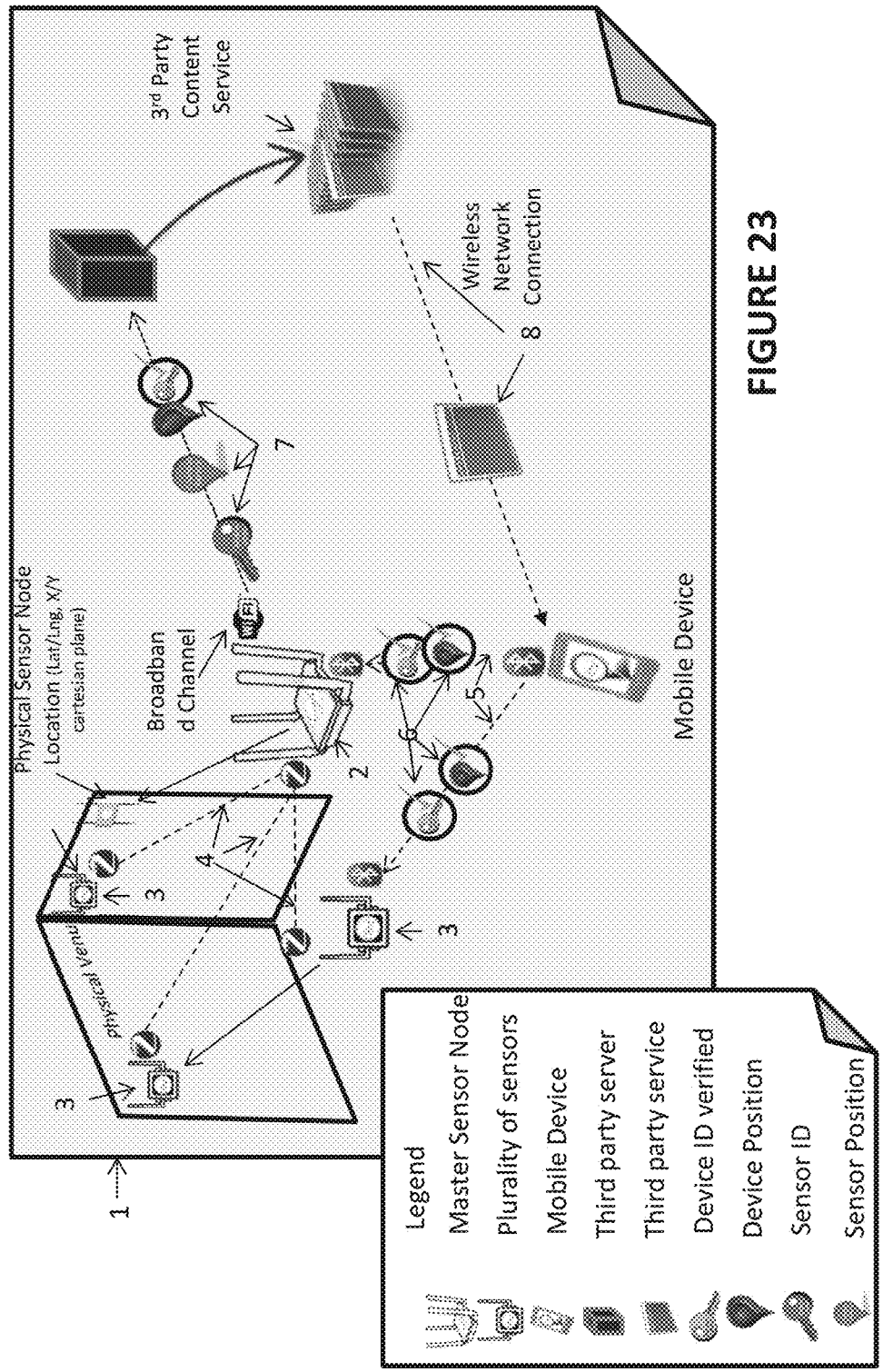
FIG. 23-41 illustrate various embodiments of the invention.

Referring now to FIG. 23, a topology of an identification, location, and authentication system (1) is shown. A master sensor node or a plurality of master sensor nodes located in a physical venue each connected to a broadband network channel (2); a plurality of sensors in the physical venue (3); the plurality of sensors in communication with the master sensor node over a wireless network channel or each having its own broadband network channel (4) wherein the plurality of sensors, and the master sensor node are communicatively coupled to a mobile device over a radio frequency network channel (5); wherein the master sensor node or plurality of sensors identifies a mobile device and its location within proximity of itself (6); wherein the master sensor node authenticates the mobile device ID and location to the third party (7); and wherein the third party system authenticates the master sensor node and location and acknowledges mobile device authentication verification to the service (8); wherein the third party receives authentication of the mobile device and provides the mobile device access to a network connection associated with the third party (9).

Figure 24:
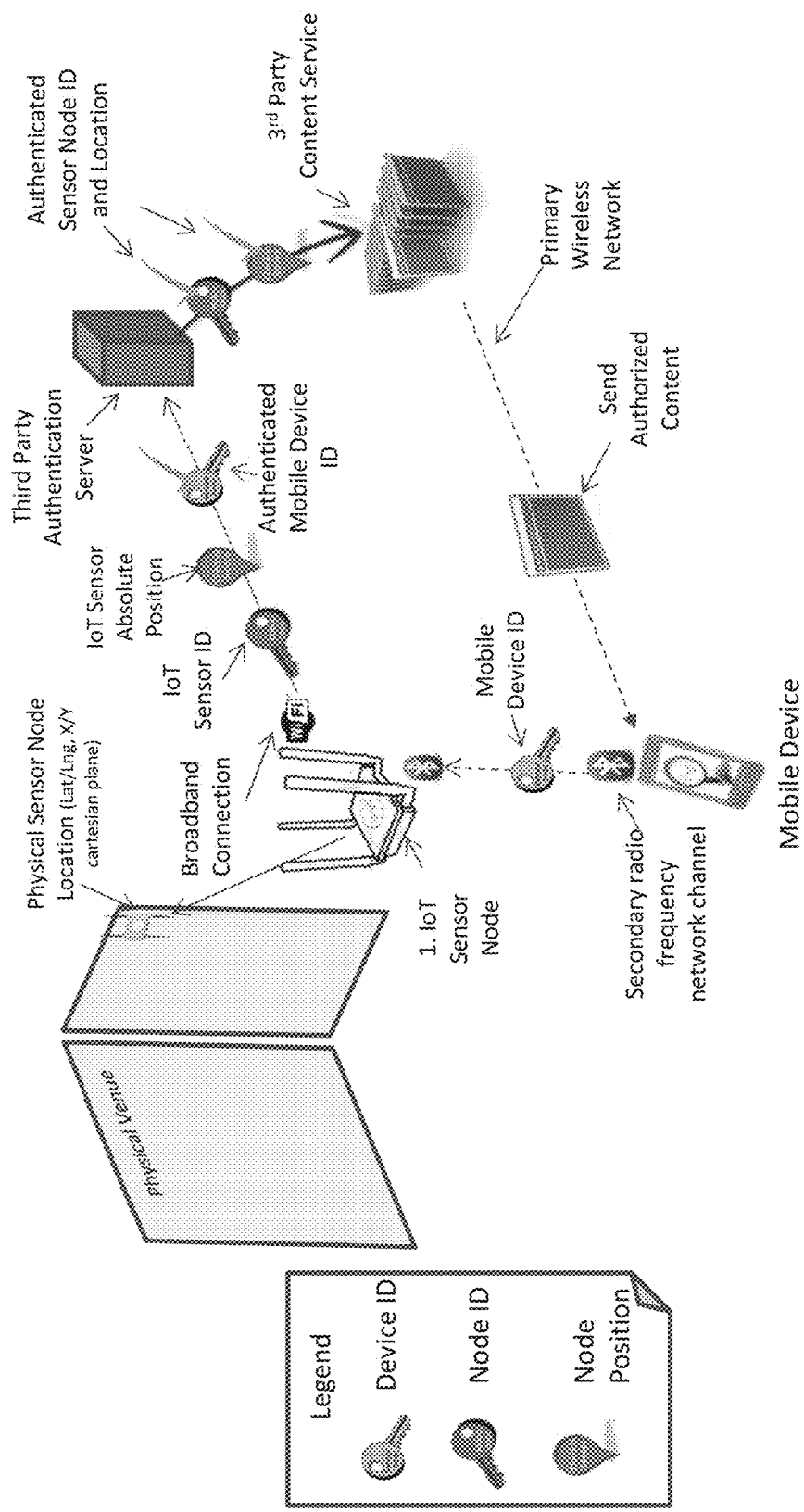

Referring now to FIG. 24, a topology of a single-node use case of an identification, location, and authentication system is shown. A sensor node authenticates a mobile device ID and position to receive reserved content.

Figure 25:
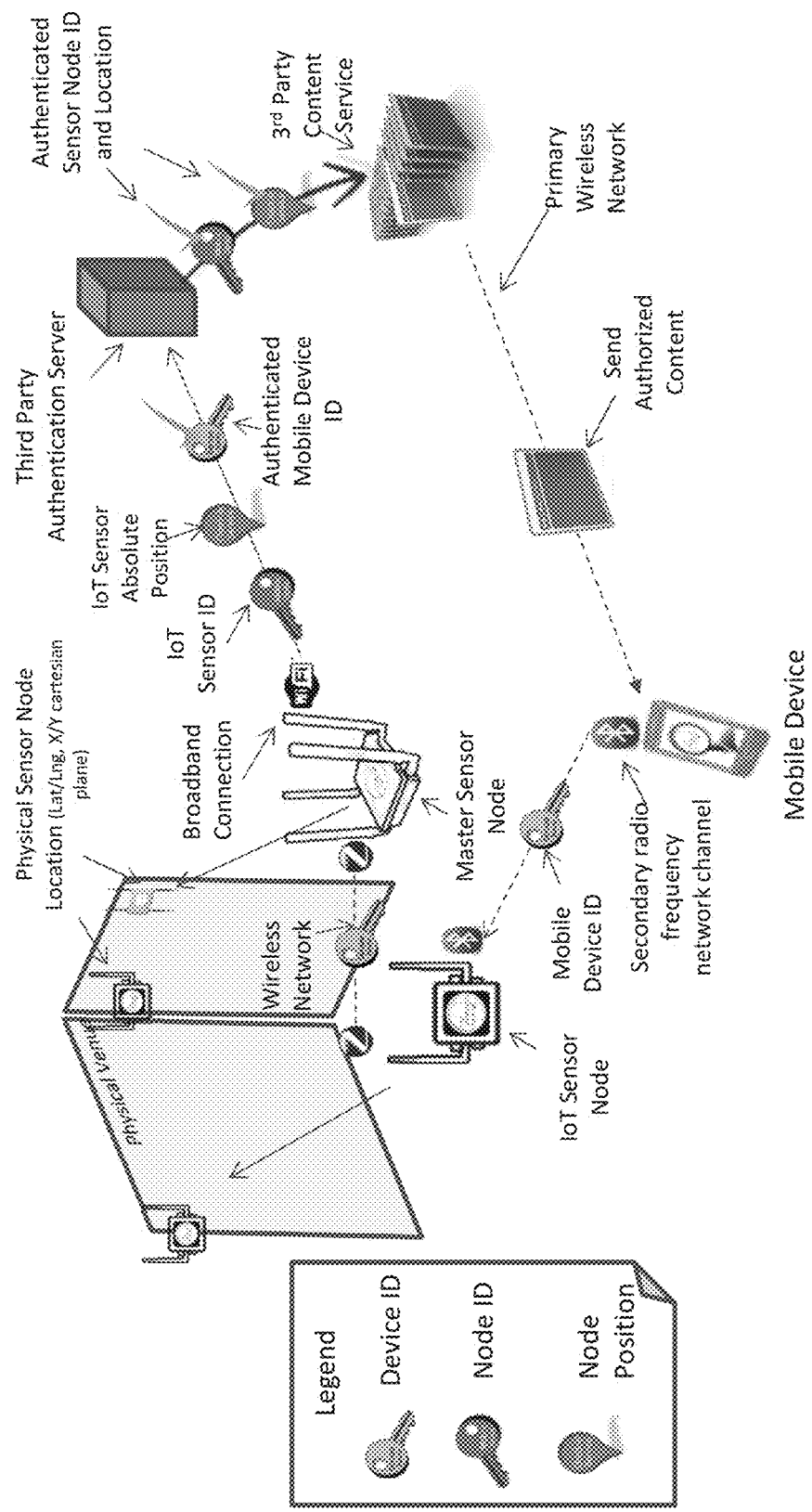

Referring now to FIG. 25, a topology of a multi-node use case of an identification, location, and authentication system is shown. A sensor node authenticates a mobile device ID and position to receive reserved content.

Figure 26:
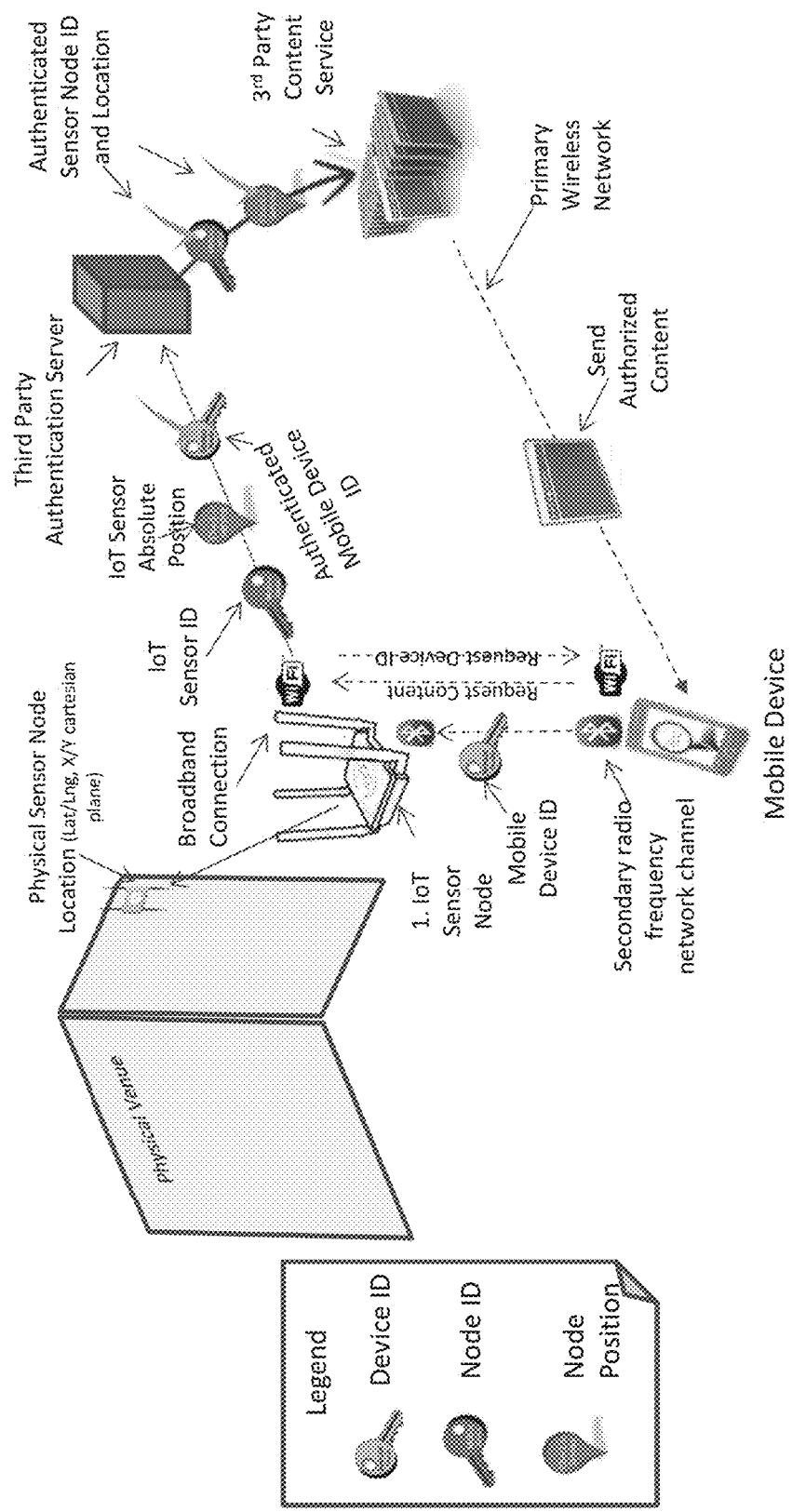

Referring now to FIG. 26, a topology of a single-node use case of an identification, location, and authentication system is shown. A sensor node authenticates a mobile device ID and position that is requesting content service from sensor node.

Figure 27:
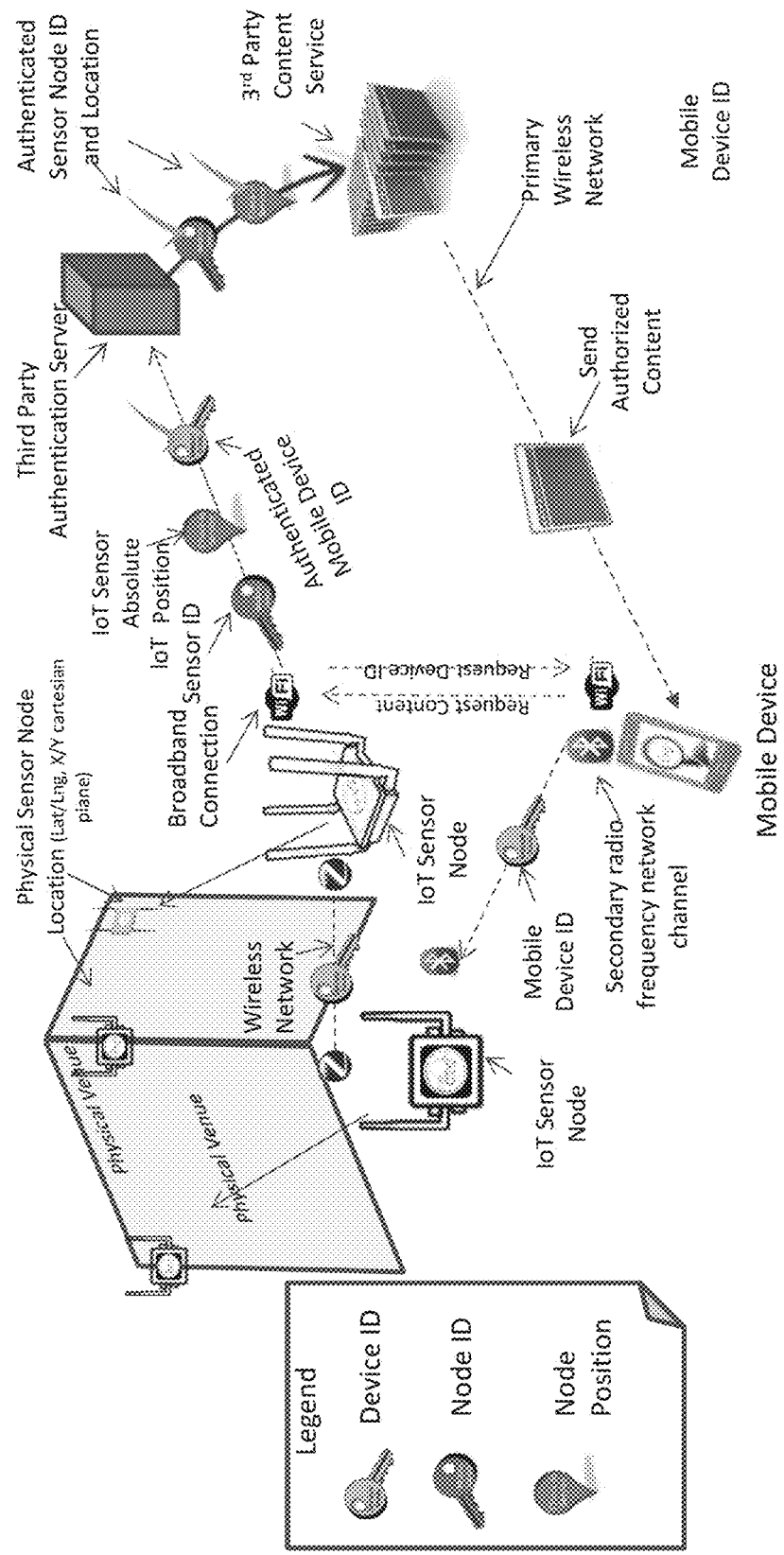

Referring now to FIG. 27, a topology of a multi-node use case of an identification, location, and authentication system is shown. A sensor node authenticates a mobile device ID & Position that is requesting content service from sensor node.

Figure 28:
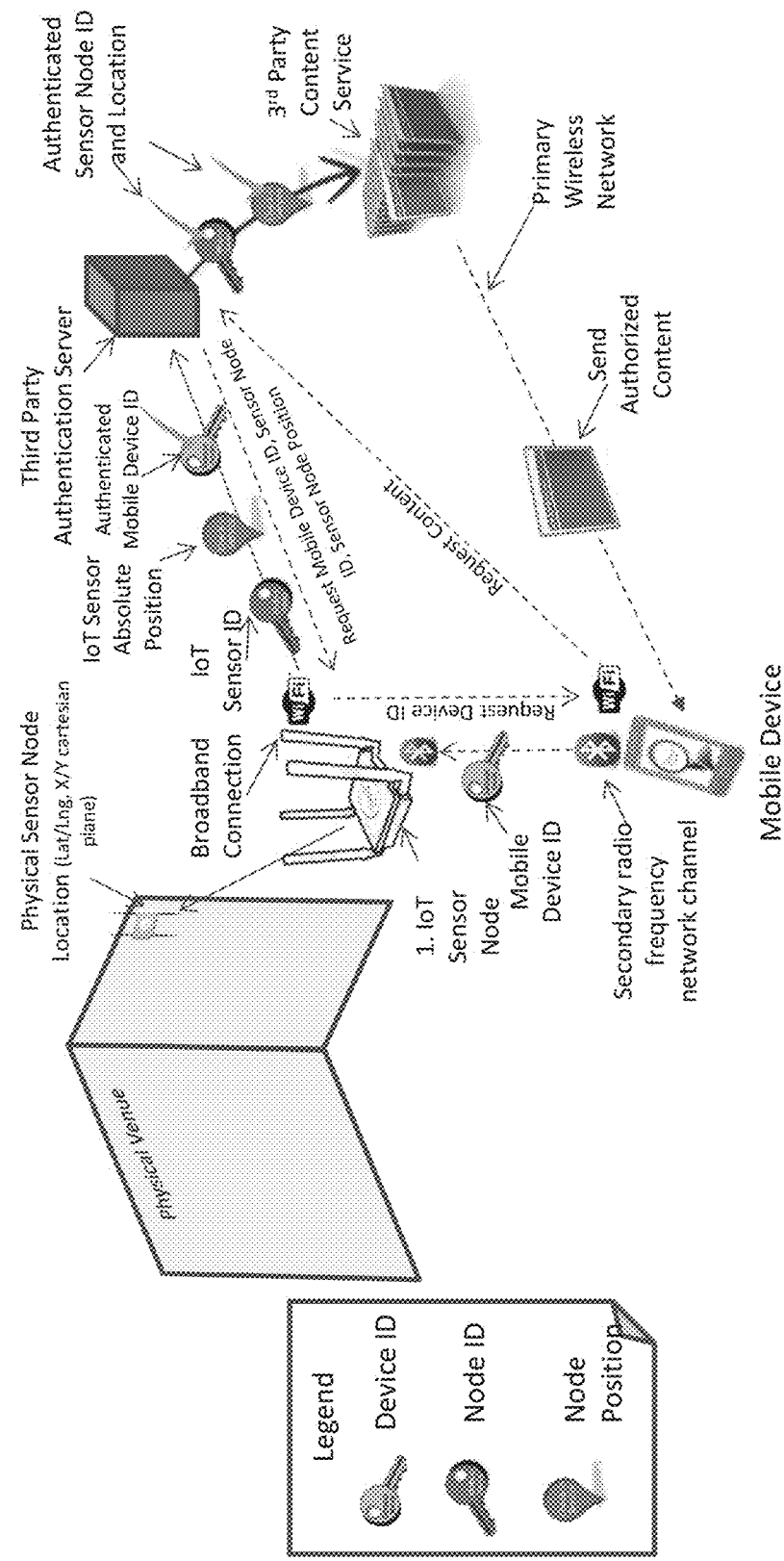

Referring now to FIG. 28, a topology of a single-node use case of an identification, location, and authentication system is shown. A sensor node authenticates a mobile device ID and position to a requesting content service.

Figure 29:
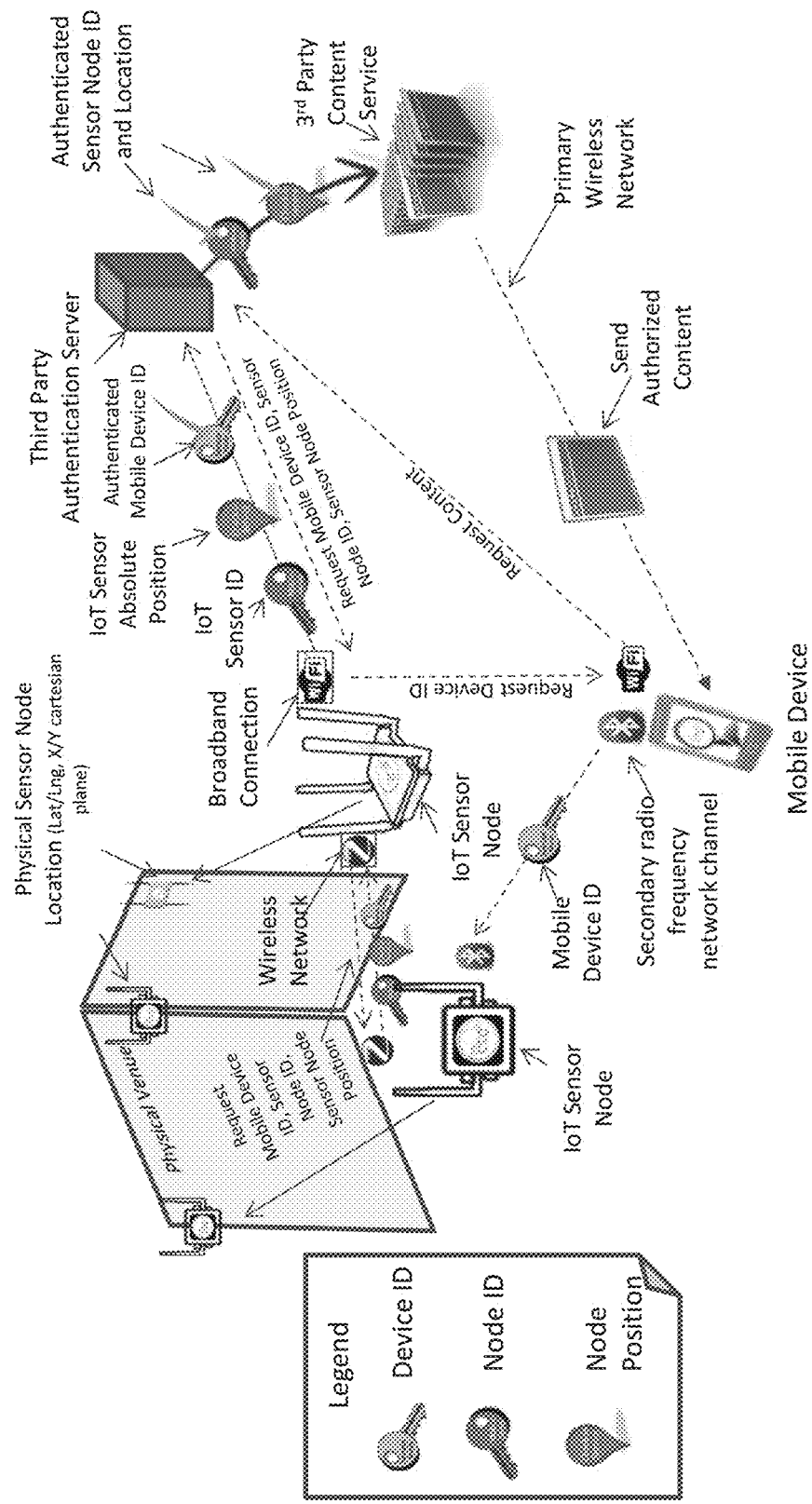

Referring now to FIG. 29, a topology of a multi-node use case of an identification, location, and authentication system is shown. A sensor node authenticates a mobile device ID and position to a requesting content service.

Figure 30:

Referring now to FIG. 30, a diagram of authentication levels of an identification, location, and authentication system. The three levels are: zone, session, and service.

Figure 31:
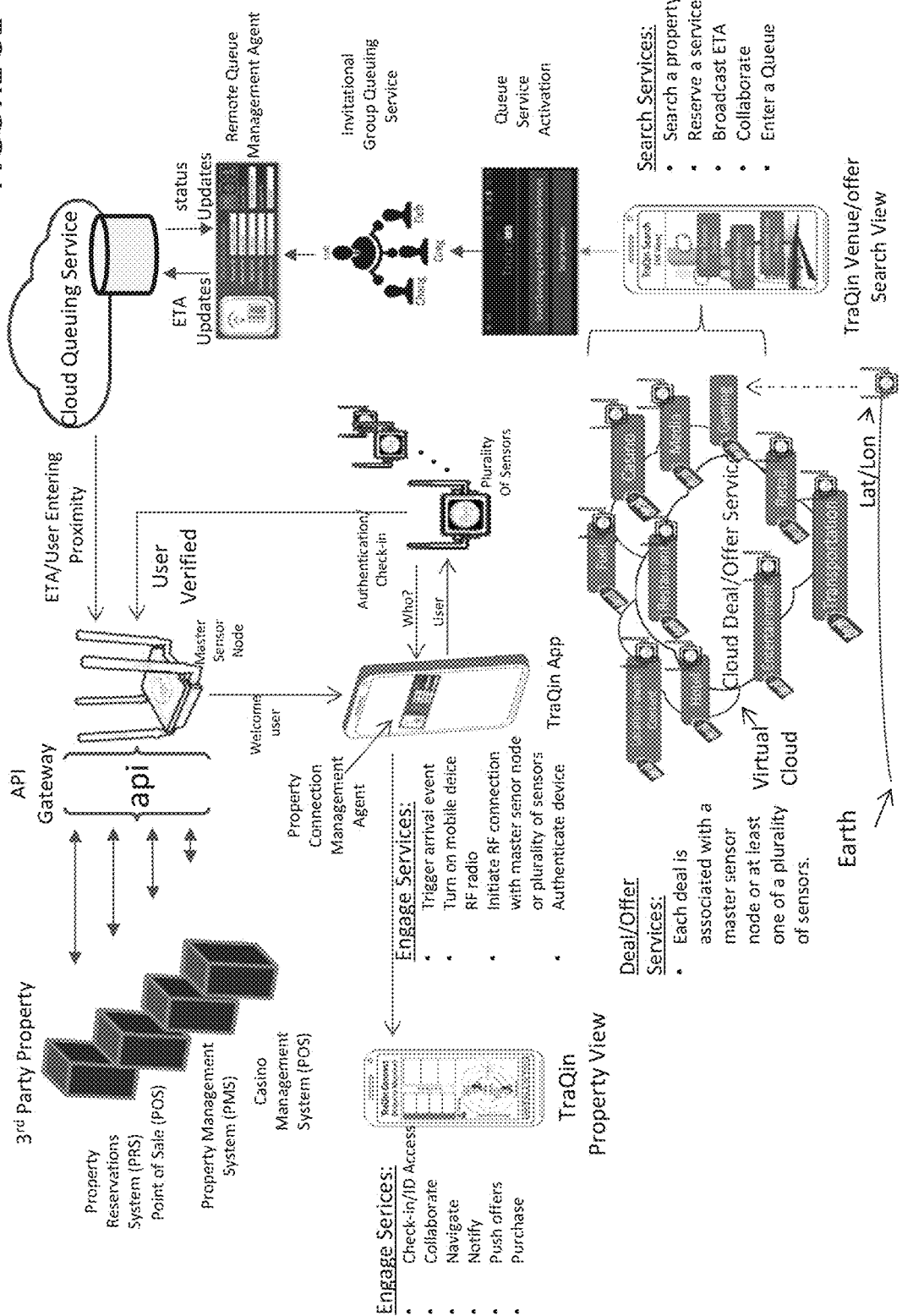

Referring now to FIG. 31, a procedural flow diagram of zero-wait mobile consumer engagement life cycle technology is shown.

Figure 32:
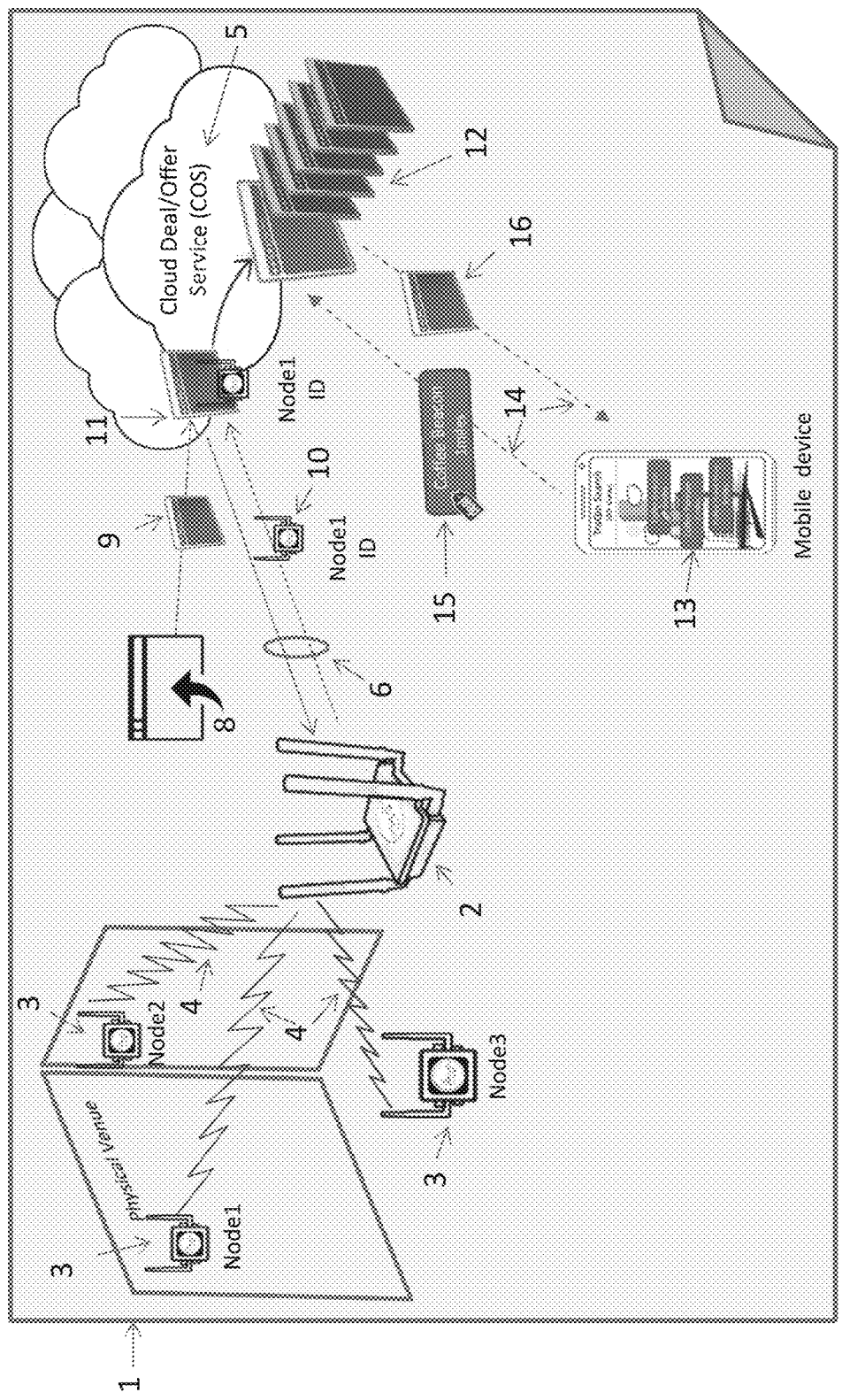

Referring now to FIG. 32, a topology of a channel sensor (direct-to-consumer offer publish, subscribe, and search cloud) system (1) is shown. A master sensor node or a plurality of master sensor nodes located in a physical venue or remotely, connected to a broadband network channel (2); a plurality of sensors in a physical venue (3), the plurality of sensors in communication with the master sensor node over a wireless network channel or broadband network channel (4), a Cloud Deal/Offer Service (COS) (5), communicatively coupled to a master sensor node or plurality of master sensor nodes located in a physical venue or remotely, connected to a broadband network channel (6), and communicatively coupled to one or more mobile devices, over a cellular or broadband network channel (7), a web application user interface used to author and publish (8) one or more deal/offers to the cloud deal/offer service (COS) (9), wherein the cloud deal/offer service (COS) communicates with a master sensor node or at least one plurality of sensors to obtain (10) wherein each of a plurality of deal/offers is associated with a specific master sensor node or one or more of a plurality of sensor identities, locations and services (11), and stored in the cloud deal/offer service (COS) (12), a mobile deal/offer search app installed on a mobile device (13), wherein the plurality of deal/offers, and the Cloud Deal/Offer Service are communicatively coupled to a mobile device over a cellular or broadband network channel (14); wherein the mobile deal/offer search app locates and requests a deal/offer from the Cloud Deal/Offer/Service (COS) (15), and the Cloud Deal Offer Service (COS) retrieves and sends the deal offer coupon electronically to the mobile deal/offer search app, and stores the coupon in the app (16).

Figure 33:
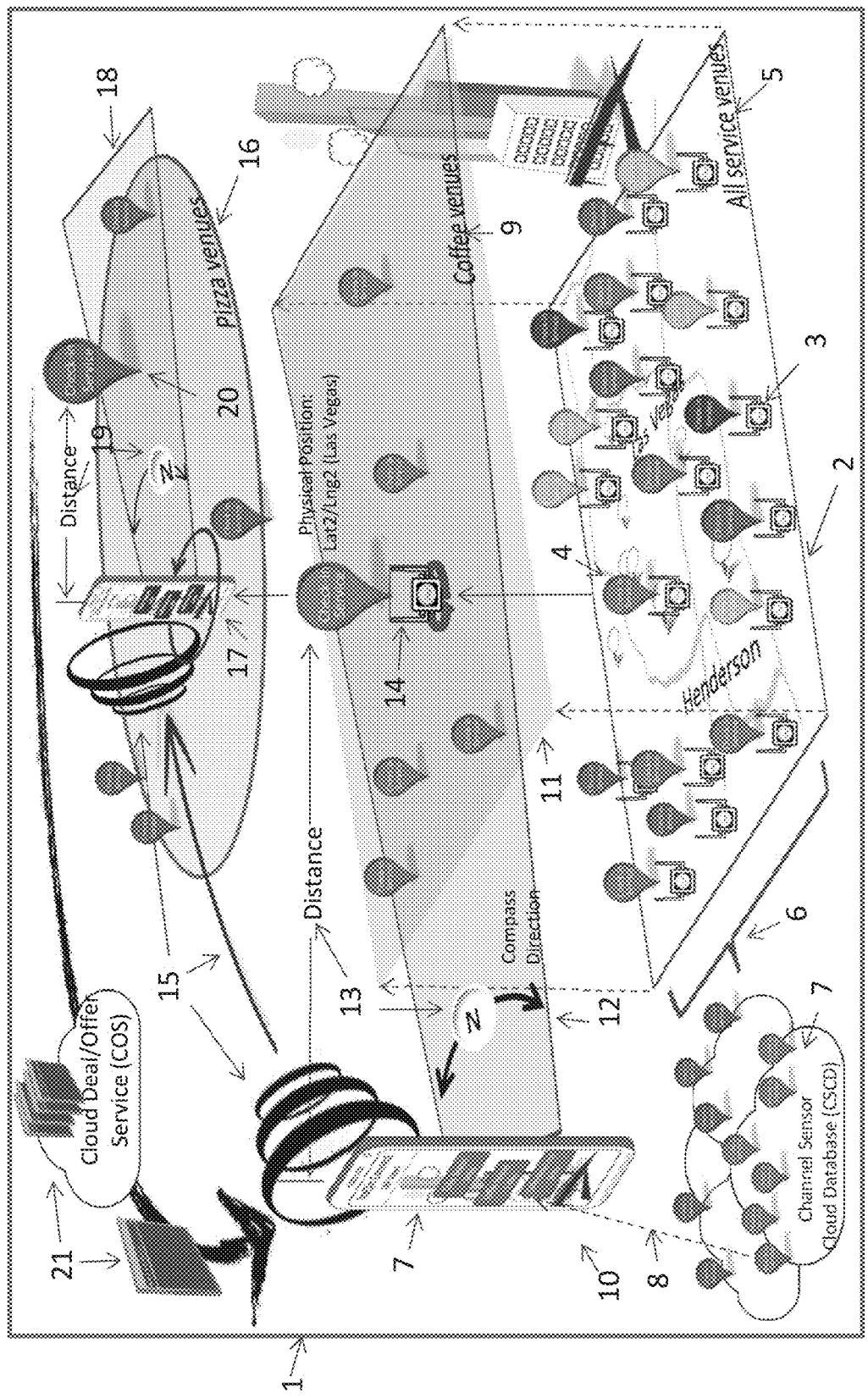

Referring now to FIG. 33, a topology of a channel sensor teleportation operation (remote IoT sensor search, teleport, and search procedure) system is shown. A remote location centric advertisement search and engagement system (1) comprising: a geographical distribution of master sensor nodes and plurality of sensors at physical retail venues, business transaction points and points of information (2), a plurality of master sensor nodes or a plurality of sensors located in a physical venue or other points of interest, connected directly or indirectly to a broadband network channel (3), and that are geodetically positioned absolutely with latitude, longitude, height and identifying datum value (4); the plurality of master sensors nodes or plurality of sensors are physically installed (5), and ordered in a cloud hosted database logically according to their business, service, product or topic categories (6), communicatively coupled to one or more mobile devices, over a cellular or broadband network channel (7), wherein the mobile device has a search app connected to the channel sensor cloud database by accessing an API allowing the mobile app to filter venues and their services based on the business, service, product or topic categories (8), wherein the filtered items may be presented in a limited field of view to allow directional and distance deterministic selections (9), wherein the mobile device with the search app is able to display local search results in multiple views, using motion sensors and a flexible UX that may include a list view, a map view, a camera augmented reality view, a heads up display view or a virtual reality view (10), wherein a category search filters the cloud hosted database to display only search items that represent the business, services, products or topics requested in the view selected (11), wherein one or more of the views may present a filed of view that displays selected search items (12), practically based on their direction and distances by using sensors on the mobile device to determine this information by obtaining positions of both the mobile device and the channel sensor node (13) by selecting an item within the mobile devices search app, the user is able to perform a virtual teleportation to the master sensor node one or more of the plurality of sensors by retrieving the position information of the node from the Channel sensor cloud database and swapping it for the search apps physical position used to locate the node being teleported to (14). The mobile device search app is virtually teleported within the Channel Sensor cloud database to represent the nodes position (15). A new search will display search items that are distance and directionally related to the teleported node allowing the mobile app to see businesses, services, products and topics relative to the nodes location (16), wherein a new search will display items related to the nodes location (17) with a search field of view providing directional and distance information (18) using the mobile devices internal sensors and information obtained from the channel sensor cloud database (19), wherein a selection of a unique item within one of the plurality of search views will (20) deliver to the mobile device in its physically location the service requested from the teleported virtual position (21).

Figure 34:
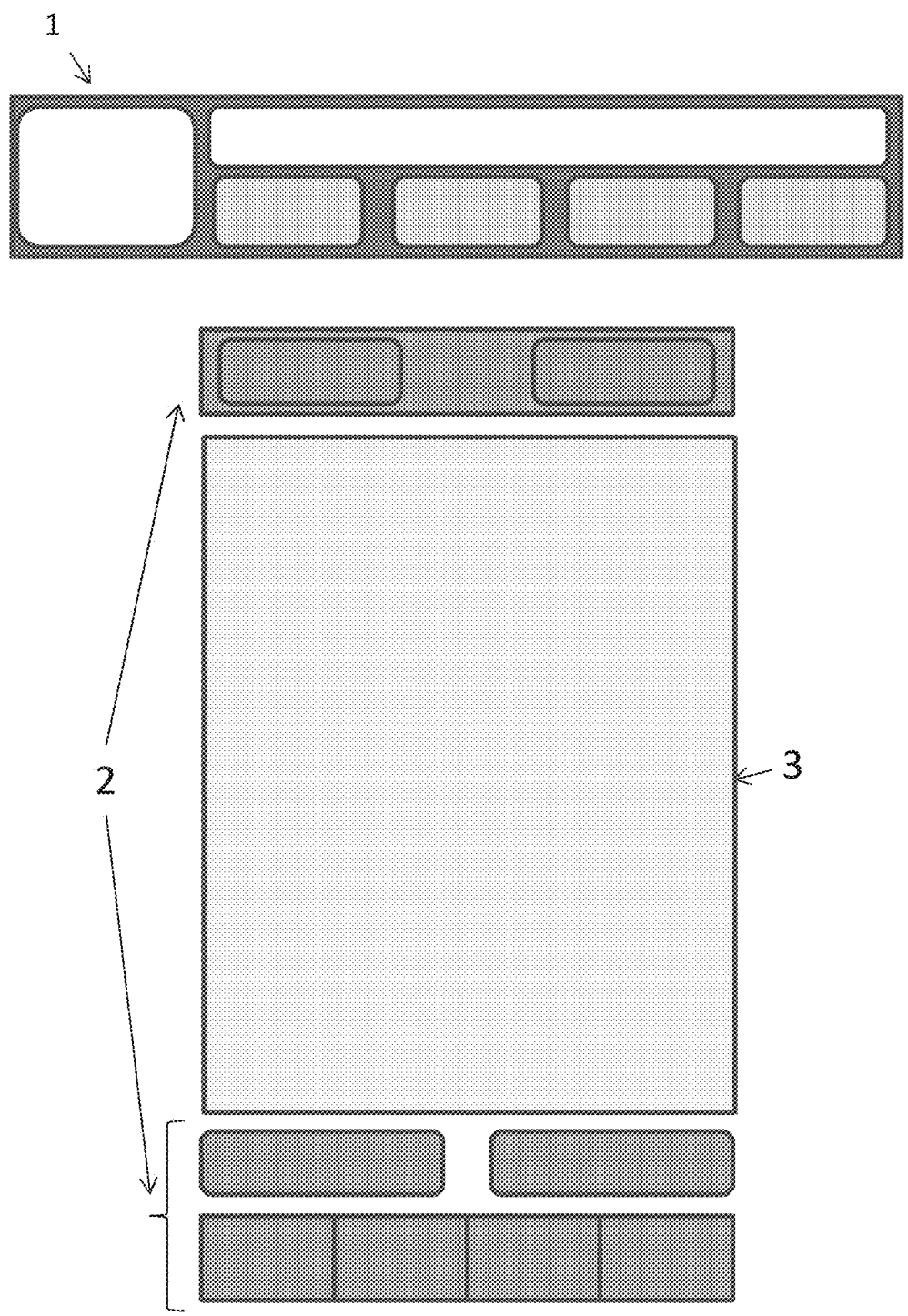

Referring now to FIG. 34, architecture for a zero-wait hybrid mobile application is shown. Flexible hybrid app distributed architecture is comprised of: (1) Native widget—that resides on the operating system desktop. Operates as a metering and event agent, and manages internal application communications, external services communications, notifications and event triggering. (2) API based hybrid app—manages internal device sensor APIs and external networked service APIs. (3) In-app browser—launches external and third party web services within the hybrid mobile app.

Figure 35:
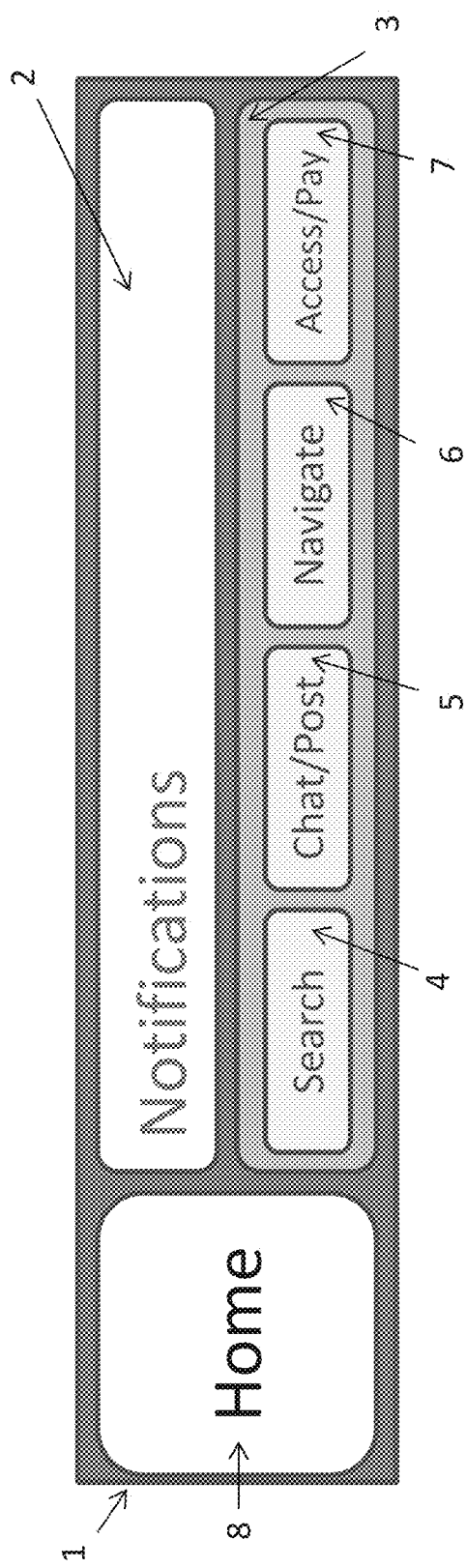

Referring now to FIG. 35, architecture for a native application widget is shown. (1) Native widget resides on the mobile device operating system desktop to allow instant access and easy monitoring of service data without having to open a full screen app. (2) Notification window allows viewing of internal (mobile device) service data and external (web and network application servers) service data through an API managed infrastructure. (3) Service operation button group used to launch apps and manage services. (4) Application assignable button, such as a Search button to launch search screen. (5) Application assignable button, such as a chat button to launch communications and social network services screen. (6) Application assignable button, such as a navigation button to provide tracking, navigation and wayfinding service screen. (7) Application assignable button, such as an identity Access or Payment button to allow secure mobile device and end user authentication to third party systems. (8) Application assignable button, such as a home button to launch other service and applications.

Figure 36:
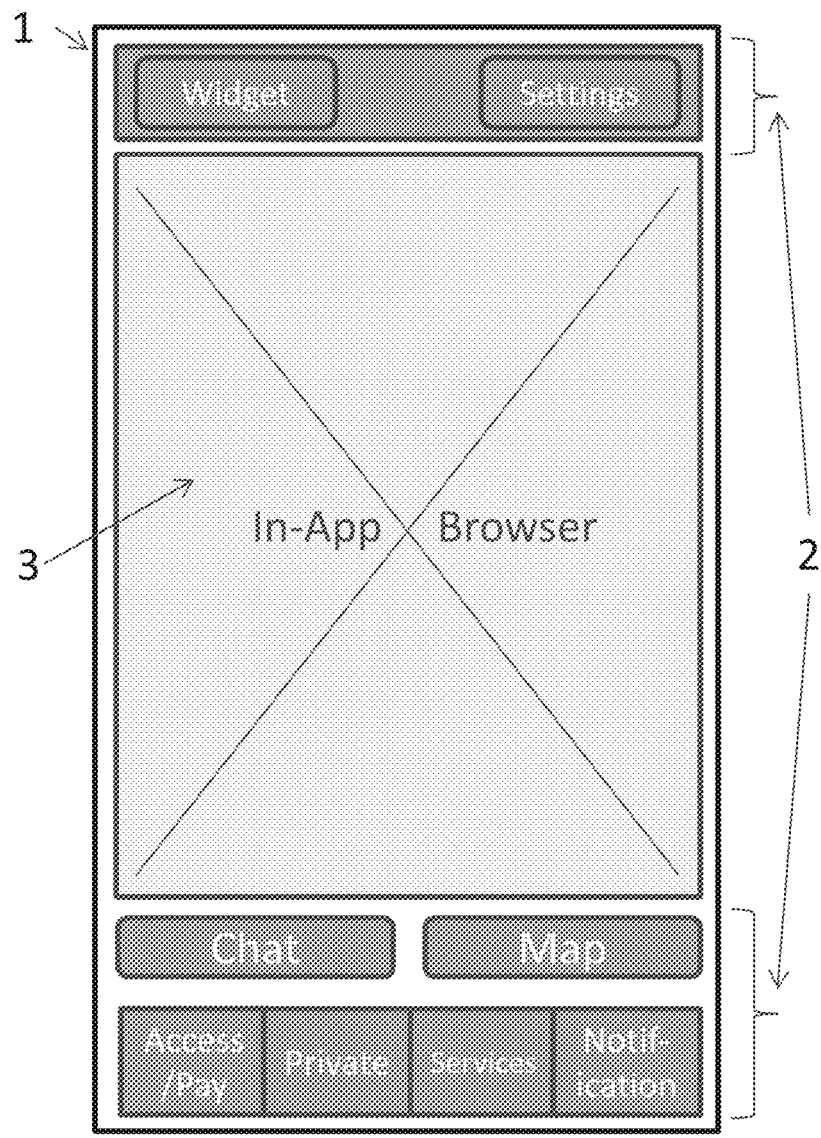

Referring now to FIG. 36, a hybrid mobile application is illustrated. (1) Hybrid mobile app launches two ways: Manually from a button press by device app user. Automatically triggered by location or activity event associated with the zero wait service. (2) Integrated into the hybrid mobile app and containing user assignable buttons that manage services both on the mobile device and off the mobile device that may be running over the local network or internet. (3) Window, such as an in-app browser, HTML5 canvas element or iFrame element running within the hybrid mobile app to allow third party applications to run within the Hybrid mobile app. The third party apps interface to mobile device sensors through an API provided by the Hybrid mobile app or to local or cloud services through a network API provided by the hybrid mobile app.

Figure 37:
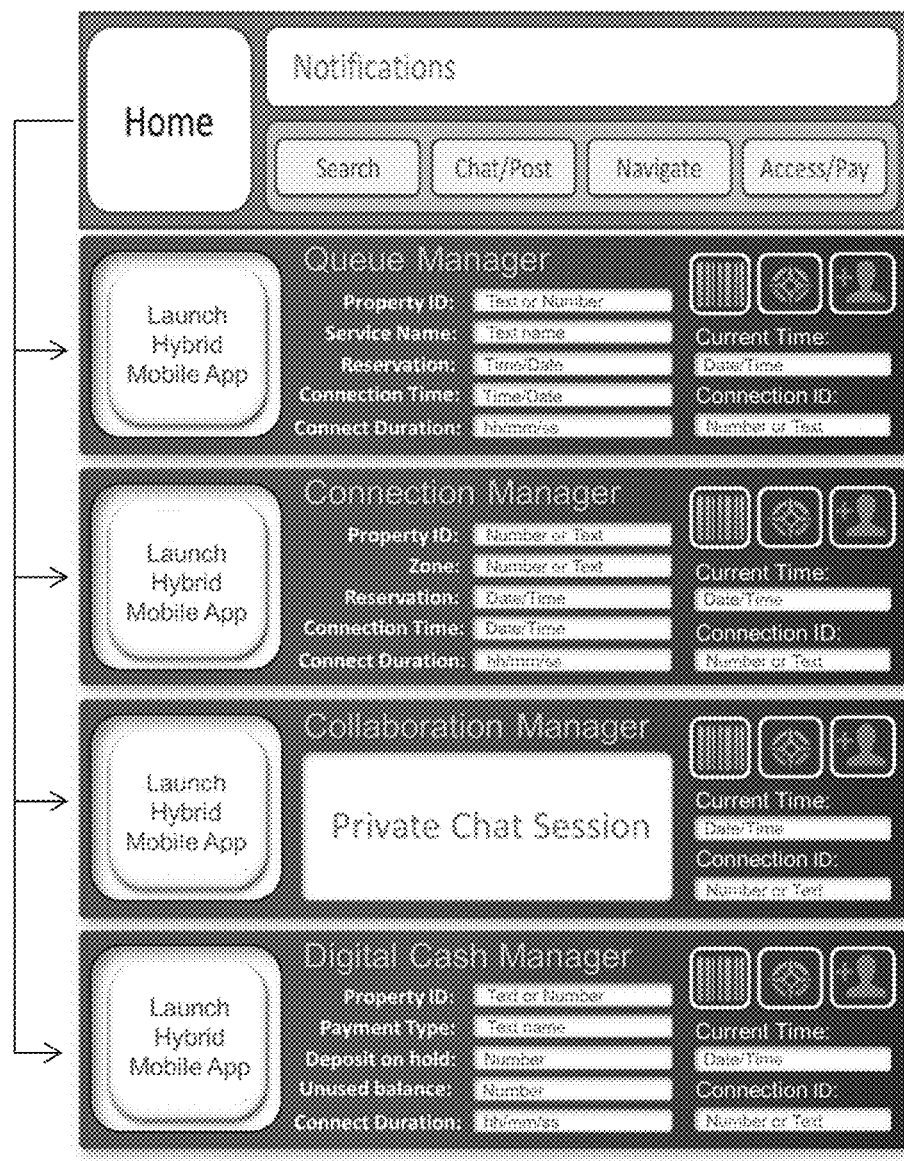
Figure 38:
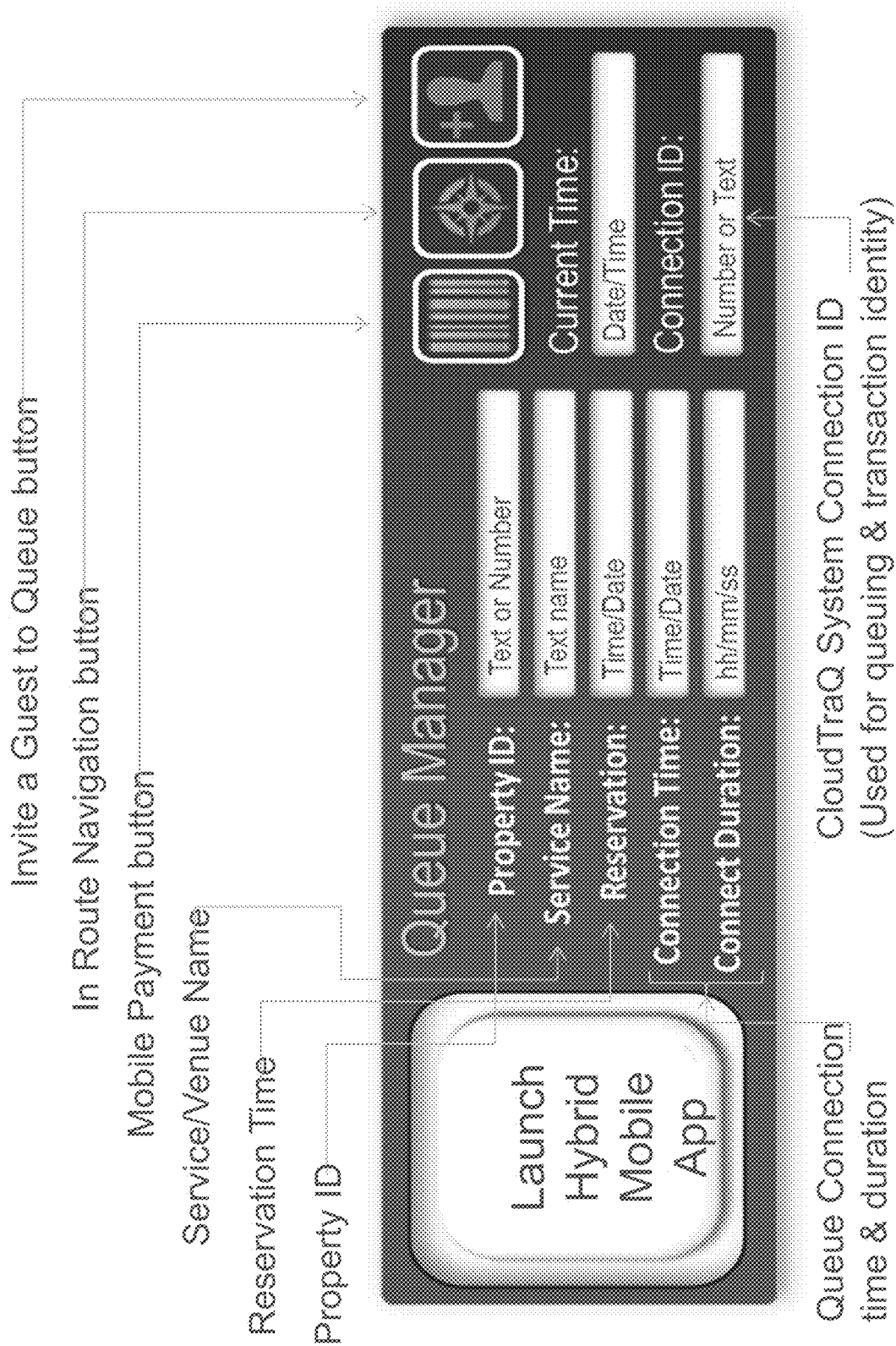

Referring now to FIG. 37, a zero-wait services mobile widget application in five operating modes is shown.
Mode 1: control manager
Status: Inactive
Services: Manual: button access to apps; Event: location, activity, context triggers to apps and notifications
Mode 2: queue manager
Status: Active
Services: queuing, ETA broadcasting, deals, notifications
Mode 3: connection manger
Status: Active
Services: check-in, deals, queue, pay, notifications, status updates
Mode 4: collaboration manager
Status: Active
Services: follow me notifications, IM, Group chat, private chat
Mode 5: digital cash manager
Status: Active
Services: load money, balance, pay, cash out, transfer funds, history Referring now to FIG. 38, a virtual queue manager (queuing, ETA and notification status management) is shown.

Figure 39:
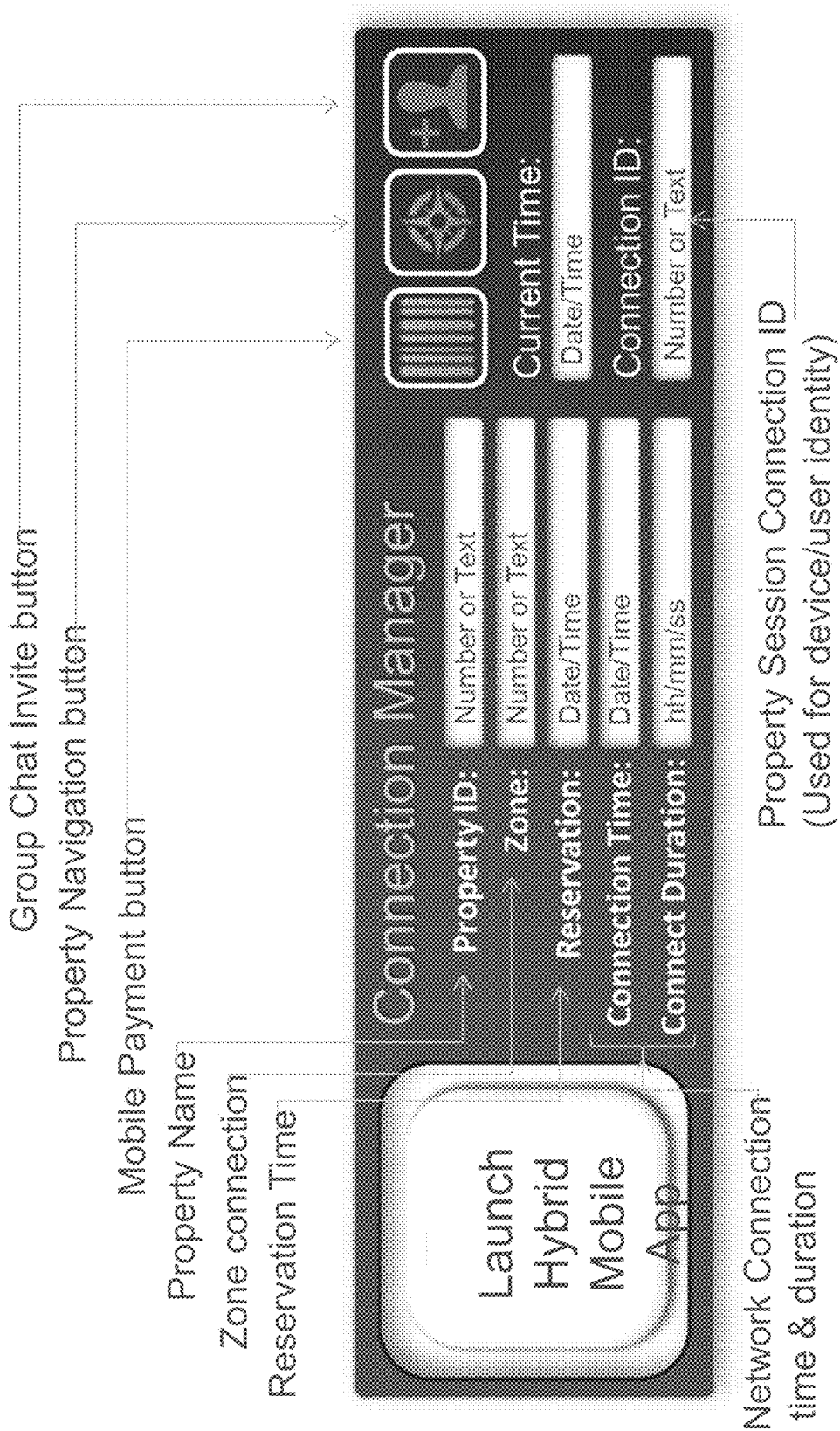

Referring now to FIG. 39, a TraQin connection manager (venue/service connection, check-in, zone tracking status management) is shown.

Figure 40:
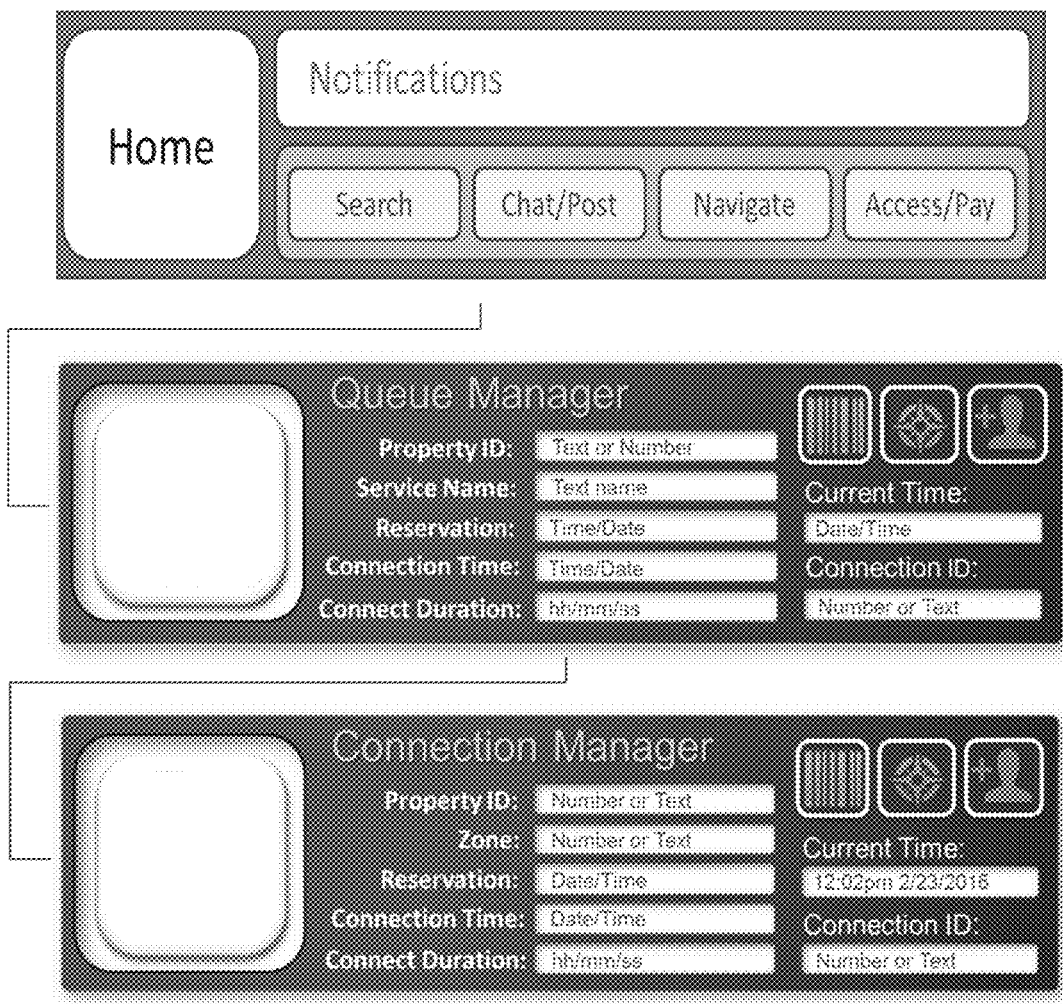

Referring now to FIG. 40, a queue and connection widget views in three function modes is shown.
Mode 1: Widget (Inactive)—push buttons to access Zero Wait services
Mode 2: Queuing (Active)—Initiated a queuing session with a property or service requiring routing, estimated time of arrival (ETA) and notification services.
Mode 3: Venue Connection (active)—Established a network connection with a property master sensor node or one or more plurality of sensors while on property.

Figure 41:
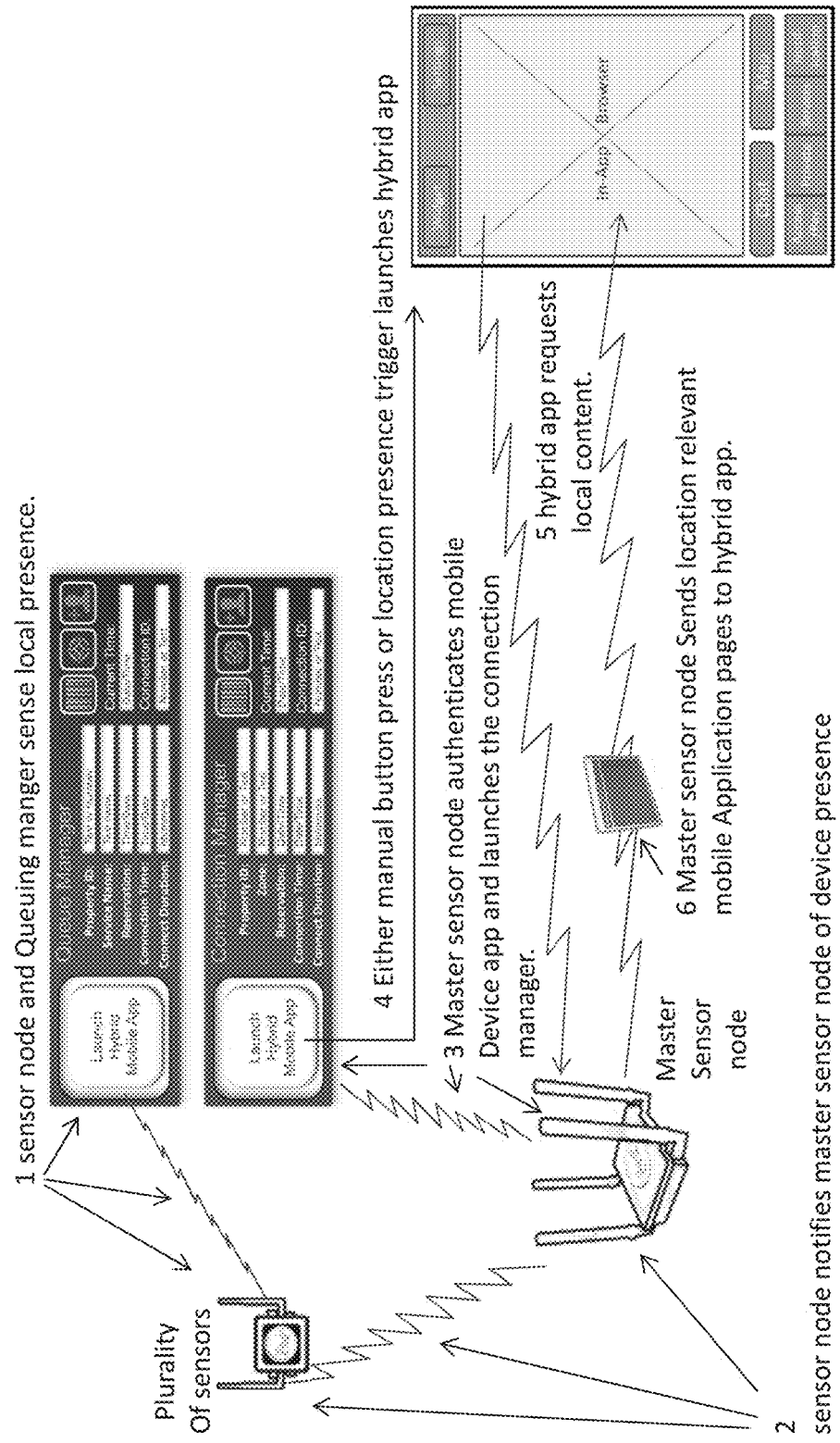

Referring now to FIG. 41, a zero-wait location-aware event trigger operation scenario is shown.

The above description is illustrative and not restrictive. Many variations of the invention will become apparent to those of skill in the art upon review of this disclosure. While the present invention has been described in connection with a variety of embodiments, these descriptions are not intended to limit the scope of the invention to the particular forms set forth herein. To the contrary, the present descriptions are intended to cover alternatives, modifications, and equivalents as may be included within the spirit and scope of the invention as defined by the appended claim and otherwise appreciated by one of ordinary skill in the art.

What is claimed is:

1. An advertisement system comprising:
at least one identification, location and authentication system associated with a physical venue, each of the at least one identification, location and authentication systems including:
a master sensor node connected to a broadband network channel and a wireless network channel, and
a plurality of sensors in the physical venue, the plurality of sensors in communication with the master sensor node over the wireless network channel,
wherein the master sensor node is configured to generate an identity key; and
a cloud-based advertisement and registration service hosted by and associated with at least one identification, location and authentication systems deployed in the physical venue, the cloud-based advertisement and registration service communicatively coupled to the master sensor node, storing a plurality of advertising data associated with the physical venue, and configured to:
receive and store a registration associated with a mobile device;
receive a mobile device key from the mobile device, wherein the mobile device key is generated by the mobile device,
request the identity key from the master sensor node,
receive the identity key from the master sensor node,
send the identity key to the mobile device for verification of an identity of the master sensor node, and
send the mobile device key to the master sensor node for verification of an identity of the mobile device,
the master sensor node further configured to receive the mobile device key from the mobile device and verify the identity of the mobile device;
an advertising application installed on the mobile device connected to a cellular network channel, the advertising application configured to:
determine that the mobile device is within a predefined distance from one of: the master sensor node and one of the plurality of sensors,
present the identity of the mobile device to the cloud-based advertisement service,
transmit a search request for a local service to the cloud-based advertisement service,
receive verification of an identity, a location, and a calibration status of a sensor node hosting the requested local service, wherein the verification of the calibration status of the sensor node includes receiving an indication that the sensor node has not been moved from a predetermined stationary position, wherein the sensor node comprises one of:

the master sensor node, and
at least one of the plurality of sensors, and
receive and display the plurality of advertising data associated with the physical venue, transmitted from the master sensor node to the cloud-based advertisement service, wherein the plurality of advertising data is selected for presentation to the mobile device based at least on:
a location of the mobile device,
a location of the physical venue,
at least one search keyword, and
the verification of the sensor node hosting the requested local service.

2. The system of claim 1, wherein the plurality of advertising data is displayed in a map view.

3. The system of claim 1, wherein the plurality of advertising data is displayed in a list view.

4. The system of claim 1, wherein the plurality of advertising data is displayed in an augmented reality view.

5. The system of claim 4, wherein the augmented reality view is triggered when the mobile device is tilted vertically.

6. The system of claim 1, wherein the plurality of advertising data comprises a coupon.

7. The system of claim 1, wherein the plurality of advertising data includes one or more venues within a predetermined distance from the location of the mobile device.

8. The system of claim 1, wherein the plurality of advertising data is associated with at least one of:
an identity and a location of the master sensor node, and
an identity and a location of at least one of the plurality of sensors.

9. The system of claim 1, wherein the plurality of advertising data is displayed in a virtual reality view.

10. The system of claim 1, wherein the advertising application is further configured to receive an indication that a user of the mobile device has subscribed to receive advertising data associated with the physical venue periodically.

11. A method comprising:
providing at least one identification, location and authentication system associated with a physical venue, each of the at least one identification, location and authentication systems including:
a master sensor node connected to a broadband network channel and a wireless network channel,
a plurality of sensors in the physical venue, the plurality of sensors in communication with the master sensor node over the wireless network channel,
wherein the master sensor node is configured to generate an identity key;
providing a cloud-based advertisement and registration service hosted by and associated with at least one identification, location and authentication systems deployed in the physical venue, the cloud-based advertisement and registration service storing a plurality of advertising data associated with the physical venue, and configured to:
receive and store a registration associated with a mobile device;
receive a mobile device key from the mobile device, wherein the mobile device key is generated by the mobile device,
request the identity key from the master sensor node,
receive the identity key from the master sensor node,
send the identity key to the mobile device for verification of an identity of the master sensor node, and
send the mobile device key to the master sensor node for verification of an identity of the mobile device,
the master sensor node further configured to receive the mobile device key from the mobile device and verify the identity of the mobile device;
providing an advertising application installed on the mobile device connected to a cellular network channel;
determining, by the advertising application, that the mobile device is within a predefined distance from one of: the master sensor node and at least one of the plurality of sensors,
presenting, by the advertising application, the identity of the mobile device to the cloud-based advertisement service,
transmitting, by the advertising application, a search request for a local service;
receiving verification, by the advertising application, of an identity, a location, and a calibration status of a sensor node hosting the requested local service, wherein the verification of the calibration status of the sensor node includes receiving an indication that the sensor node has not been moved from a predetermined stationary position, wherein the sensor node comprises:
the master sensor node, and
at least one of the plurality of sensors, and
receiving and displaying, by the advertising application, the plurality of advertising data associated with the physical venue from the cloud-based advertisement service in response to the search request, wherein the plurality of advertising data is selected for presentation to the mobile device based at least on:
a location of the mobile device,
a location of the physical venue,
at least one search keyword, and
the verification of the sensor node hosting the requested local service.

12. The method of claim 11, wherein the plurality of advertising data is displayed in a map view.

13. The method of claim 11, wherein the plurality of advertising data is displayed in a list view.

14. The method of claim 11, wherein the plurality of advertising data is displayed in an augmented reality view.

15. The method of claim 14, wherein the augmented reality view is triggered when the mobile device is tilted vertically.

16. The method of claim 11, wherein the plurality of advertising data comprises one of: a coupon and a ticket.

17. The method of claim 11, wherein the plurality of advertising data includes one or more venues within a predetermined distance from the location of the mobile device.

18. The method of claim 11, further comprising assigning the master sensor node or at least one of the plurality of sensors to a digital sign that is searchable remotely through the cellular network, viewable on the mobile device, and engageable directly through the mobile device.

19. The method of claim 11, wherein the plurality of advertising data is associated with at least one of:
an identity and a location of the master sensor node, and
an identity and a location of at least one of the plurality of sensors.

20. The method of claim 11, further comprising receiving, by the advertising application, an indication that a user of the mobile device has subscribed to receive advertising data associated with the physical venue periodically.

21. An advertisement system comprising:
at least one identification, location and authentication system associated with a physical venue, each of the at least one identification, location and authentication systems including:
- a master sensor node connected to a broadband network channel and a wireless network channel, and
- a plurality of sensors in the physical venue, the plurality of sensors in communication with the master sensor node over the wireless network channel,
- wherein the master sensor node is configured to generate an identity key; and a cloud-based advertisement and registration service hosted by and associated with at least one identification, location and authentication systems deployed in the physical venue, the cloud-based advertisement and registration service communicatively coupled to the master sensor node, storing a plurality of advertising data associated with the physical venue, and configured to:
- receive and store a registration associated with a mobile device;
- receive a mobile device key from the mobile device, wherein the mobile device key is generated by the mobile device,
- request the identity key from the master sensor node,
- receive the identity key from the master sensor node,
- send the identity key to the mobile device for verification of an identity of the master sensor node, and
- send the mobile device key to the master sensor node for verification of an identity of the mobile device, the master sensor node further configured to receive the mobile device key from the mobile device and verify the identity of the mobile device;

an advertising application installed on the mobile device connected to a cellular network channel, the advertising application configured to:
- transmit a search request for a local service to the cloud-based advertisement service,
- receive verification of an identity, a location, and a calibration status of a sensor node hosting the requested local service, wherein the verification of the calibration status of the sensor node includes receiving an indication that the sensor node has not been moved from a predetermined stationary position, wherein the sensor node comprises:
  - the master sensor node, and
  - at least one of the plurality of sensors,
- determine that the mobile device is within a predefined distance from one of: the master sensor node and at least one of the plurality of sensors,
- present the identity of the mobile device to the cloud-based advertisement service,
- receive and display the plurality of advertising data associated with the physical venue, transmitted from the master sensor node to the cloud-based advertisement service, wherein the plurality of advertising data is selected for presentation to the mobile device based at least on:
  - a location of the mobile device,
  - a location of the physical venue,
  - at least one search keyword, and
  - the verification of the sensor node hosting the requested local service.

* * * * *